(12) United States Patent
Chen et al.

(10) Patent No.: US 10,788,384 B1
(45) Date of Patent: Sep. 29, 2020

(54) SMART INSTALLATION AND MONITORING SYSTEM FOR LARGE ANCHOR BOLTS OF SUPPORT STRUCTURES FOR HIGHWAY SIGNS, LUMINARIES AND TRAFFIC SIGNALS (SLTS)

(71) Applicant: Iowa State University Research Foundation, Inc., Ames, IA (US)

(72) Inventors: An Chen, Ames, IA (US); Daji Qiao, Ames, IA (US); Long Que, Ames, IA (US)

(73) Assignee: Iowa State University Research Foundation, Inc., Ames, IA (US)

(*) Notice: Subject to any disclaimer, the term of this patent is extended or adjusted under 35 U.S.C. 154(b) by 300 days.

(21) Appl. No.: 15/885,263

(22) Filed: Jan. 31, 2018

Related U.S. Application Data

(60) Provisional application No. 62/452,731, filed on Jan. 31, 2017.

(51) Int. Cl.
  *G01L 5/00* (2006.01)
  *G01L 5/24* (2006.01)
  (Continued)

(52) U.S. Cl.
  CPC ............ *G01L 5/243* (2013.01); *F16B 31/028* (2013.01); *G01L 1/14* (2013.01)

(58) Field of Classification Search
  CPC ... G01L 5/243; G01L 5/24; G01L 1/14; G01L 1/142; F16B 31/024; F16B 31/028
  See application file for complete search history.

(56) References Cited

U.S. PATENT DOCUMENTS

| 2,873,341 A | 2/1959 | Kutsay |
| RE30,949 E | 5/1982 | Sekiguchi |
(Continued)

FOREIGN PATENT DOCUMENTS

EP     2803871 A1    11/2014

OTHER PUBLICATIONS

Yazdi, Navid et al., "A Generic Interface Chip for Capacitive Sensors in Low-Power Multi-Parameter Microsystems", Sensors and Actuators, 84, pp. 351-361 (2000).
(Continued)

*Primary Examiner* — Blake A Tankersley
(74) *Attorney, Agent, or Firm* — McKee, Voorhees & Sease, PLC

(57) ABSTRACT

A method, apparatus, and system to quantify tension forces of the anchor bolts for, e.g., SLTS support structures. A sensing assembly comprising one or more washers is installed along an anchor bolt. The sensing assembly comprises two spaced-apart surfaces between which a capacitance can be measured if electrical potential is created between the surfaces. The capacitance between the surfaces can be calibrated to bolt tension based on the relative distance between the surfaces. An RFRD circuit is connected to the two surfaces. An RF interrogation signal can supply the electrical potential and allow a reading of the responsive capacitance between surfaces to convert the capacitance reading into a bolt tension. Additionally, the introduction of the battery-free RFRD allows data to be acquired wirelessly from a distance, enabling an entirely new method of inspection. With minimum additional hardware cost, it provides a cost-effective way to replace traditional bolt installation and inspection methods.

18 Claims, 51 Drawing Sheets

(51) Int. Cl.
*G01L 1/14* (2006.01)
*F16B 31/02* (2006.01)

(56) References Cited

U.S. PATENT DOCUMENTS

| | | | |
|---|---|---|---|
| 5,366,684 A | 11/1994 | Corneau, Jr. | |
| 7,412,898 B1* | 8/2008 | Smith | G01L 5/24 73/761 |
| 8,914,061 B2 | 12/2014 | Charrat et al. | |
| 2014/0129158 A1* | 5/2014 | Shea | G01L 5/243 702/57 |
| 2017/0335878 A1* | 11/2017 | Richardson | F16B 31/028 |

OTHER PUBLICATIONS

"Squirter", http://www.appliedbolting.com/squirters.html, Applied Bolting Technology, 2 pages, retrieved from Internet Aug. 8, 2016.

"New Washer can Accurately Measure a Bolt's Clamping Force", http://phys.org/news/2015-11-washer-accurately-clamping.html, 3 pages, Nov. 11, 2015.

SARMA, Sanjay, "White Paper, Towards the 5¢ Tag", Auto-ID Center, published Nov. 1, 2001.

"Impressive, Free BoltCALC+ App Hits iTunes", http://www.bignutjob.com/tag/torque, TitanMidAmerica.com, 10 pages, Sep. 9, 2013.

Rödjegård, Henrik, et al., "A Differential Charge-Transfer Readout Circuit for Multiple Output Capacitive Sensors", Sensors and Actuators A 119, pp. 309-315 (2005).

Load Indicating Washers (DTI), http://www.portlandbolt.com/products/washers/load-indicating, Portland Bolt & Manufacturing Company, 2 pages, retrieved from Internet Aug. 8, 2016.

"Tension vs. Torque", http://www.portland.com/technical/faqs/tension-vs-torque-explained-sort-of/, written by Dane McKinnon, 23 pages, Oct. 16, 2007.

"Standard Specifications for Structural Supports for Highway Signs, Luminaires, and Traffic Signals", AASHTO the Voice of Transportation, American Association of State Highway and Transportation Officials, Sixth Edition, 29 pages, 2013.

"Force Sensing Bolts/Studs General Product Information", http://strainsert.com/products/force-sensing-bolts-studs-general-product-information, 4 pages, retrieved from Internet Aug. 8, 2016.

Hosch, Ian, "Evaluation of Anchor Bolt Clearance Discrepancies", NCTSPM, 5 pages, 2014.

"Estimating Labor Unit Data for Concrete Construction", Estimator's General Construction Manhour Tables copyrighted 1961 by Gulf Publishing, 13 pages.

\* cited by examiner

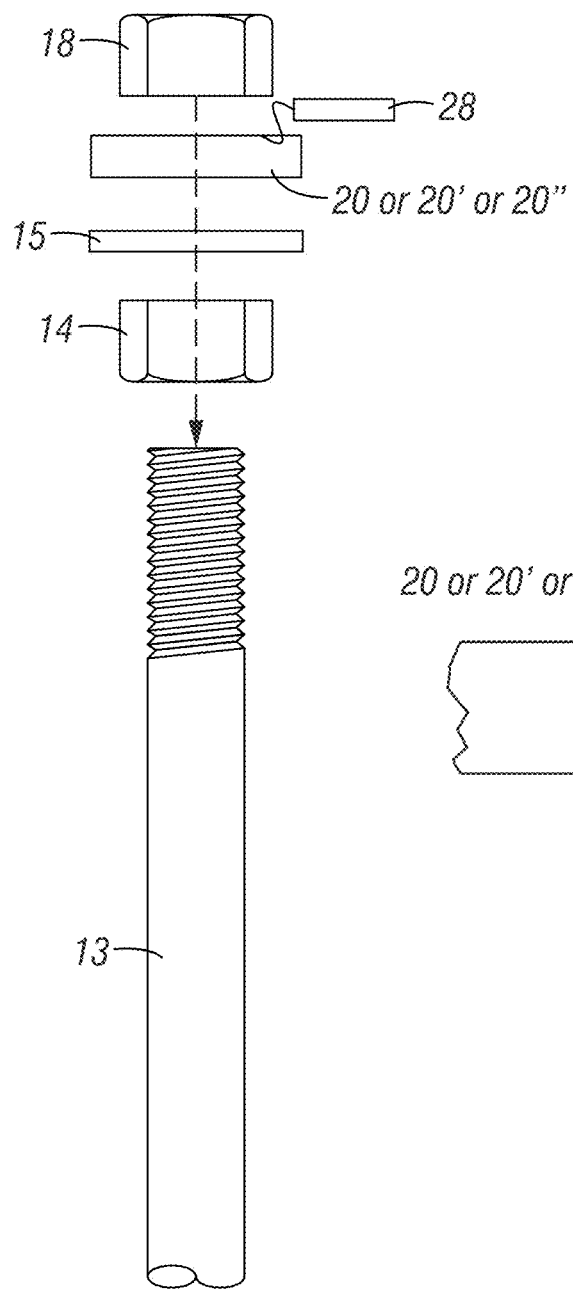
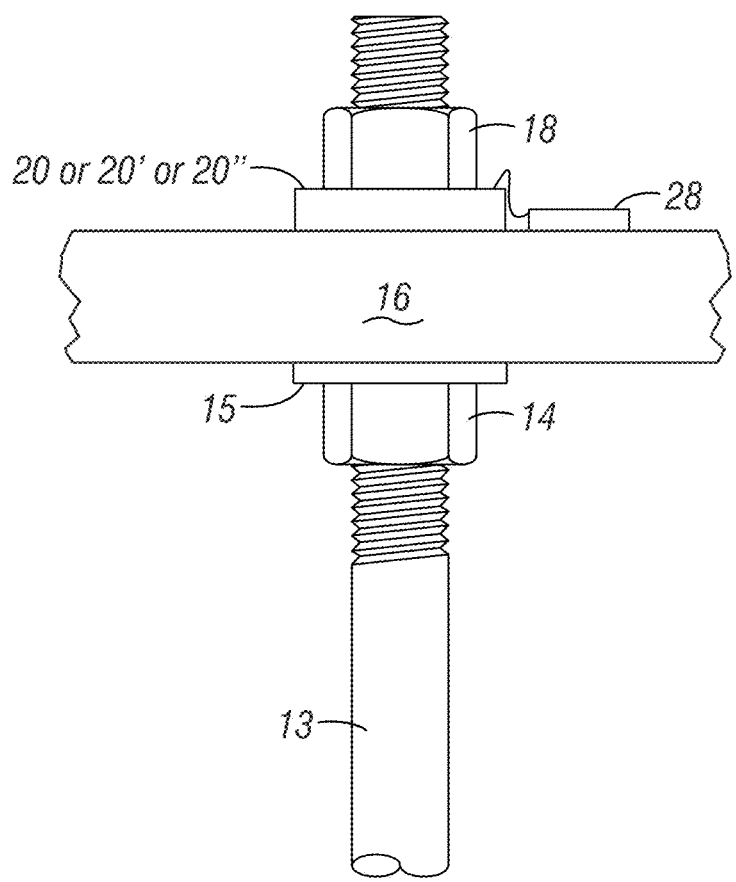
FIG. 10A
(DISASSEMBLED AND WITHOUT BASE PLATE)
FIG. 10B
(ASSEMBLED WITH BASE PLATE)

Cp 60.16333 fF
D 0.026993

US 10,788,384 B1

SMART INSTALLATION AND MONITORING SYSTEM FOR LARGE ANCHOR BOLTS OF SUPPORT STRUCTURES FOR HIGHWAY SIGNS, LUMINARIES AND TRAFFIC SIGNALS (SLTS)

CROSS-REFERENCE TO RELATED APPLICATIONS

This application claims the benefit of Provisional Application U.S. Ser. No. 62/452,731 filed on Jan. 31, 2017, all of which is herein incorporated by reference in its entirety.

GOVERNMENT RIGHTS

This invention was made with government support under National Academy of Sciences, National Cooperative Highway Research Contract No. NCHRP-196. The Government has certain rights in the invention.

I. BACKGROUND OF THE INVENTION

A. Field of the Invention

The present invention relates to large anchor bolts for anchoring elevating structures in the nature of, for example, substantially tall luminaire/light poles, traffic signal superstructures, and highway sign supports and, in particular, to means and methods of monitoring correct tensioning on the bolts at installation or subsequent times.

B. Problems in the Art

Incorrect installation of large anchor bolts, or their loosening over time, can be catastrophic. FIG. 1 of the appended drawings illustrates a typical installation. See also [9](from References listed infra.), which is incorporated by reference herein. This multi-bolt interface between a large mass, in-ground foundation and a large elevating structure requires a number of such substantially large anchor bolts. One example of a potential consequence of incorrect installation or failure of that interface is that the base plate of a pole suspending a large overhead highway sign could release from its foundation and the sign fall onto a highway. Therefore, an imperative in this technical field is techniques to ensure correct installation as well as maintenance of correct bolt tension over the entire useful life of the combination.

Examples of discussions about anchor bolts, including non-limiting examples of size, characteristics, and applications, are included, e.g., at http://www.portlandbolt.om/products/washers/load-indicating/ and other publicly available sources, as are additional details on examples of prior art DTI-type bolt tension monitoring techniques, which are further discussed below. As can be appreciated, and as is well-known by those skilled in this technical area, those sizes and characteristics can vary.

A number of attempts at providing solutions have been proposed. Some of them will be described in more detail herein. However, as can be appreciated by those skilled in this art, there remains room for improvement.

1. Research Background

The support structures for Highway Signs, Luminaries and Traffic Signals (SLTS) (see, e.g., American Association of State Highway and Transportation Officials (ASSHTO) publications such as are known to those skilled in this technical area) are attached to a concrete or other base via a base plate with holes to accommodate a plurality (e.g. eight or more) anchor bolts, as shown in FIG. 1. These bolts (see ref no. 13 of FIG. 1) are typically large-sized (2" diameter or greater) and high-strength (up to 105 ksi) threaded rods partially embedded into the concrete base 12. To attach the SLTS support structure's (pole 11 or other elevating structure) base plate 16, a leveling nut 14 is screwed onto the bolt 13 first, followed by a washer 15 and the base plate 16. A washer 17 (and sometimes also a lock washer) and a nut 18 are then installed above the plate 16, and the leveling nut 14 and the top nut 18 can be adjusted to ensure that the plate 16 is level and the nuts 14, 18 are tight. As can be seen in FIG. 1, this standard overall installation 10 of pole 11 with base plate 16 are attached to concrete base or foundation 12 with several anchor bolt top-and-bottom-washer-nut combinations, which form a set or pattern around the pole.

Currently, many states are experiencing problems with the anchor bolts. Specifically, loose nuts have been found on many anchor bolts, sometimes less than two years after the structures were installed. For example, it is estimated that 19% of the SLTS support structures in Minnesota have loose nuts, and other states have estimated an even higher percentage, up to 28%. This situation strains the resources of the agency responsible for maintenance, and creates concerns related to inspection frequency and public safety.

One possible cause of the loose nuts relates to the difficulty of measuring bolt tension during installation. Historically, torque on the nut has been used to measure the "tightness" of a bolt, even though bolt tension provides the actual clamping force for the joint. Torque has been used because it can be measured with available tools, such as a torque wrench. However, the relation between torque and bolt tension is not straightforward, and a nut installed with a calibrated torque wrench may not create sufficient tension under certain conditions. Therefore, the ability to accurately measure bolt tension during installation could reduce or eliminate early failures due to loose nuts.

Another related problem is the burden of regular maintenance of anchor bolts for SLTS structures. Generally, SLTS structures need to be inspected at least once every five years, which is a time-consuming and labor-intensive process. Expediting the inspection process, such as through a smart anchor bolt monitoring solution, would lower costs and free agency resources for other tasks.

2. A Review of Current Technology and the Uniqueness of the Proposed Concept

The torque wrench has been the most common technological solution for anchor bolt installation and maintenance. A few other solutions exist, though these are generally designed for smaller bolts that require less tension. The direct tension indicator (DTI) is a special washer with protrusions that deform as force is applied. The distance that the protrusions have been compressed serves as an indicator of the force applied and can be estimated with a tapered feeler gauge. They are covered under ASTM F959.

The Squirter DTI™ [1] contains an amount of colored flexible silicone in the cavity behind the protrusion. As the protrusion is compressed, the silicone "squirts" through a channel to the edge of the washer, providing a visual indication of the appropriate amount of tension. Neither the Squirter™ nor the regular DTI can be used for long-term monitoring, and neither directly quantifies the tension force, relying instead on human interpretation.

A piezoelectric load-sensing washer is under development at The University of Alabama in Huntsville [2]. However, it requires use of relatively fragile piezo-effect elements that require special protective measures and also requires hardwired electrical leads from each washer that must physically be plugged-in to a portable device that must be manually carried and plugged-in to each washer to get a load reading. Another approach is to instrument the bolt itself, and force-sensing bolts are commercially available [3] (see, e.g., http://www.strainsert.com/products/force-sensing-bolts-studs-general-product-information of Strainsert Company, West Conshohocken, Pa. (USA)). These bolts tend to be much smaller than anchor bolts. This is therefore a custom bolt. While both of these solutions could enable accurate installation as well as long-term monitoring, they are expected to be prohibitively expensive for widespread application to anchor bolts.

It can therefore be seen that there is room for improvement in this technological field.

II. SUMMARY OF THE INVENTION

At a generalized level, the invention addresses problems and deficiencies in the art by (a) providing a more direct, measurable tension on such anchor bolts, (b) in a small form factor, cost effective, easy to install manner, (c) combined with the ability for remote sensing of bolt tension over the normal estimated lifespan of such bolts and anchoring interfaces, and (d) with a robustness that is beneficial for the range of preloads, environments, forces, and expected lifespans experienced with these structures. The more direct measurement of bolt tension promotes more accurate estimates than indirect techniques. This can include measurement at a single discrete time (e.g. at initial installation), at different spaced apart times (e.g. monthly or yearly maintenance checks), and even the ability to collect multiple, spaced apart readings over time (e.g. to detect any trending towards loosening of the bolts). With appropriate databases, and with present day remote sensors and cheap digital memory storage, a virtually unlimited number of anchor bolt installations can be monitored and stored over time. Software programming can alert relevant persons (e.g. through a readout on a portable remote sensing reader device) if trending is towards a loosening requiring maintenance or repair.

In one aspect of the invention, the direct measurement of bolt tension comprises a sensor assembly that can be inserted concentrically along the bolt shaft. The sensor assembly can be addition to, but can also take the place of, the typical washer under the top nut of the anchor bolt. The sensor assembly includes a component that compresses upon tightening of nuts on the anchor bolts relative a base plate associated with the structure that is being anchored or whatever is to be clamped by the clamping force of the bolt/nut/washer combination. That component can take different forms. One example is a mechanical spring or springs. Another is a resilient layer. Another is a combination of mechanical and material resiliency. The sensor assembly transduces the magnitude of compression into an electrical measurement signal. In one example, the magnitude of compression is transduced by measuring change in capacitance between electrically conducting surfaces held apart by spring force or elasticity. In one example, the conducting surfaces are metal. One specific example are two DTI-type metal washers. The electrical measurement signal can be communicated by an electrical circuit to an on-board radio frequency read out circuit upon energization by an RF reader device. Such a portable reader can touchlessly interrogate the readout circuit and display, store, or otherwise capture and further utilize the compression value by comparing it to calibrated reference values indicative of magnitude of bolt tension. The reader can indicate to the user that the bolt tension is either within acceptable range or not. This remote sensing allows fast, real-time, efficient, and economical monitoring of from one to a multitude of anchored structures with the ability to reduce or eliminate improper installation and or loosening of anchor bolts with potential catastrophic results.

In one specific embodiment of the invention, the sensor element is a set of washers with an intermediary resilient structure or material which allows relative displacement of the two washers along the bolt axis when installed on the bolt shaft. Non-limiting examples of resilient structures or materials include springs or elastic materials or combinations. Relative movement of the washers can be indirectly sensed by a passive circuit that, when energized, transduces change in capacitance between the washers. In one example, the resilient material or structure is resilient in the sense it (a) urges and holds the washers a maximum distance apart when in an uncompressed, non-loaded state and (b) continues to urge the washers away from each other but allows the washers to move closer together when forces overcome the resistance to deformation of the structure or material into a compressed state. Calibration can allow correlation to whether tightening of nuts relative the anchor bolts (or vice versa) is within the range indicative of appropriate bolt tension or outside that range. Passive circuitry on at least one of the washers can be interrogated wirelessly via radio frequency wireless technology. This technology can include radio frequency identification (RFID) techniques but for purposes of this disclosure will be referred to generally as radio frequency readable device (RFRD). It is to be understood that the invention is not necessarily limited to that type of wireless communication. The capacitive readings can be remotely wirelessly sensed and displayed on a portable wireless reader. Programming at the reader can provide an indication to the user whether bolt tension is within appropriate range or outside it.

Another aspect of the invention comprises using the bolt tension sensor described above in a system of a plurality of anchored structures, each having a base plate (or other item to be clamped) secured to anchor bolts associated with a foundation (or other base). Each anchor bolt has its own tension sensor installed along its shaft between either a nut and the base plate or the bolt head and the base plate. In one example, the sensor is the assembly discussed above, a set of washers with a resilient component and/or material between, and at least one of the washers includes one or more capacitive sensor elements that can sense displacement of the washers from each other. Each of the one or more of capacitive sensor elements is in operative electrical connection to an RFRD circuit. Each RFRD circuit has unique interrogation identification. An RFRD reader will energize, read and discriminate between the one or more capacitive sensors for each bolt. This allows the benefit of monitoring the preload at each anchor bolt for a single supported structure to gain intelligence if any of those bolts may have a tension issue. One or more RFRD readers can be configured to remotely sense any of the RFRD circuits on the bolts. Thus, workers can measure and monitor, over time, any number of anchor bolts in one anchor bolt set, or any number of anchor bolts on virtually any number of anchor bolt set installations.

As will be appreciated by those skilled in the art, this generalized concept of (a) a more direct reading of the bolt tension (b) via remote, touchless, wireless sensing (c) that does not require a dedicated electrical power or battery power at the anchor bolt, facilitates virtually perpetual ability for monitoring, over long periods of time including months, years, and even decades. The concept can be applied to a range of bolts, including relatively large structural bolts (e.g. of on the order of two inches (or more) in diameter) and experiencing relatively large tension forces (e.g. on the order of a hundred (or more) kilopounds (KIPs)). It can be possible to read the sensors at standoff distances on the order of inches to feet to yards to possibly tens of yards, either at stationary or moving positions (e.g. in a car or truck). Because the sensor is a stand-alone part (e.g. in one or more washers), it can be retrofitted to existing structures or used as original equipment. It also does not change the nature of the bolts or nuts or structure being clamped. Furthermore, it does not pose the technical problems of fragility of piezo-effect-based load cells. It therefore represents a highly flexible and economical technique.

Further comments on the principles used with the invention follow.

A. Concept

To address the limitations of the current practices for bolt installation and inspection, we propose a smart installation and monitoring system that can directly measure the bolt tension. One example is shown in FIG. 2. Others are shown in FIGS. 11A-C and 15A. The solution is to install sensors with minimal changes to the existing hardware by adding a modified sensing washer immediately at (e.g. above) the support structure's base plate. As shown in FIG. 2, this washer can use protrusions to interlock with a covering washer and provide a safe and secure housing for compression sensors, which measure the compression force created by the nuts, allowing for more precise installation and enabling sensor-based inspections. Another important innovation of the system is that the compression sensors will be battery-free. They are connected to a low-cost, passive radio frequency readout device (RFRD), which is interrogated wirelessly using a radio frequency (RF) reader. This allows inspections to occur from a distance, such as from any passing agency vehicle, thus expediting the inspection process and reducing maintenance costs.

B. Sensing Principle

The example of the compression sensor shown in the lower right inset of FIG. 2 uses capacitance to measure force. That sensor comprises two metal plates separated by an insulating elastic filling and installed in a small cavity in the top of the sensing washer. Wire leads will be attached to the sensing plates via an epoxy-filled channel that leads to the edge of the washer, so that the capacitance between the plates can be measured. Above the cavity will be a downward protrusion in the covering washer, and under the cavity will be a downward protrusion in the bottom of the sensing washer, making the physical structure of the sensing washer similar to that of a direct tension indicator (DTI) references earlier. As bolt tension is induced, the protrusions will compress into the sensor cavity from both directions, changing the distance between the sensing plates, which translates into a change in capacitance. Using a prior characterization of the washer and the sensor, this change in capacitance will be interpreted as the compressive force caused by bolt tension. After installation, while the nut remains tight, the capacitance reading will remain the same. If the nut becomes loose, the elastic filling will cause the sensing plates to shift, changing the capacitance reading and allowing the sensor to detect the loose nut. FIGS. 11A-C and 15A show several alternative embodiments the invention can take. Instead of small pockets of elastic material with space-apart conducting plates encapsulated therein, the covering and sensing washers themselves are the conductive plates and an elastic dielectric is interposed between those washer/plates. Prior to tensioning, the two washers are urged apart a distance D by the interposed elastic material. Capacitance measured between the washers/plates would have a first value. Upon tensioning of the anchor bolt on which the washers/plates are installed, the distance D narrows. Capacitance measured between the washers/plates would then have different values. Those capacitance measurements can be calibrated to bolt tension for any distance D. From this the combination can be used to measure and monitor bolt tension over time. The invention is not limited to the specific embodiments of the Figures.

1. Readout Device:

Each compression sensor, if the designer elects, can be read out with a radio frequency readout device (RFRD). Similar to a passive radio frequency identification (RFID) tag, the RFRD is battery-free and completely powered by incoming radio waves, which are generated by a nearby RF reader. An integrated circuit (IC) on the RFRD uses this power to measure the capacitance of the sensor and generate a corresponding RF signal, which is received and interpreted by the RF reader.

2. Installation Use Case:

The system can be used to obtain accurate tension force readings as the SLTS support structure is fastened to the anchor bolt. The installation crew will fit the sensing assembly (e.g. washer and the covering washer onto the anchor bolt or a pre-assembling, pre-encased integrated device), sandwiching the sensing equipment and protecting it from the elements. The RFRD will be attached to the sensor leads and affixed in place in ruggedized fashion to survive a long time even in harsh environmental conditions. The installation crew will be able to use the RF reader to obtain an instant and accurate reading of the tension on each bolt, allowing them to ensure that appropriate initial tensioning is achieved, reducing the risk of early failures due to loose nuts.

3. Post-Installation Use Case:

The proposed system can also be used to support long-term monitoring of bolt tension. With a properly-designed RF reader, the RFRD will be able to be wirelessly powered and interrogated, on-demand, from a stand-off distance (e.g. up to 33' (10 meters) or more). This means that any agency vehicle equipped with a reader will be able to take a reading as it drives past, even if the crew is not actively inspecting anchor bolts. A reading that changes significantly over time will indicate a change in the bolt tension. If the amount of change or rate of change passes a threshold, a manual inspection will be recommended.

C. Technical and Scientific Merit

Aspects and benefits of the solution are summarized as follows:

a) Direct Tension Measurement. The sensor will provide a direct reading of the bolt tension, as opposed to the traditional measurement of torque on a nut, which will provide more accurate information about the tightness of the joint.

b) Battery-Free RFRD: The proposed passive RFRD will enable the convenience and speed of wireless readings, with no battery-related maintenance. This allows for a significantly faster inspection process, with a higher inspection frequency, if needed. Additionally, the inspection process will be safer, since crews can stay inside their vehicles.

c) Two-Washer Design: If used in that form, the unique two-washer system for housing the sensors will provide for easy installation and access to the sensors. The two-washer system will also protect the sensors and improve the robustness and reliability of the system.

d) Low Cost: The sensors and the RFRD are anticipated to cost on the order of cents each [8], and the RFRD will be reusable. Additionally, as described by the previous points, the system itself will incur little installation or maintenance costs, while helping to avoid much larger costs for regular inspection and maintenance of the bolts.

e) Durability. The use of capacitive-based sensing between two plates does not present the issues of fragility regarding piezo-effect sensors and other sensors.

D. Breakthrough of the Concept

The concept is expected to, for the first time, quantify tension forces of the anchor bolts for SLTS support structures. Additionally, the introduction of the battery-free RFRD allows data to be acquired wirelessly from a distance, enabling an entirely new method of inspection. With minimum additional hardware cost, it has a great potential to provide a cost-effective way to replace traditional bolt installation and inspection methods.

III. BRIEF DESCRIPTION OF THE DRAWINGS

FIG. 1 is an illustration of a typical support structure (SLTS) (double nut moment joint) of the type to which the present invention pertains (see also [9]).

FIG. 2 is a diagrammatic depiction of a first specific embodiment of a sensing assembly according to the present invention applied to a luminaire pole (left side) and greatly enlarged isolated views showing one exemplary embodiment of the invention (drawings in four boxes to right side). In this embodiment, the exemplary embodiment comprises a smart system including a pair of washers that are installed between the stationary nut of the anchor bolt of a double nut moment joint and the base plate, where the top washer is called a covering washer and the bottom washer is called a sensing washer. A combination of protrusions and depressions on both washers, where the depressions are filled with an elastomer that envelopes a pair of spaced apart capacitor plates, allows for change in separation distance between capacitor plates upon change in compression forces between the washers. Electrical connection between each compressive sensor (one or more) on each sensing washer and an RFRD circuit allows for transduction of capacitance between the capacitor plates, correlation (e.g. by prior calibration) of the capacitance measurement with a bolt tension quantification, and wireless interrogation of each compressive sensor for that bolt tension quantification. This allows remote, touchless sensing of bolt tension with a conventional RF reader.

FIGS. 10A and B are high-level diagrams of the generalized concept according to aspects of the present invention. FIG. 10A is exploded before assembly onto an anchor bolt.

FIG. 10B is assembled on opposite sides of a base plate on an anchor bolt.

Figure 11A:
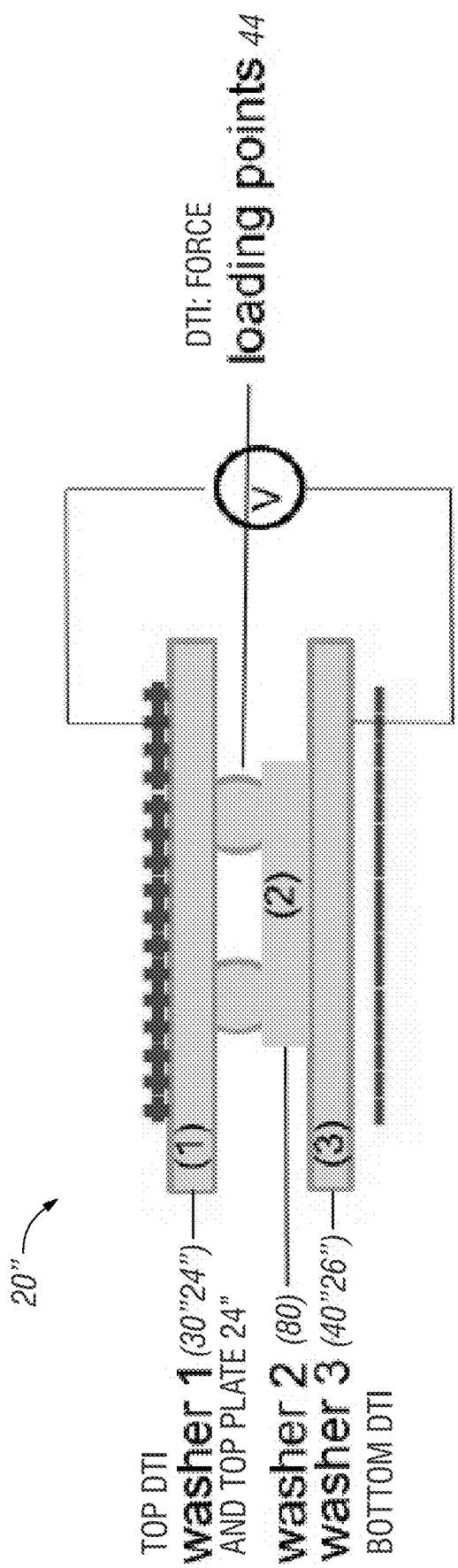

FIG. 11A—Parallel plate capacitor based on three washers (General sketch of the proposed capacitor), according to another exemplary embodiment of the invention.

Figure 11B:
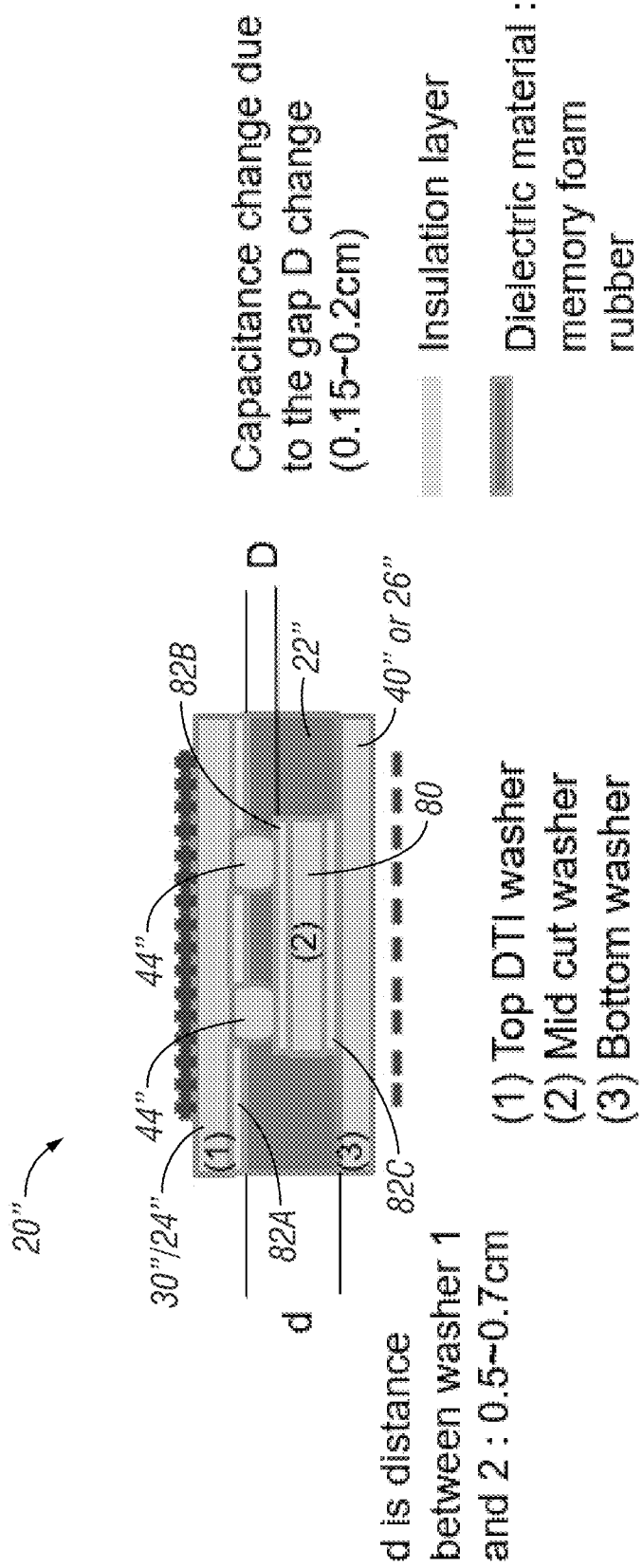

FIG. 11B—Detailed design with dielectric and elastic materials added into capacitor of FIG. 11A.

Figure 11C:
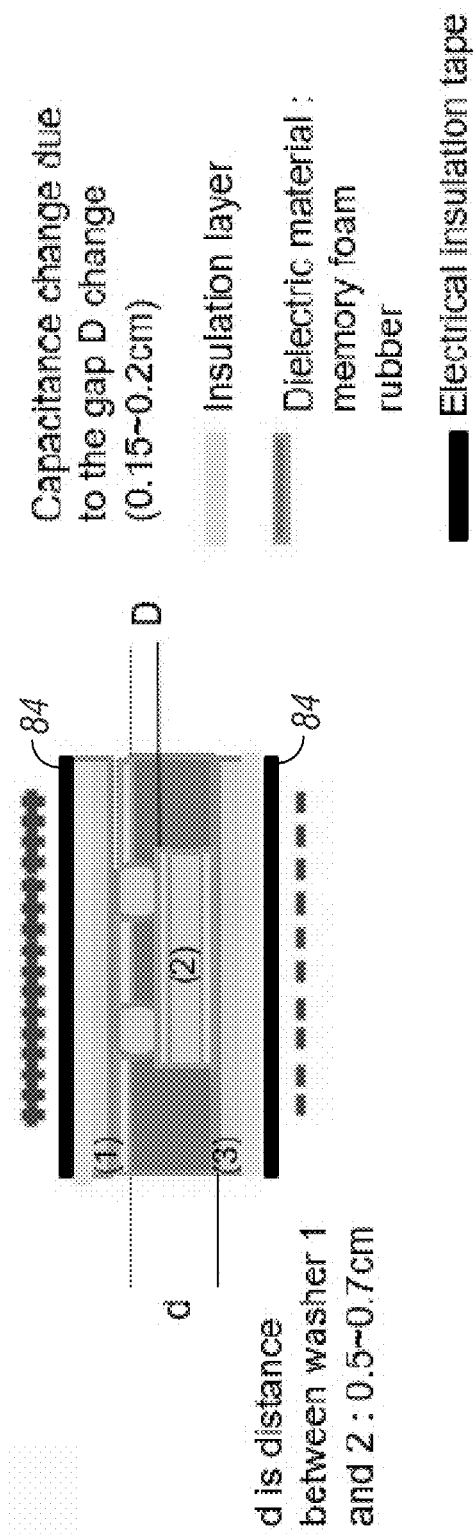

FIG. 11C—Insulation improvement by adding electrical insulation tape to assembly of FIG. 11B.

Figure 11D:
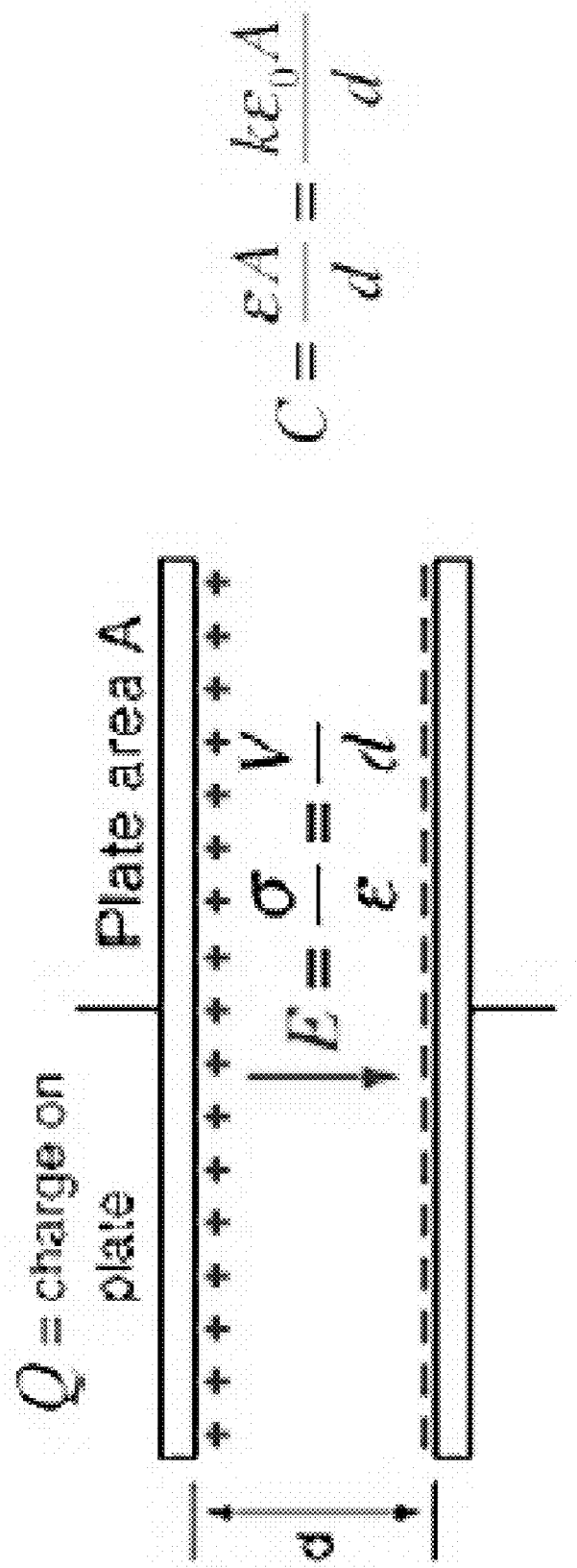

FIG. 11D—Diagrammatic view of mathematical characterization of a capacitor according to aspects of the invention.

Figure 12:
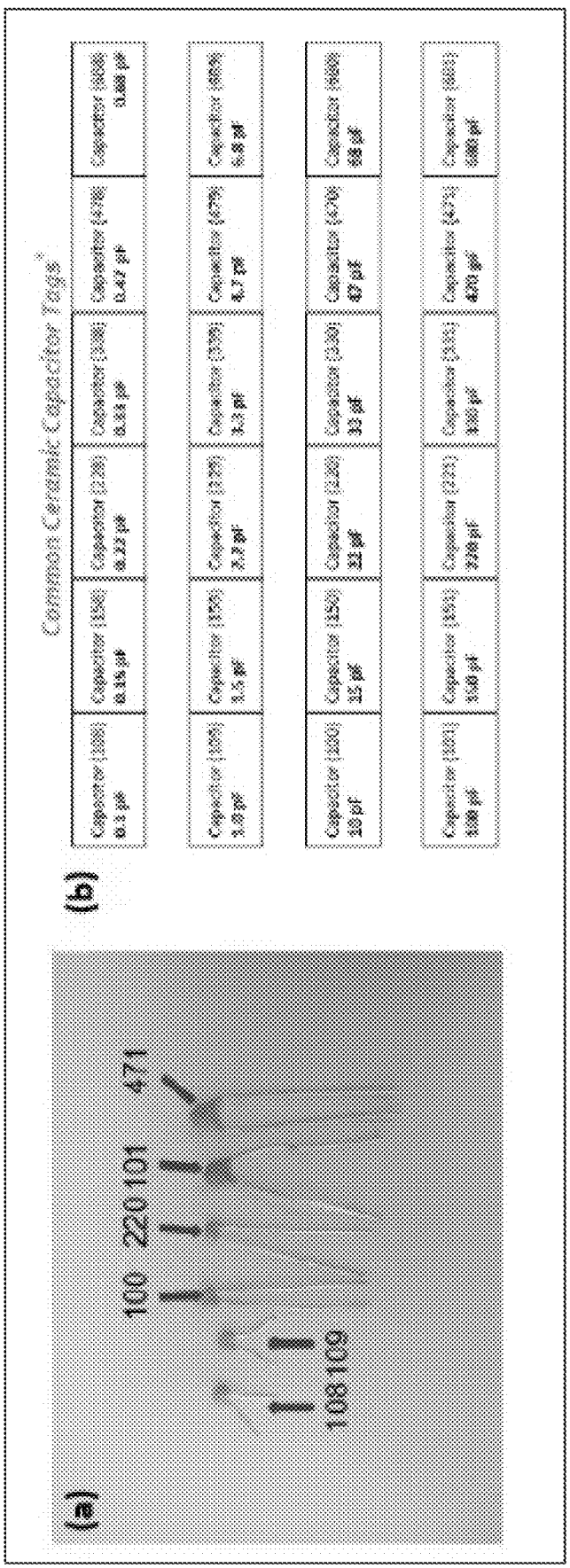

FIG. 12—Example of reference capacitor used in testing embodiments of the invention, in particular (a) Measured capacitors, (b) Common capacitor tags.

Figure 13:
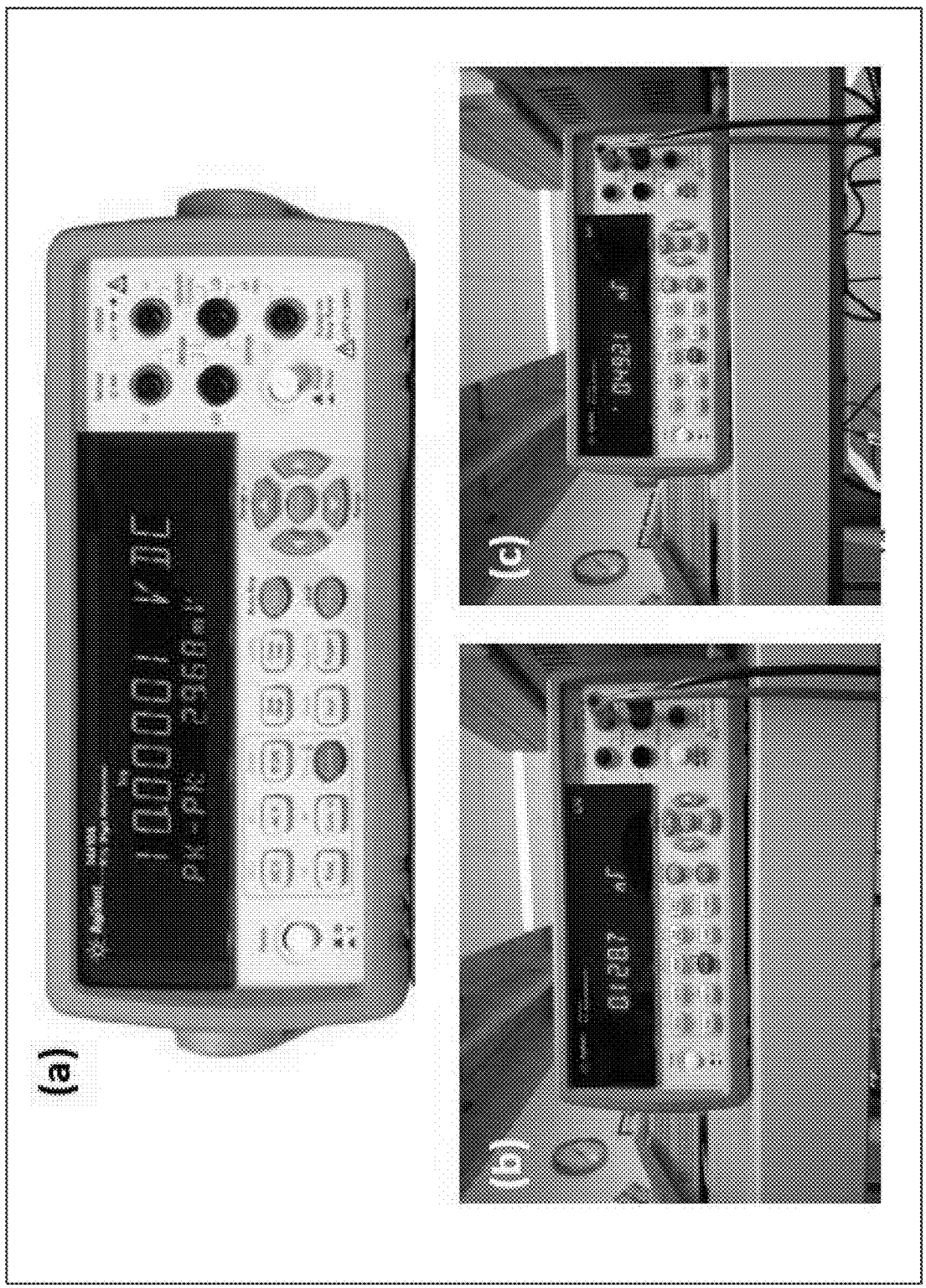

FIG. 13—Example of Capacitor reader used in testing embodiments of the invention, in particular (a) Agilent—34410A 6½ digit multimeter, (b) Measured value for capacitor (101), (c) Measured value for capacitor (471).

Figure 14:

FIG. 14—Example of capacitor reader used in testing embodiments of the invention, in particular; (a) KEYSIGHT E4980AL, with the resolution of 100 fF=0.1 pF. (b) Initial value about 60 fF.

Figure 15A:
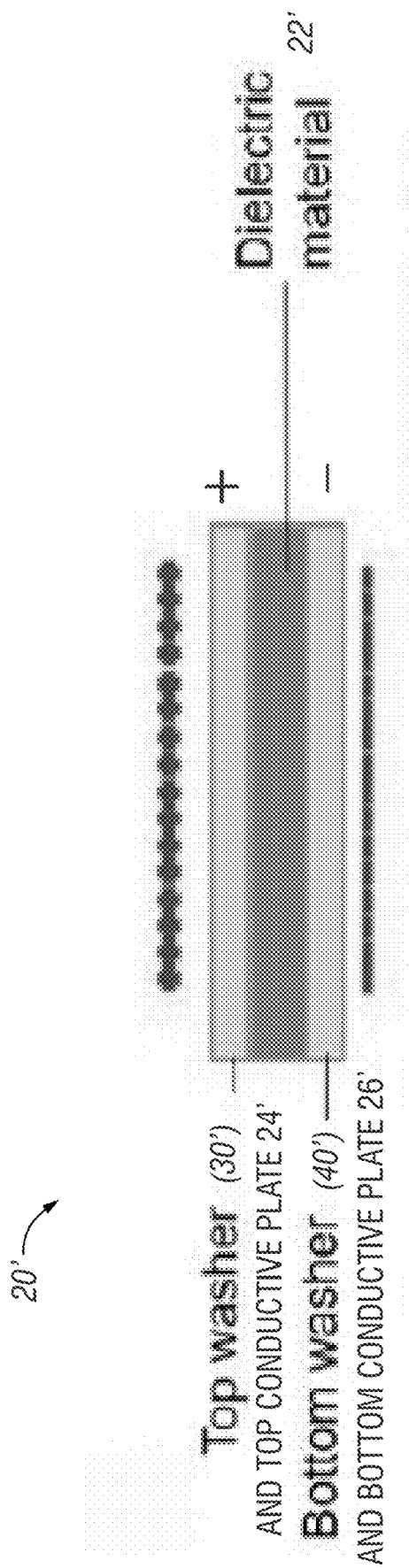

FIGS. 15A-D—Assembled capacitor with rubber as the intermedium dielectric material according to aspects and embodiments of the invention, particularly; FIG. 15A—Schematic plot of the assembled capacitor by using two washers, FIG. 15B—Plan view of the capacitor, FIG. 15C—Side view of the capacitor, FIG. 15D—Setup of the capacitor measurement.

Figure 16B:
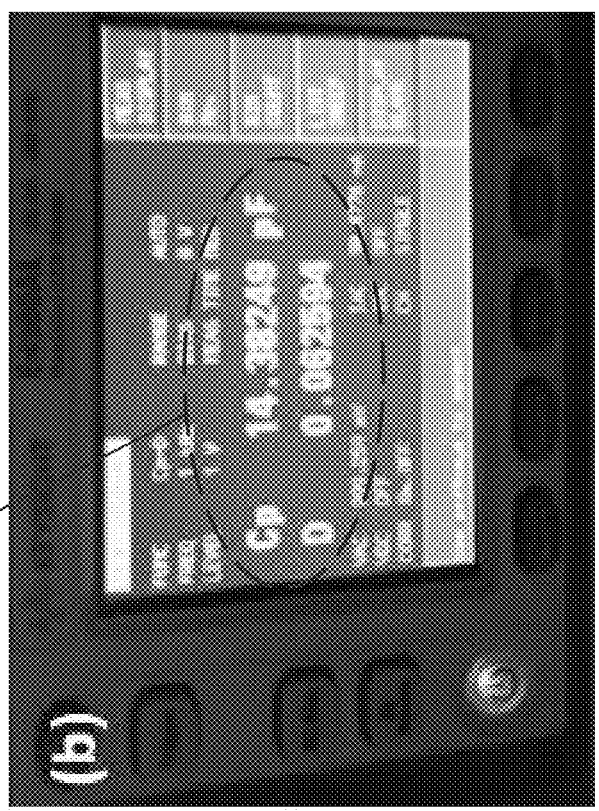
Figure 16A:
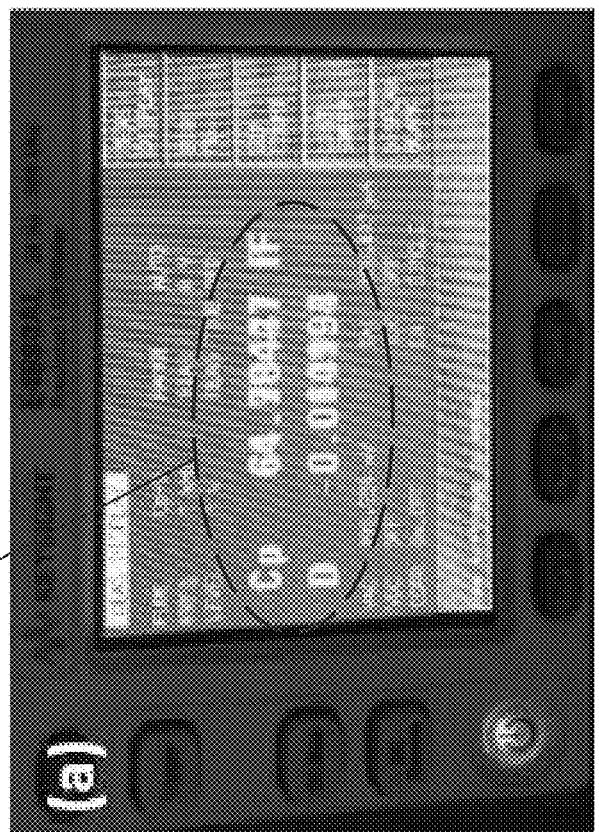
Figure 16D:
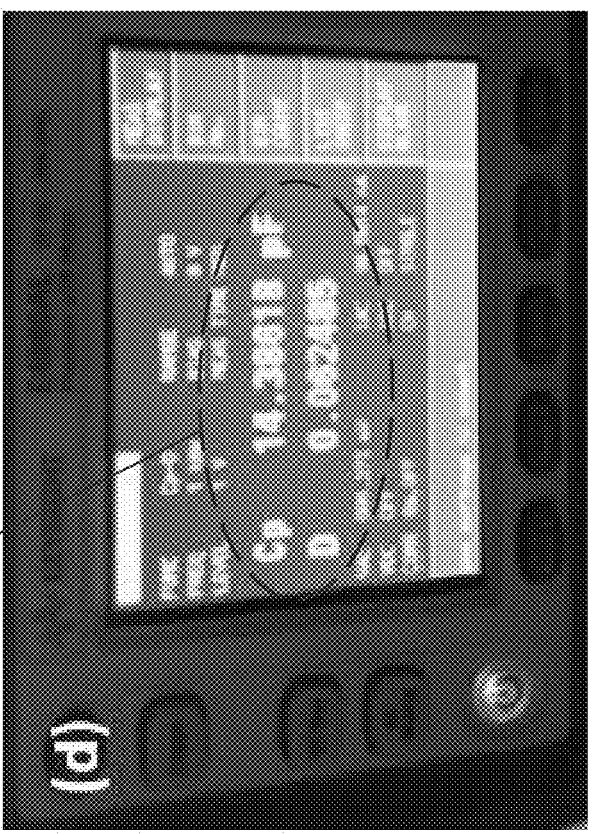
Figure 16C:
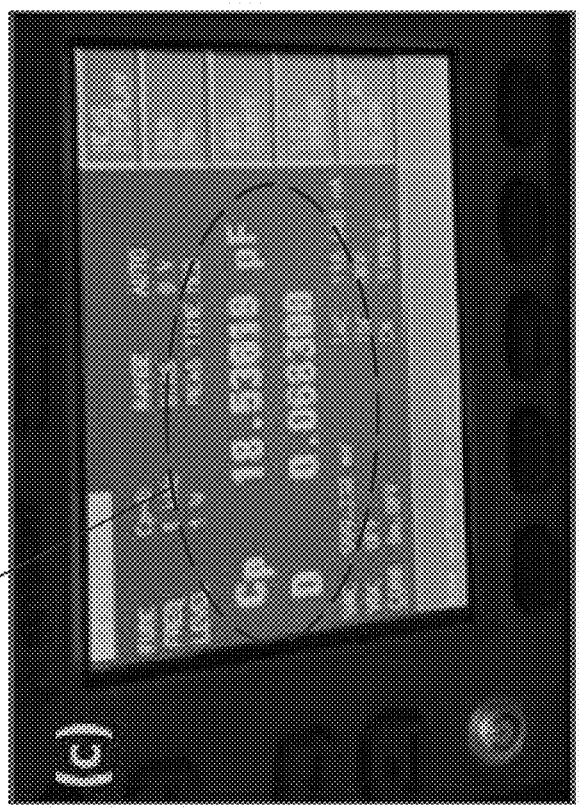

FIGS. 16A-D—Measurement of capacitance of capacitors such as FIG. 15A, in particular: FIG. 16A—Background capacitance before loading capacitor, FIG. 16B—Initial capacitance, FIG. 16C—Capacitance read with a force applying on the top of the capacitor, FIG. 16D—Capacitance after releasing the force.

Figure 15B:
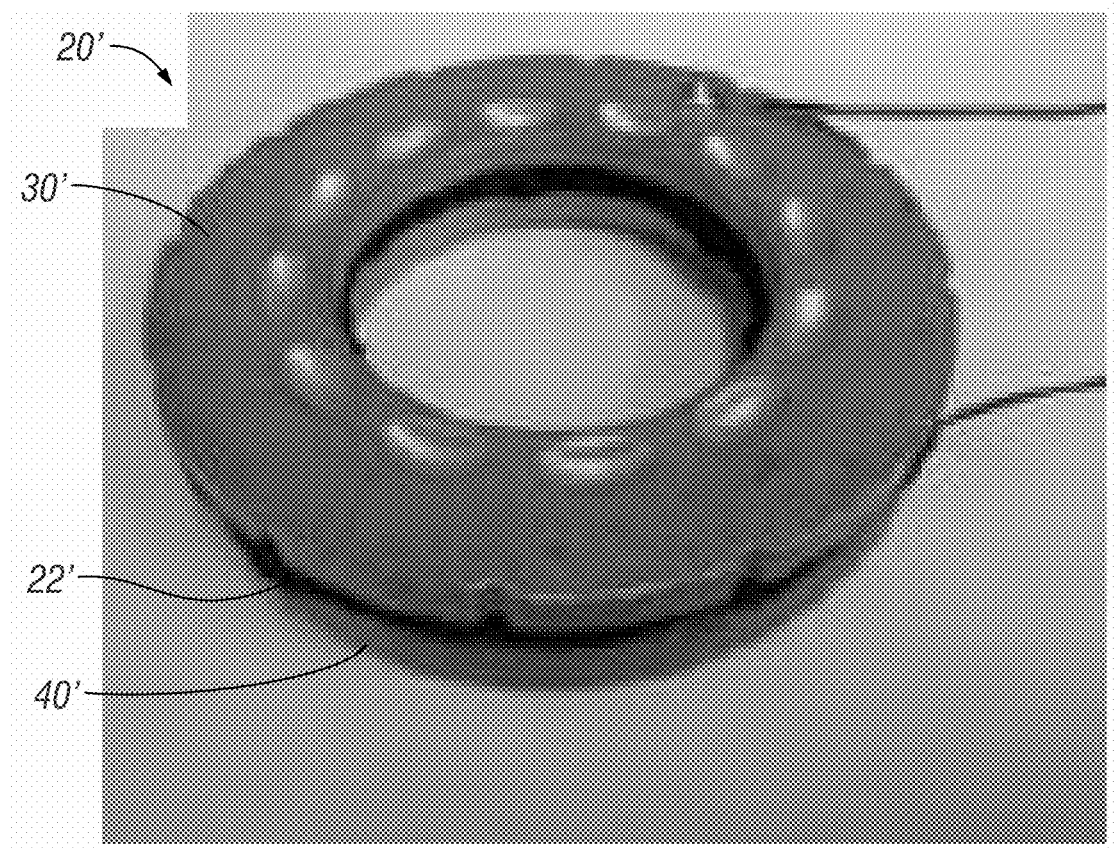
Figure 15C:
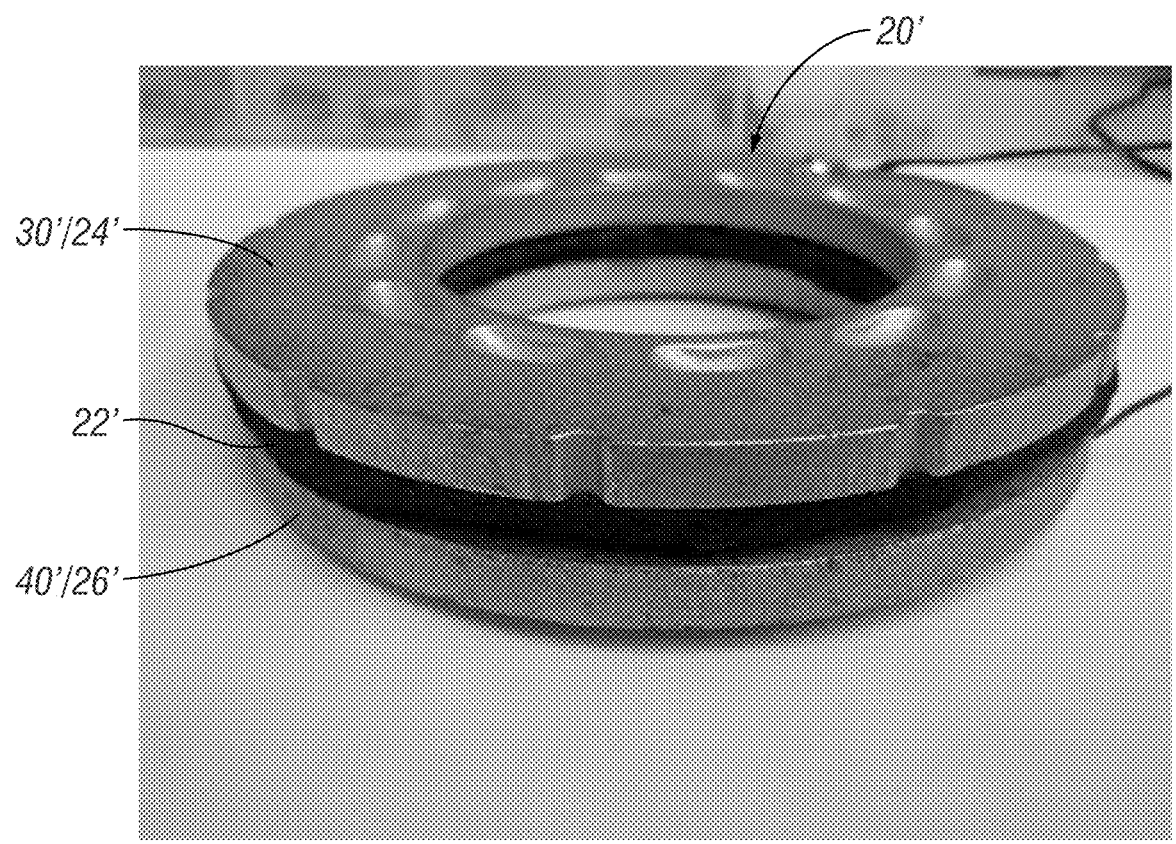
Figure 15D:
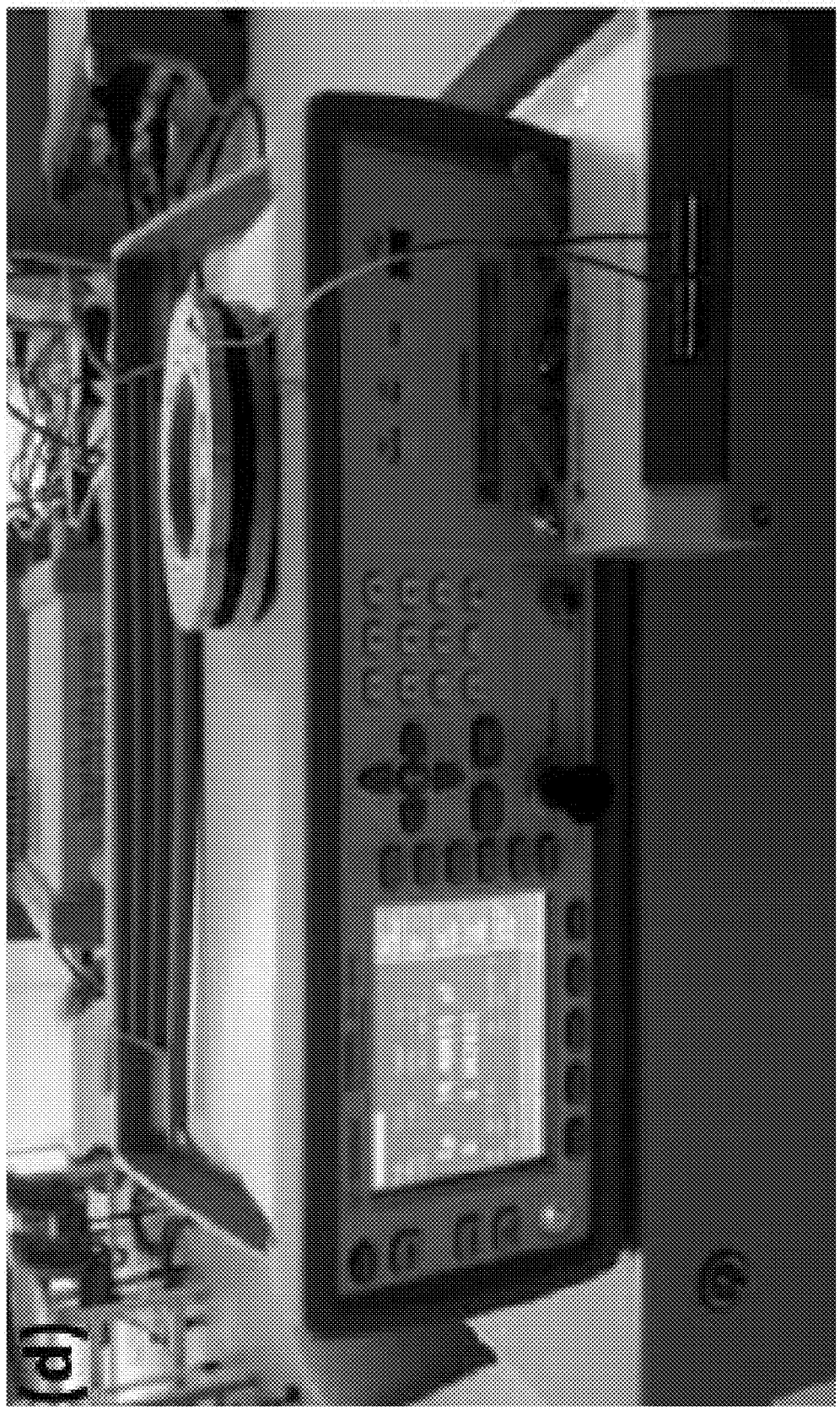
Figure 17A:
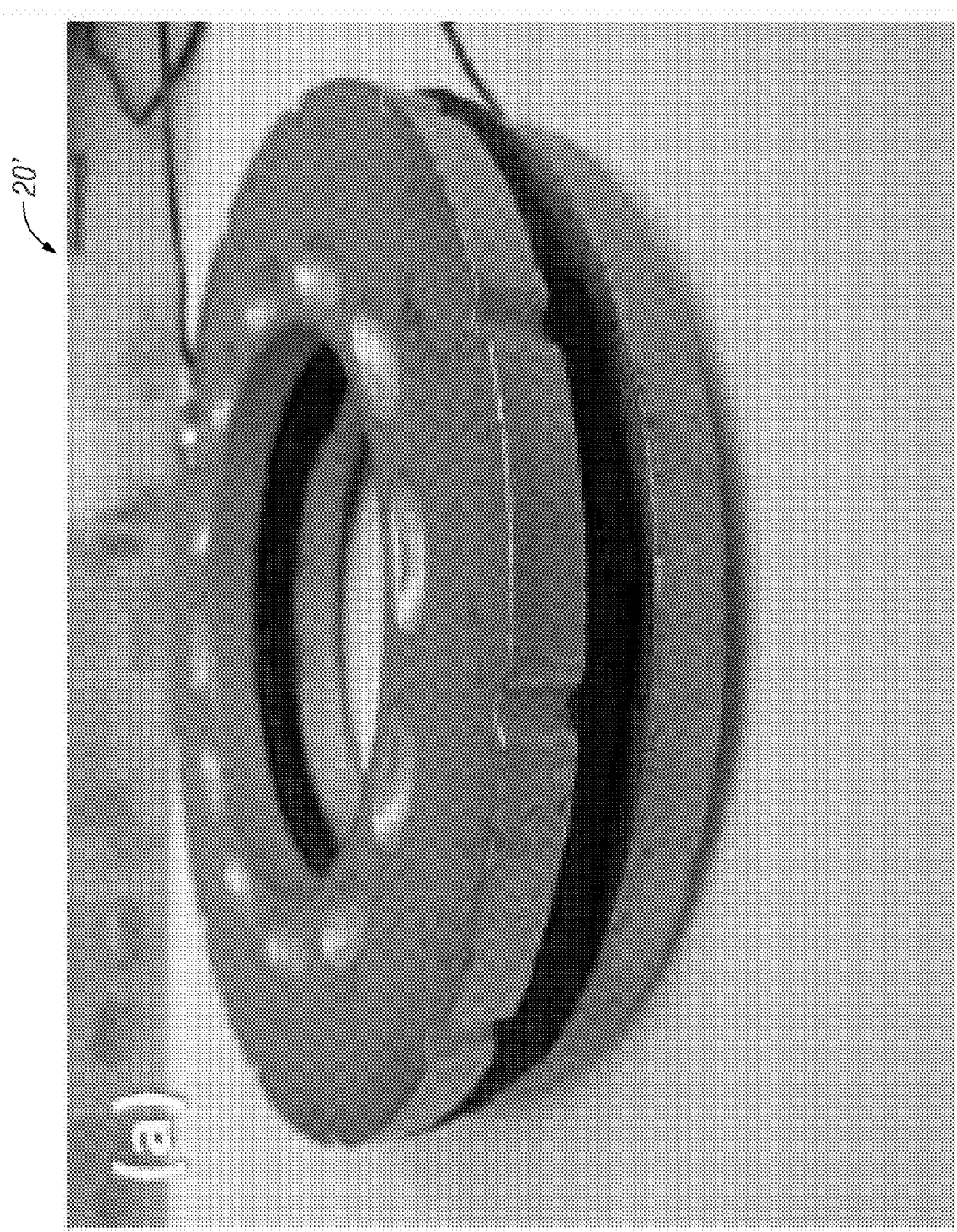
Figure 17B:
Figure 17C:
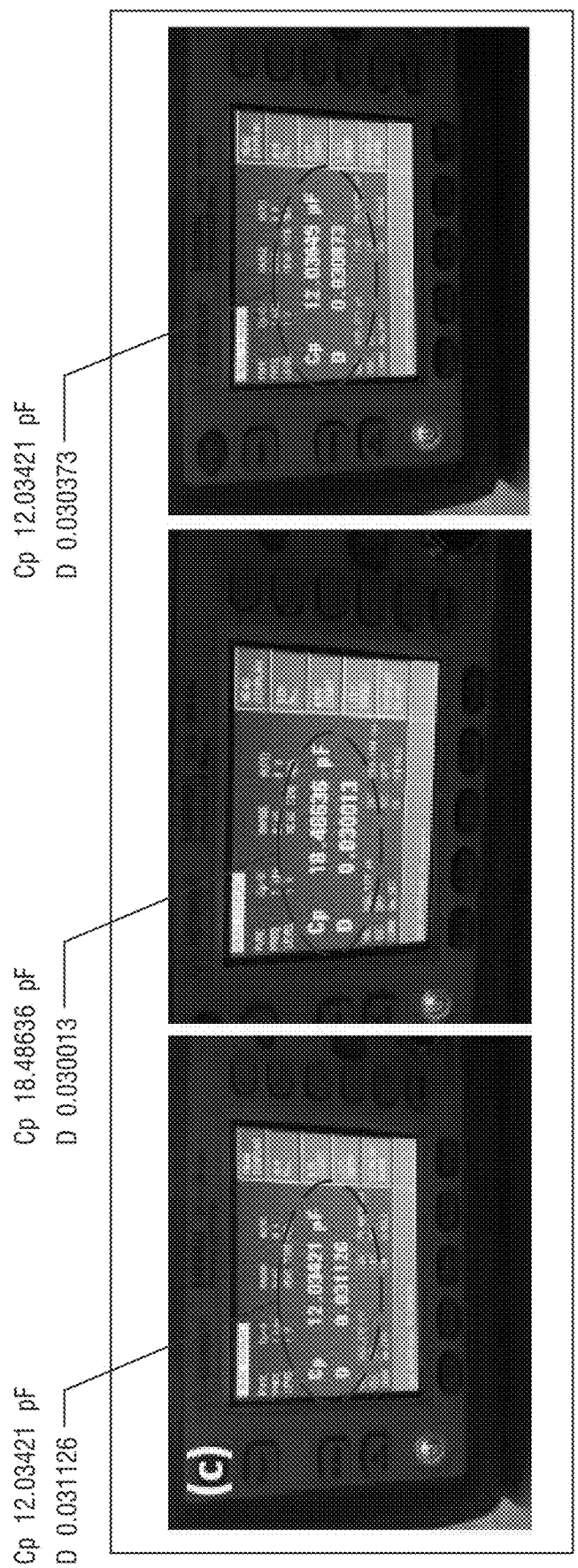
Figure 17D:
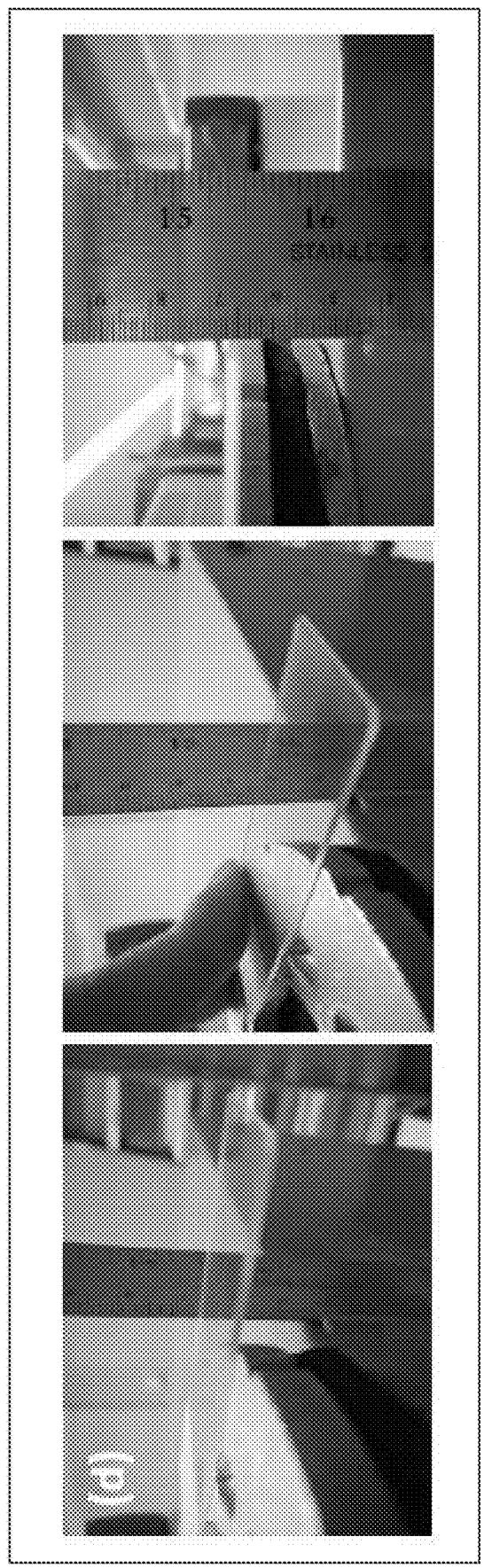

FIGS. 17A-D—Experimental results for the capacitance measurement of rubber capacitor such as in FIG. 15D, in particular: FIG. 17A—Rubber capacitor, FIG. 17B—Background capacitance (resolution) of the capacitor reader, FIG. 17C—Capacitance read before applying force, FIG. 17D—Capacitance with 0.2 cm deformation.

Figure 18:
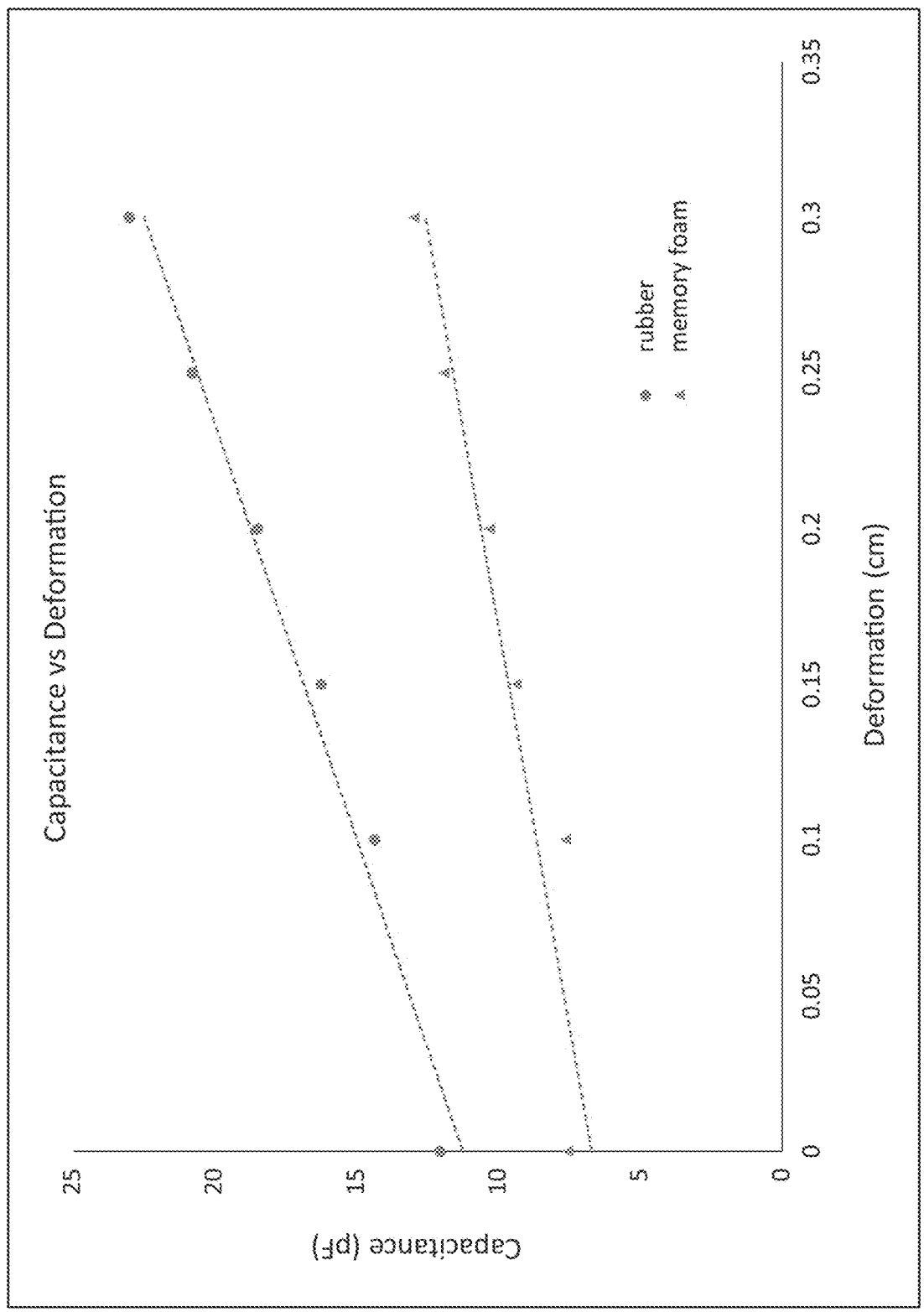

FIG. 18—Plot of capacitance for rubber and memory foam with different deformation for exemplary embodiments of the invention.

Figure 19:
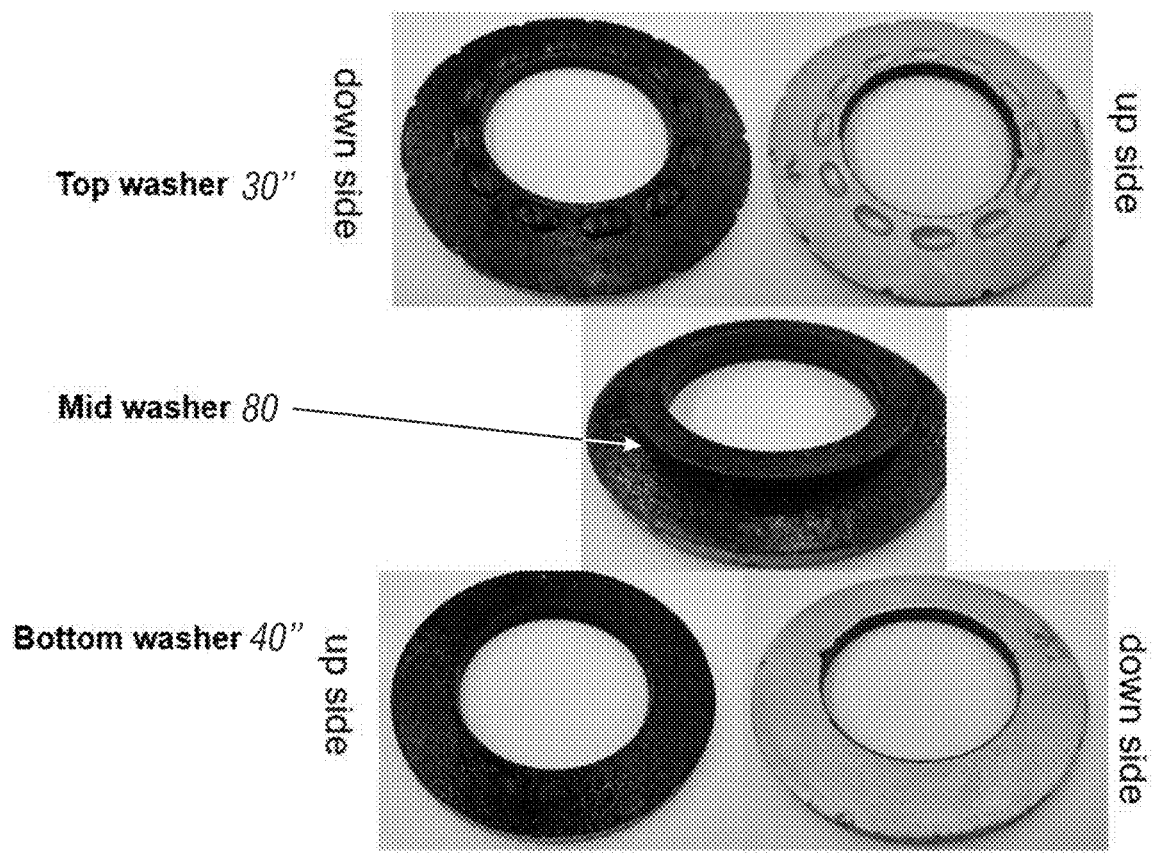

FIG. 19—Application of insulation layer according to an exemplary embodiment of the invention.

Figure 20:
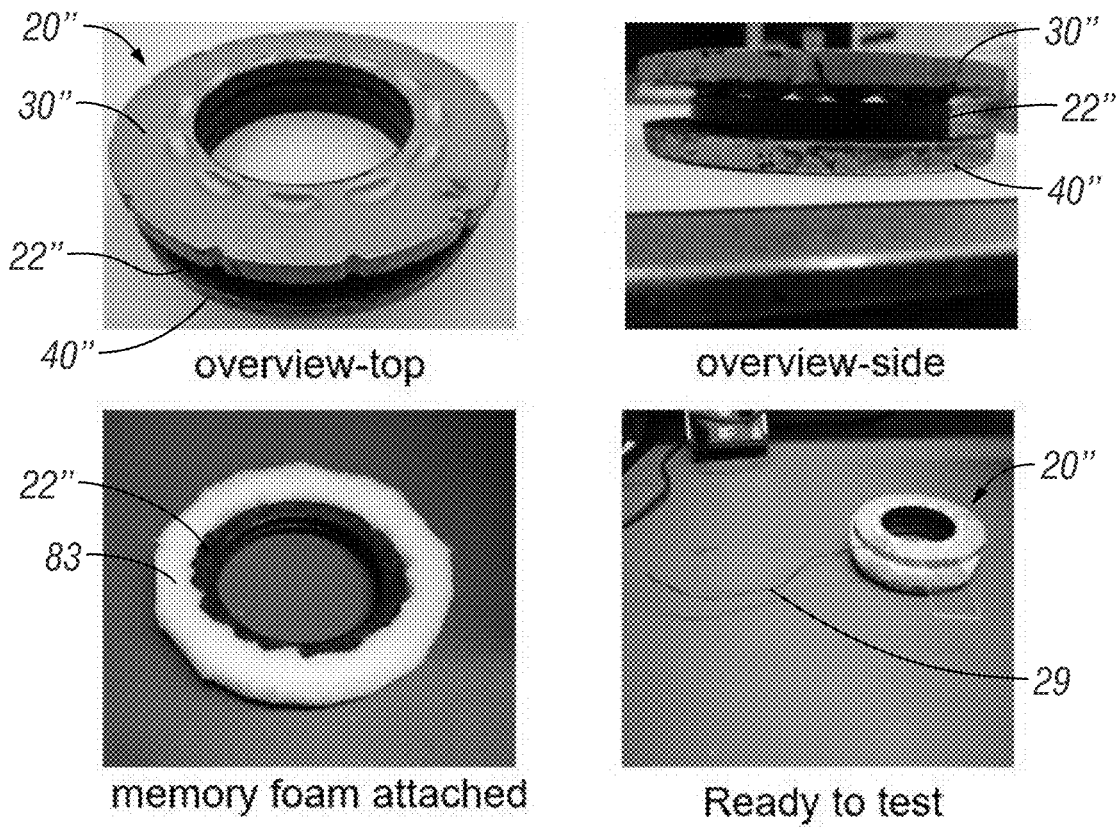

FIG. 20—Assembled memory foam capacitor of FIG. 19.

Figure 21:
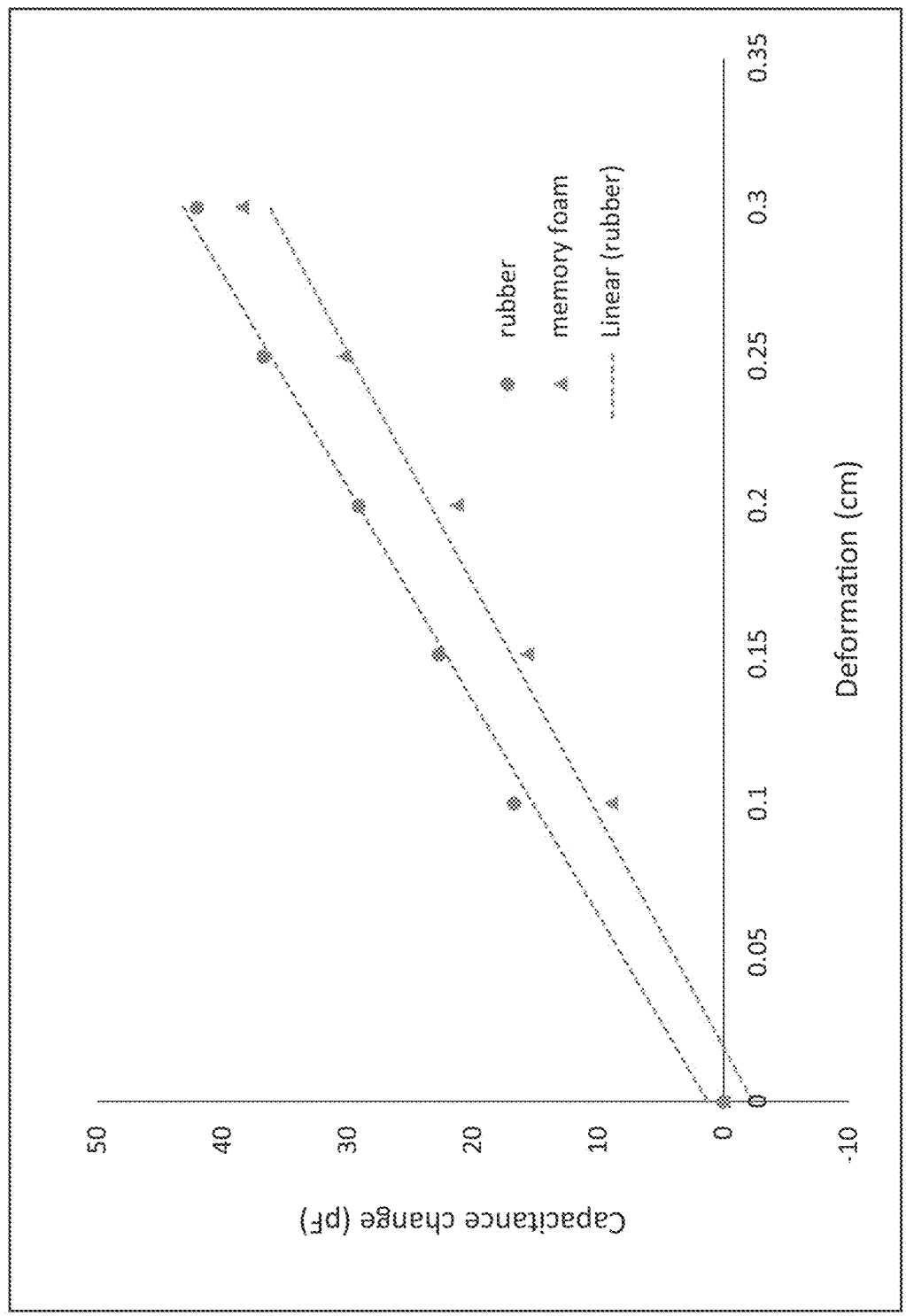

FIG. 21—Plot of the capacitance for rubber and memory foam as the insulation material in the capacitors according to different deformation and different embodiments of the invention.

Figure 22:
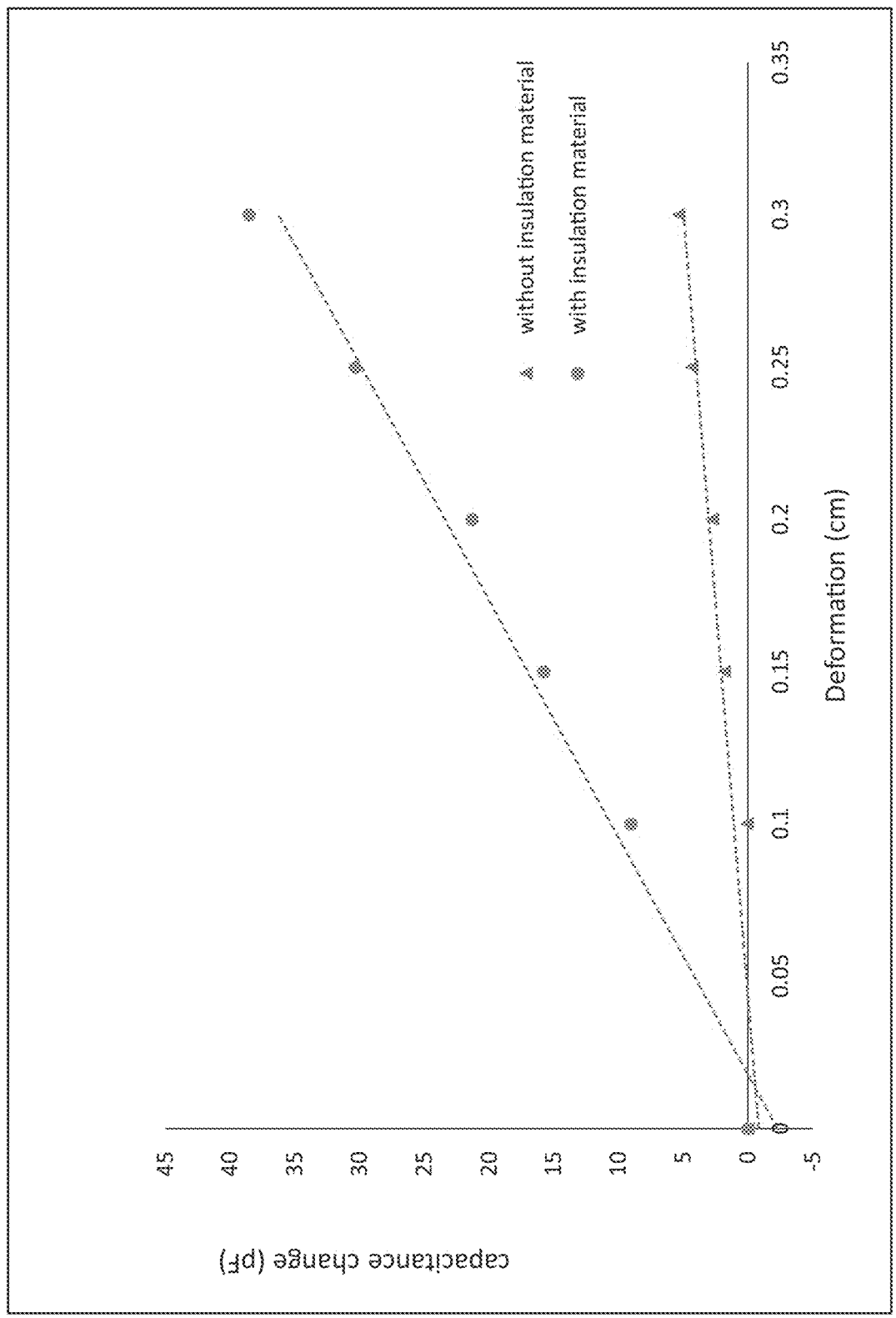

FIG. 22—Plot of the effect of the insulation material on capacitance change for memory foam capacitor according to embodiments of the invention.

Figure 23A:
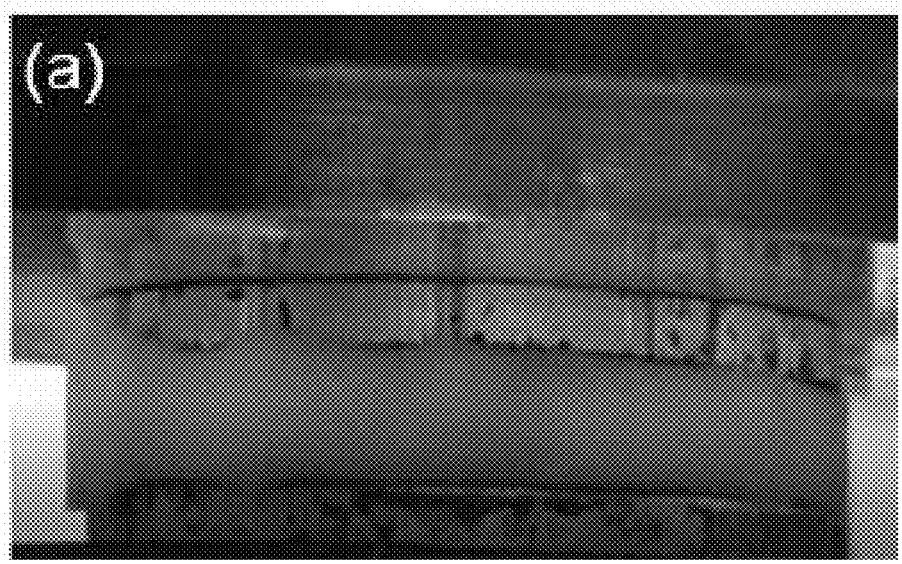
Figure 23B:
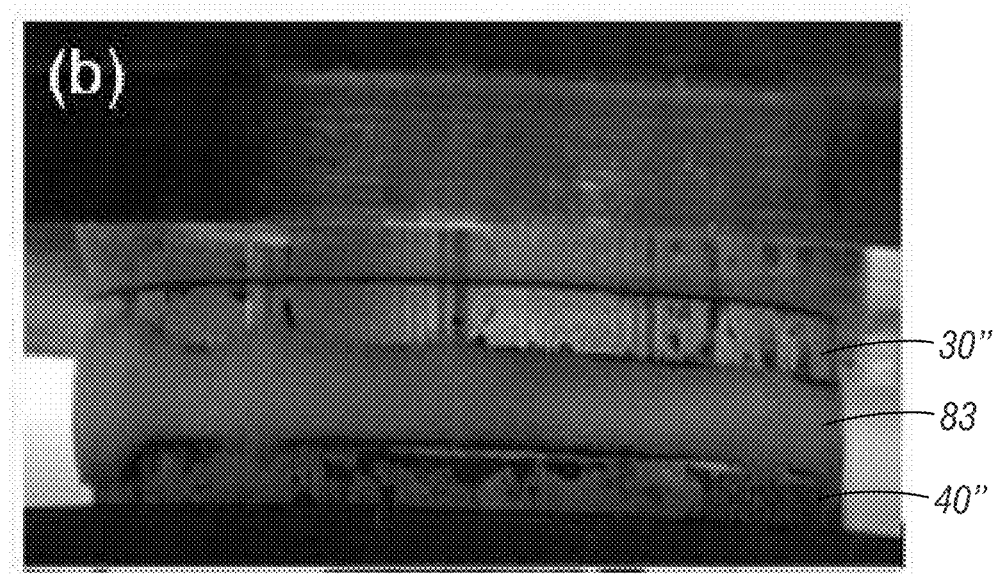

FIGS. 23A-D—Force loading test by MTS machine for proof of concept of the invention, in particular: FIG. 23A—Capacitor loaded on the mechanical stage ready to test, FIG.

Figure 23C:
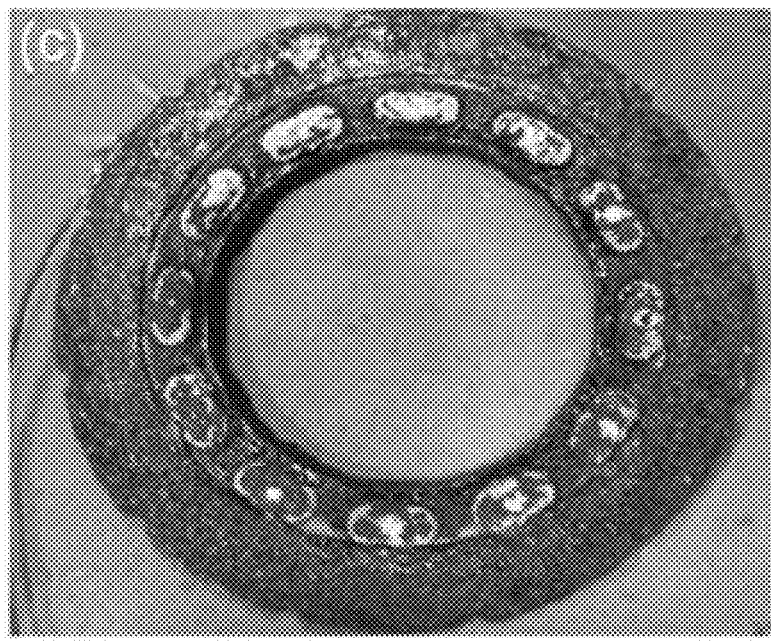
Figure 23D:
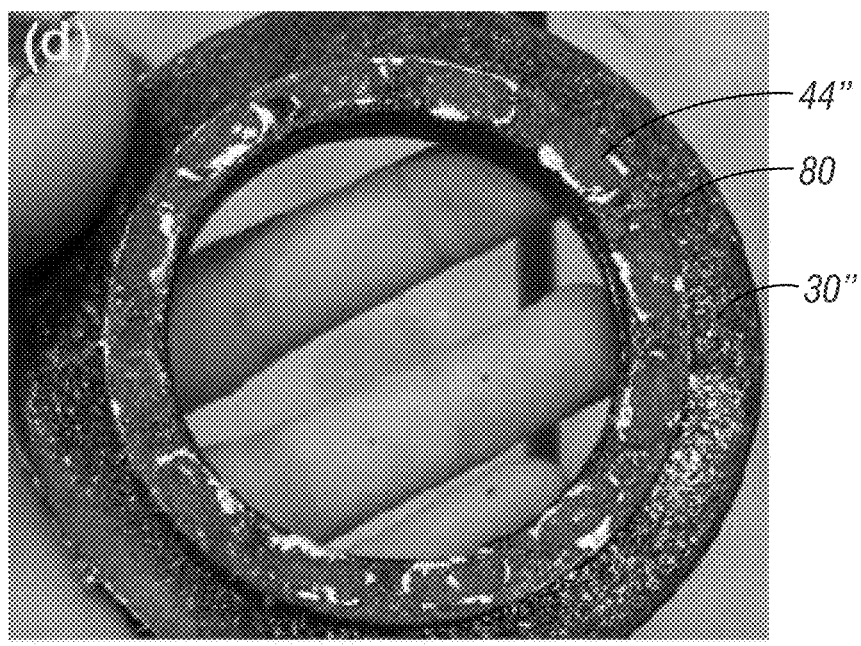

23B—After loading force, FIG. 23C—Damage on top DTI washer, FIG. 23D—Damage on the middle cut washer.

Figures 24A, 24B:
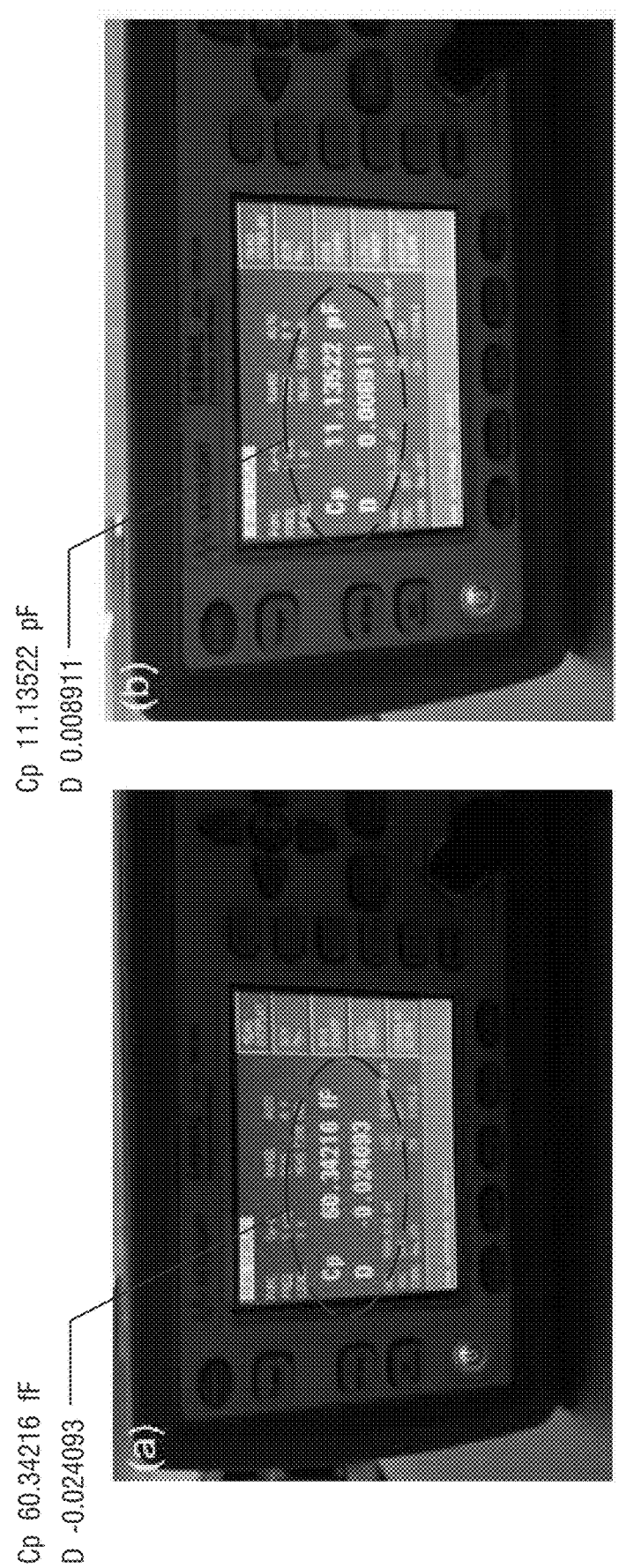
Figure 24D:
Figure 24C:
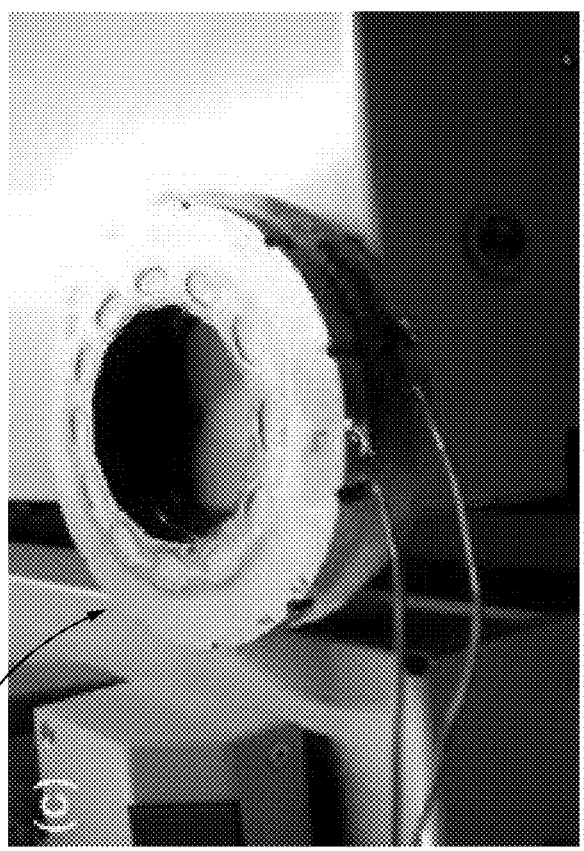

FIGS. 24A-F—Capacitance measurement for proof of concept of the invention, in particular: FIG. 24A—Background capacitance, FIG. 24B—Capacitance before force loading test, FIG. 24C—After force loading test ready to measure capacitance, FIG. 24D—Apply force on the capacitor to zero the gap, FIGS. 24E and F—Capacitance read from FIGS. 24C and D.

Figure 25B:
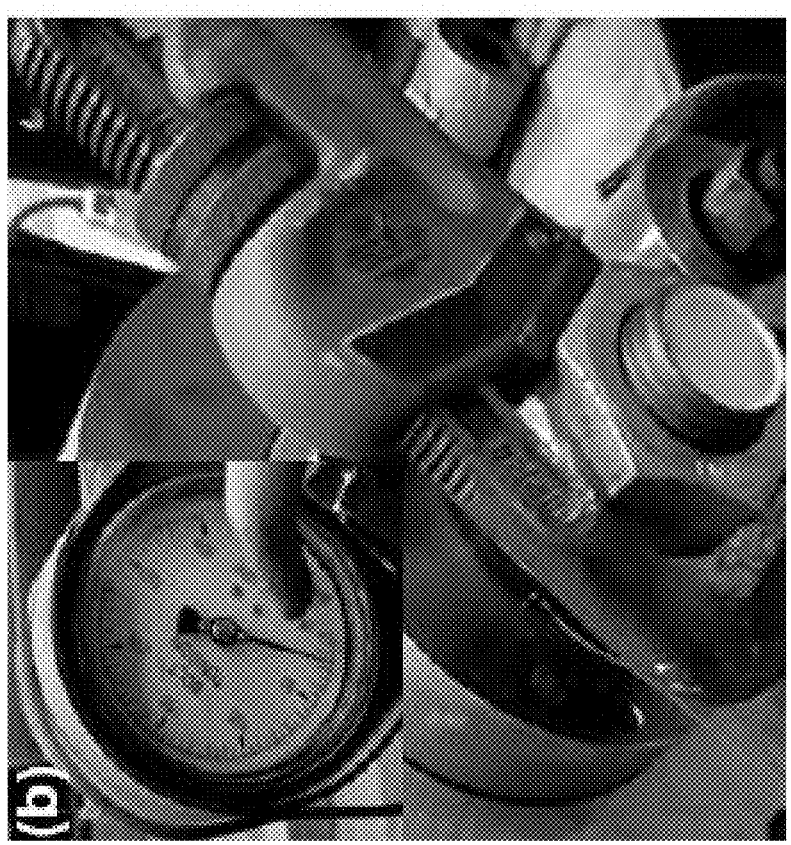
Figure 25A:
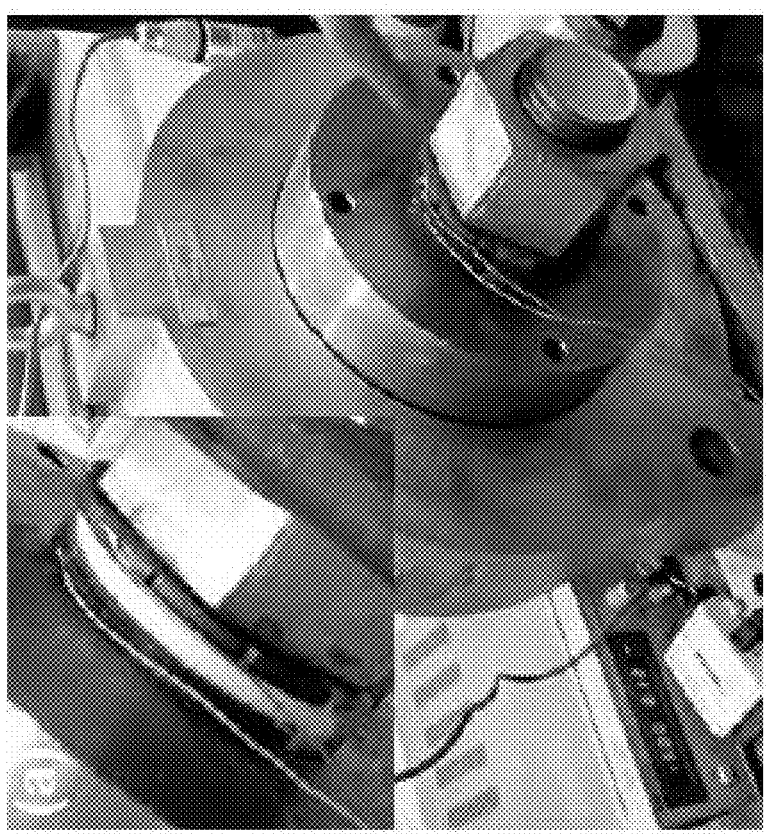
Figure 25D:
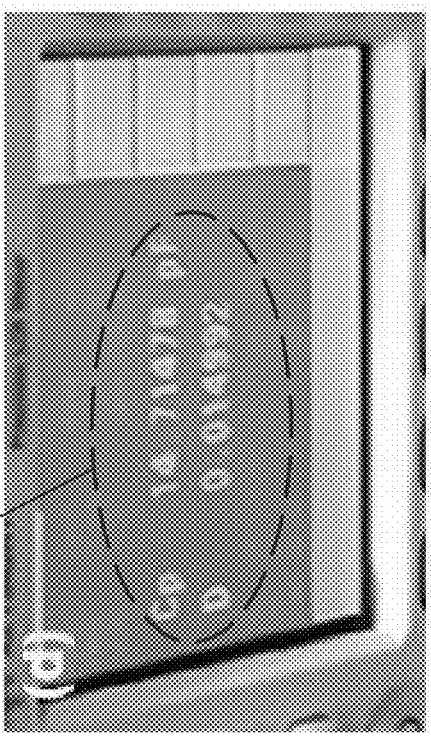
Figure 25C:
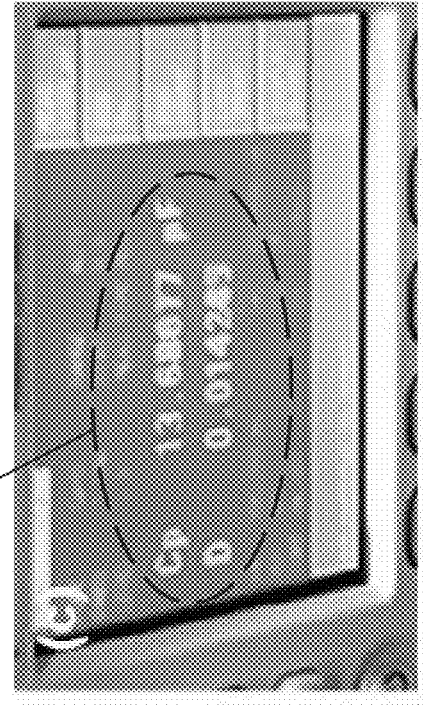
Figure 25F:
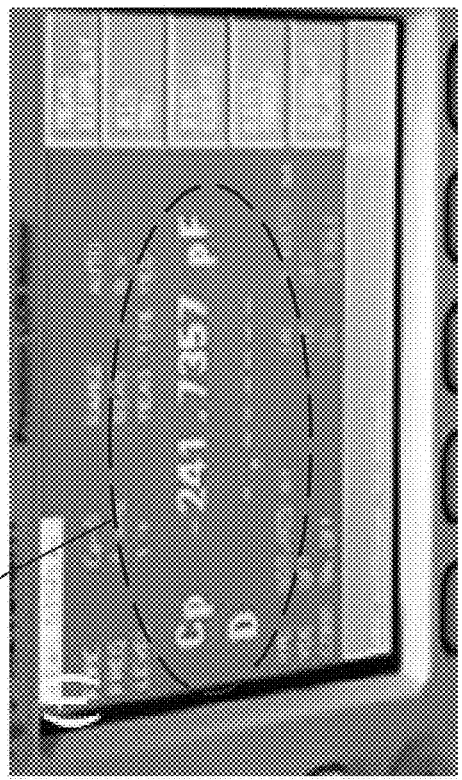
Figure 25E:
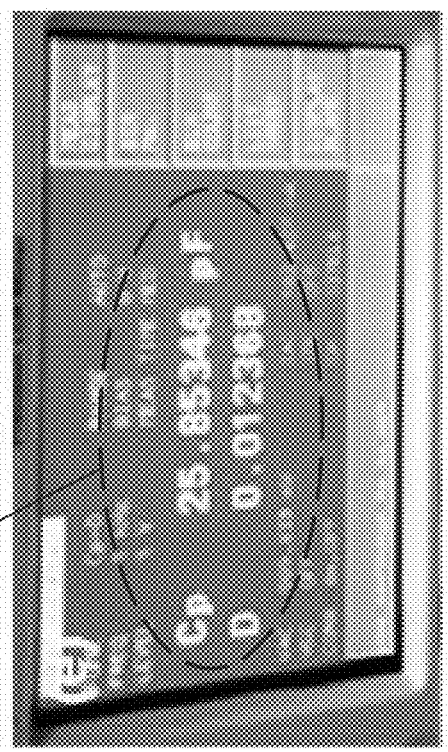

FIGS. 25A-F—Skidmore-Wilhelm Tension Measurement for proof of concept of the invention, in particular: FIG. 25A—Test machine setup, FIG. 25B—2,000 lb bolt tension applied, FIG. 25C—Memory foam capacitor initial capacitance value before force apply, FIG. 25D—Memory foam capacitor capacitance after force applied, FIGS. 25E and F—Values for the capacitor.

Figure 26A:
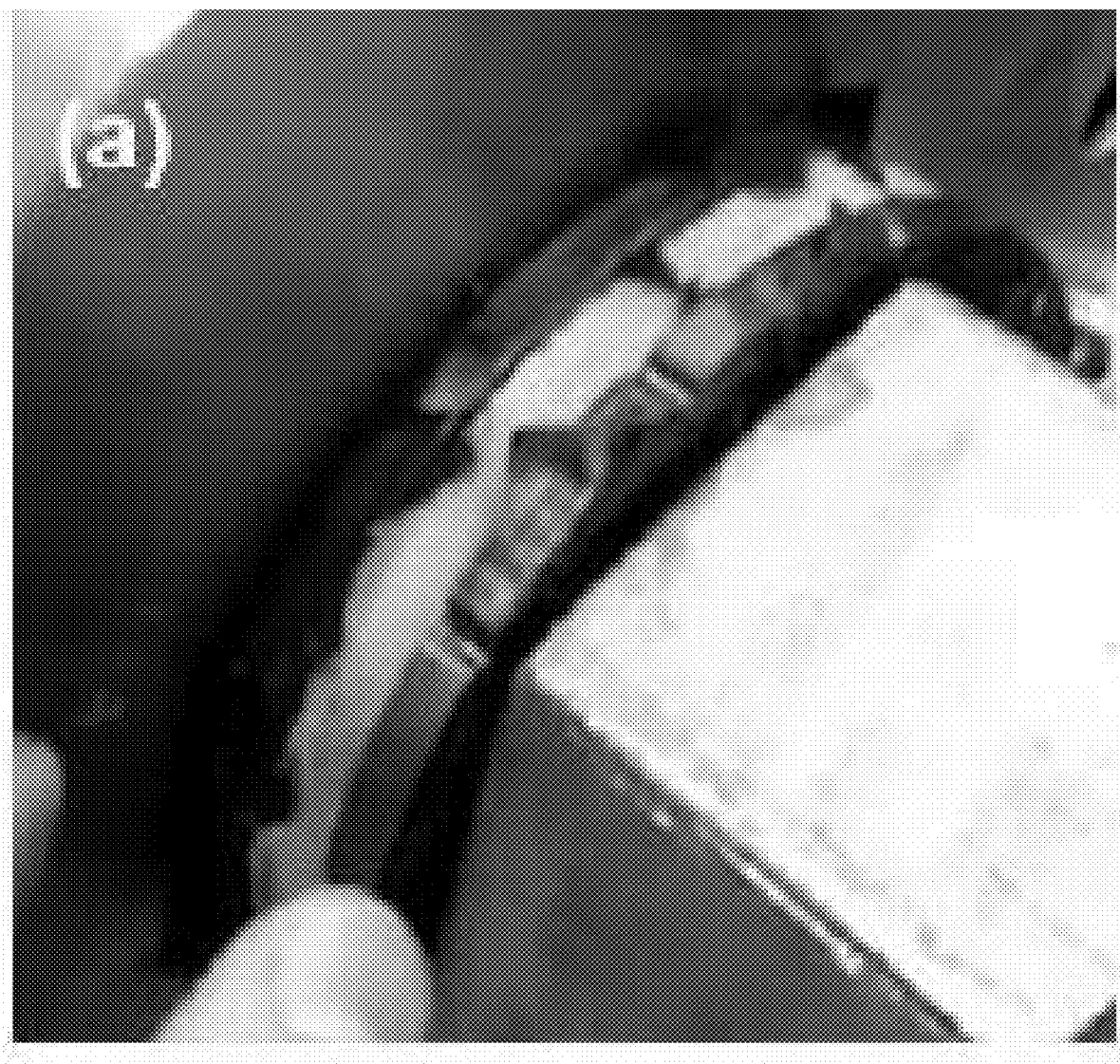
Figure 26C:
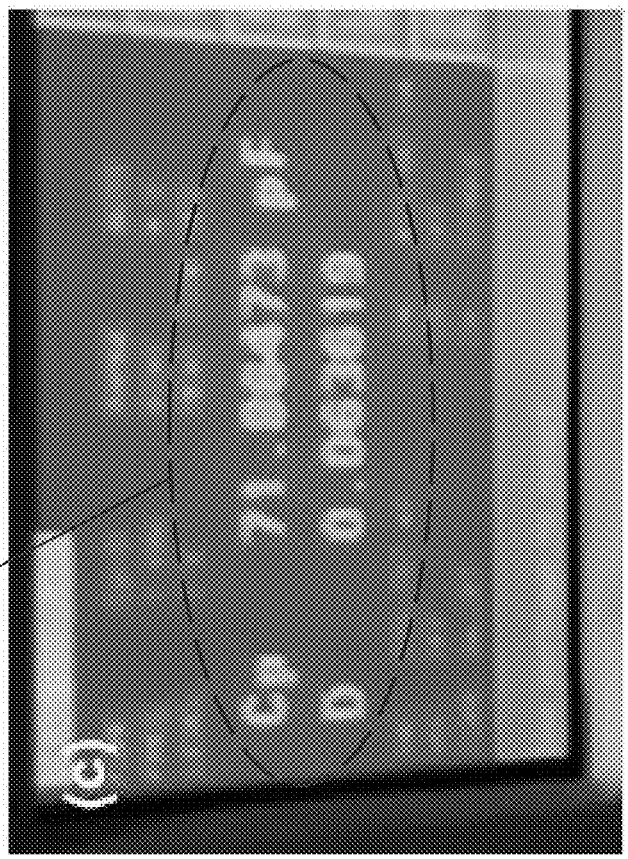
Figure 26B:
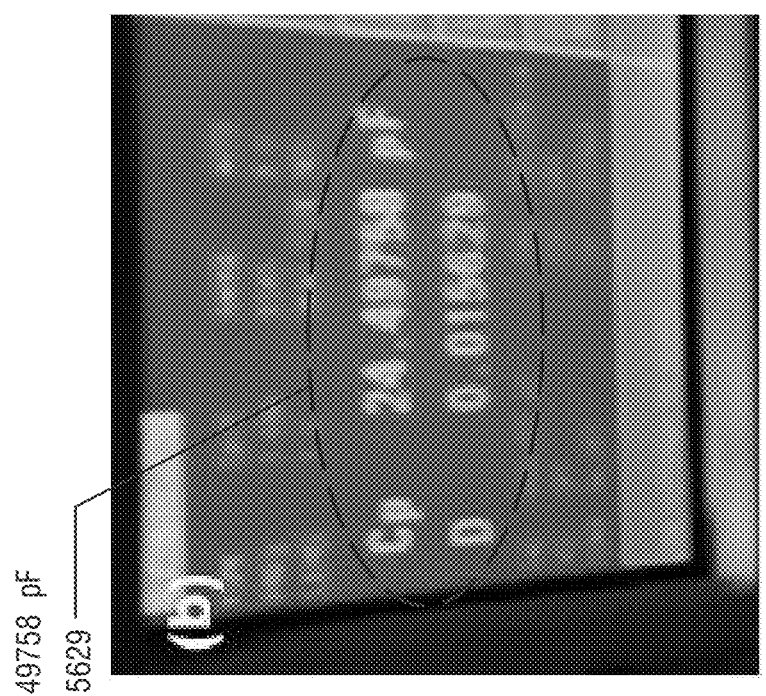
Figure 26D:
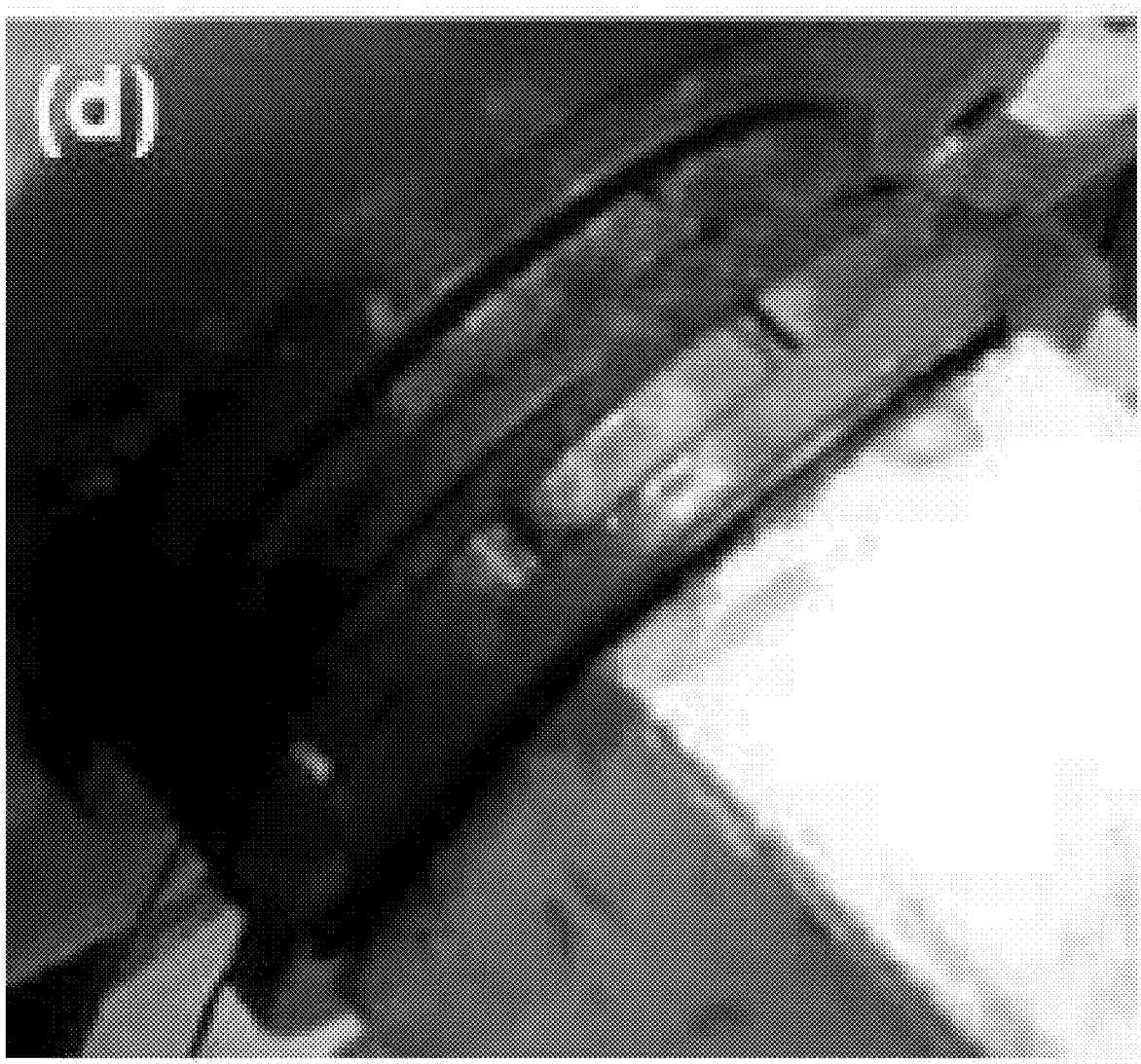
Figure 26F:
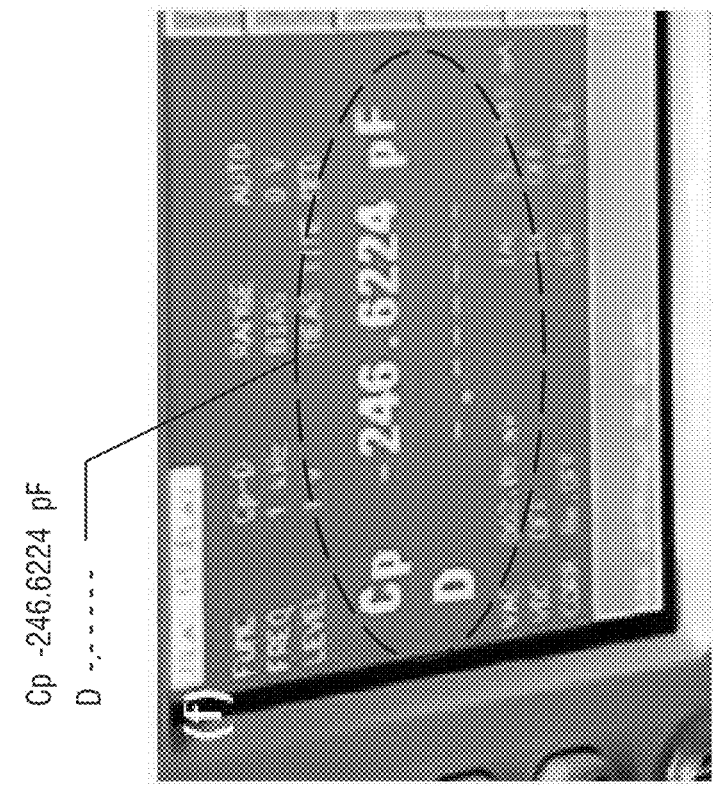
Figure 26E:
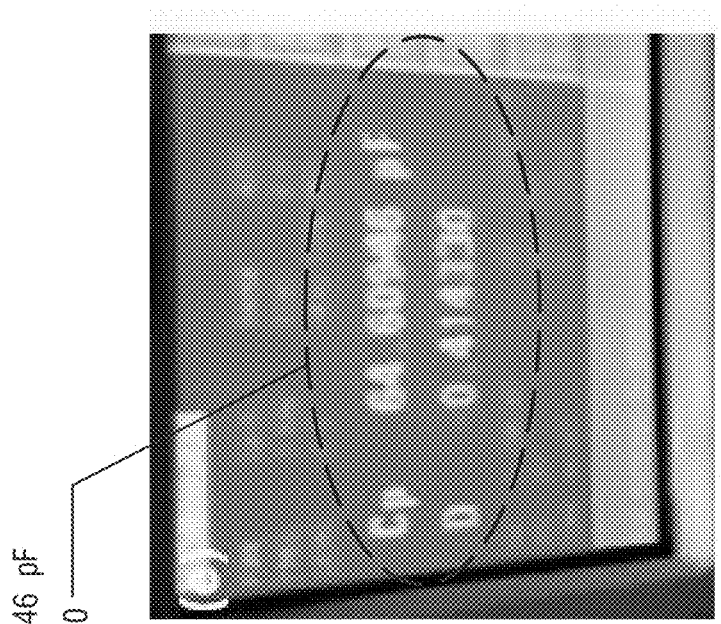

FIGS. 26A-F—Skidmore-Wilhelm Tension Measurement for proof of concept of the invention, in particular: FIG. 26A—Test machine setup, FIG. 26B—2,000 lbf force applied, FIG. 26C—Memory foam capacitor initial capacitance value before force apply, FIG. 26D—Memory foam capacitor capacitance after force applied, FIGS. 26E and F—Values for the capacitor.

Figure 27B:
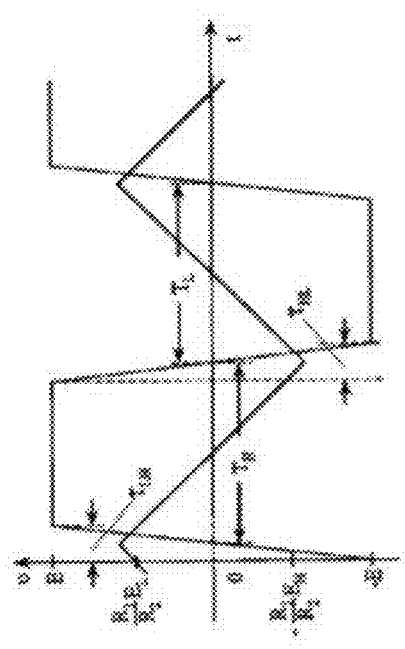
Figure 27A:
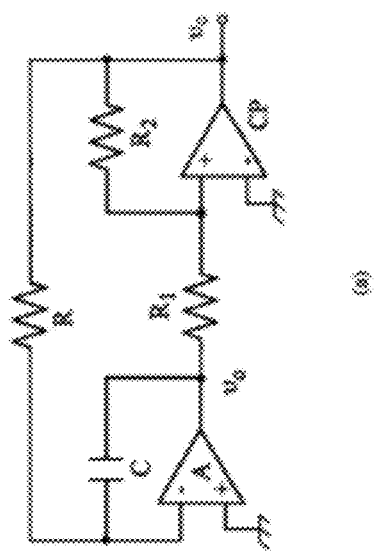

FIGS. 27A and B—First circuit design for capacitance measurement according to exemplary embodiments of the invention, in particular: FIG. 27A—Relaxation oscillator design, FIG. 27B—Oscillation period.

Figure 28B:
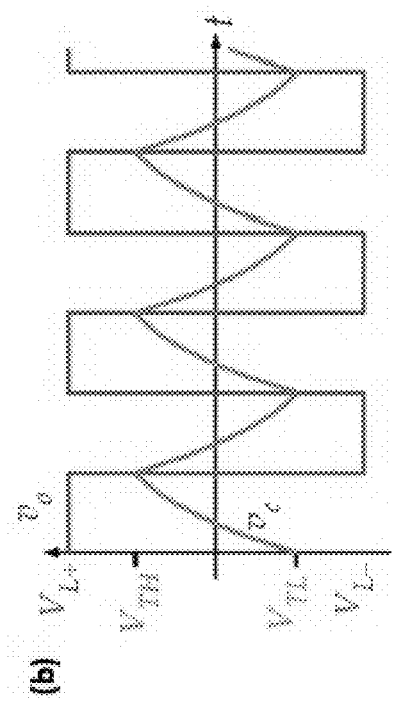
Figure 28A:
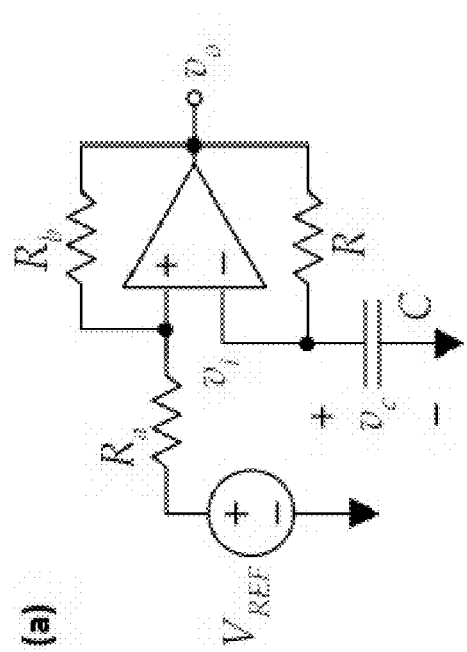

FIGS. 28A and B—Second circuit design for capacitance measurement according to exemplary embodiments of the invention, in particular: FIG. 28A—Relaxation oscillator design, FIG. 28B—PWM wave generated by relaxation oscillator.

Figure 29A:
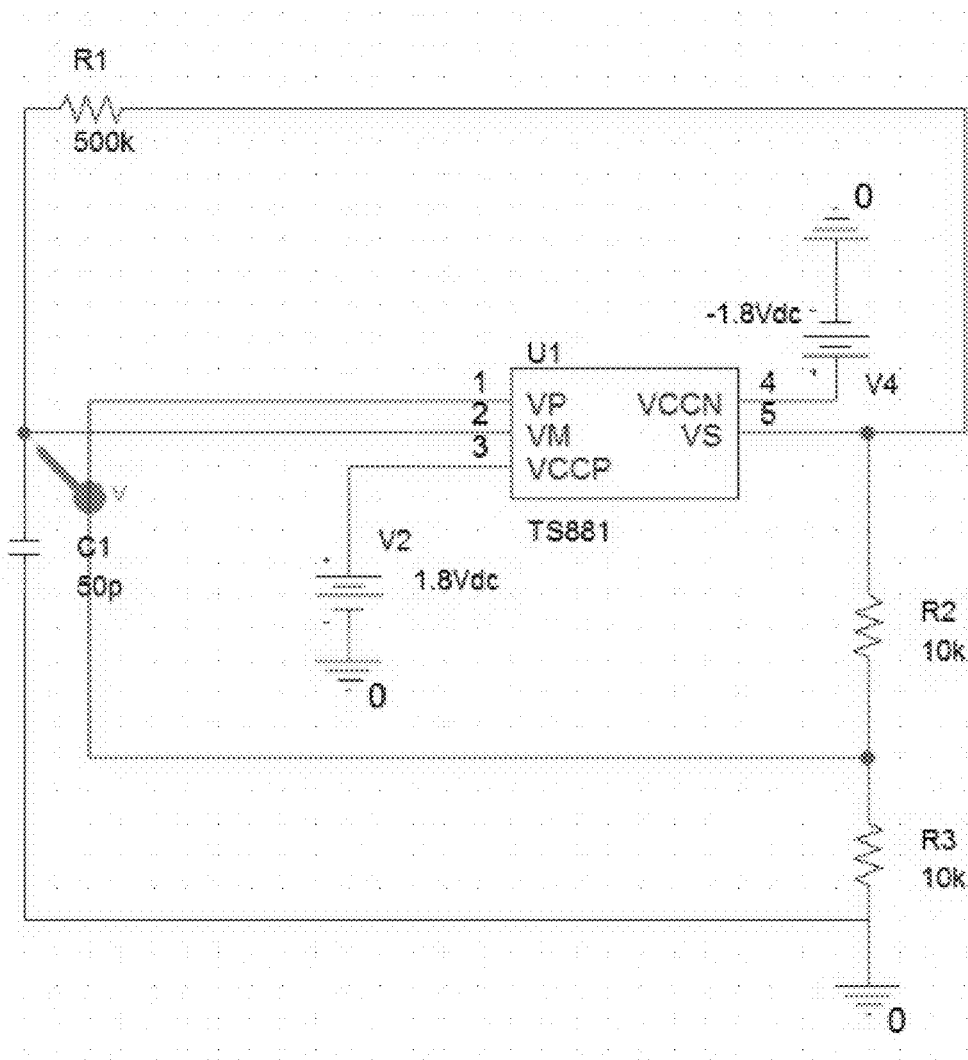
Figure 29B:
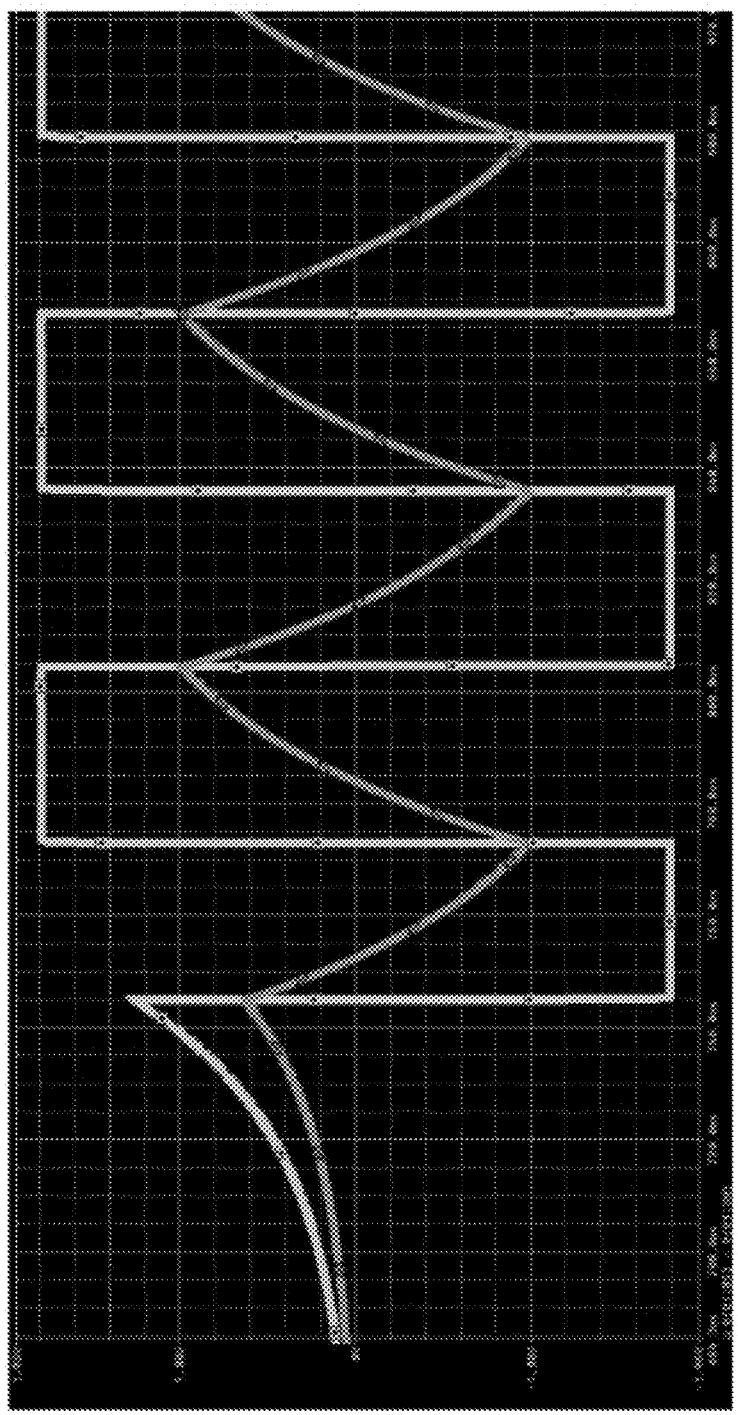

FIGS. 29A and B—Circuit implementation and PMW wave period measurements according to exemplary embodiments of the invention, in particular: FIG. 29A—Circuit implementation on breadboard, FIG. 29B—Testing results of first trial showing simulated PWM wave period of 62 μs.

Figure 30A:
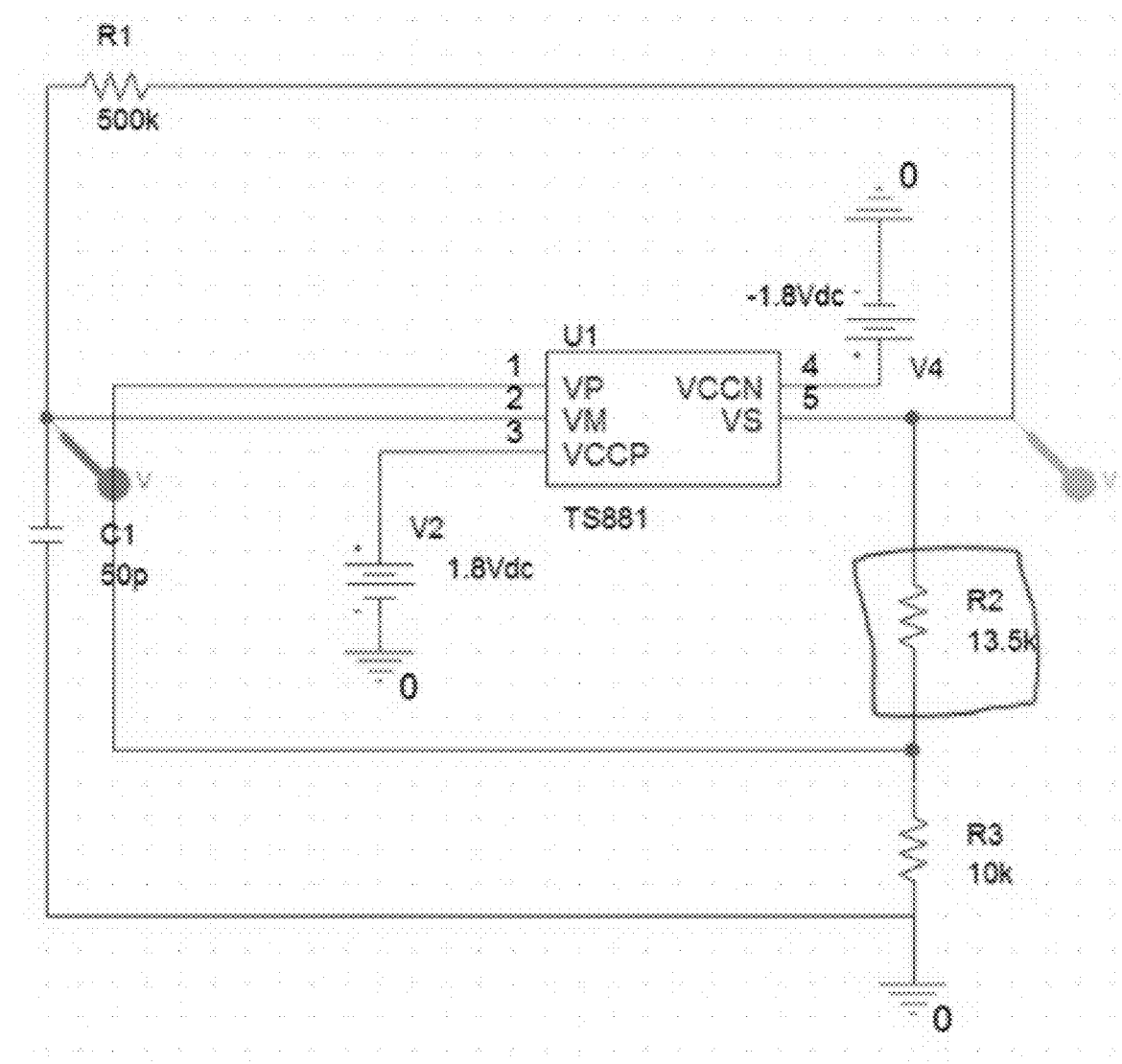
Figure 30B:
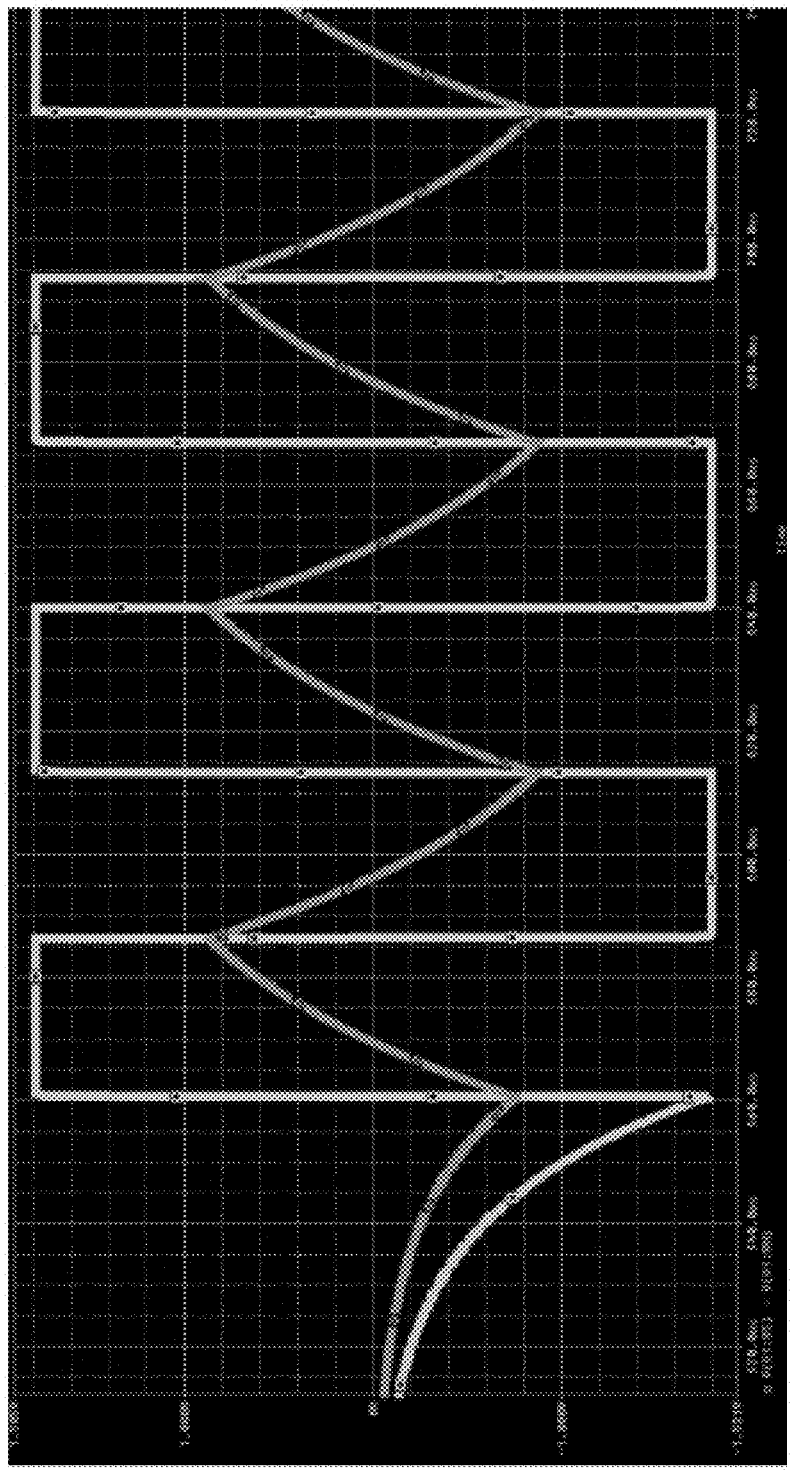

FIGS. 30A and B—Circuit implementation and PMW wave period measurements according to exemplary embodiments of the invention, in particular: FIG. 30A—Circuit implementation on breadboard with increased R2 value, FIG. 30B—Testing results with altered R2 value showing simulated PWM wave period of 53 s.

Figure 31A:
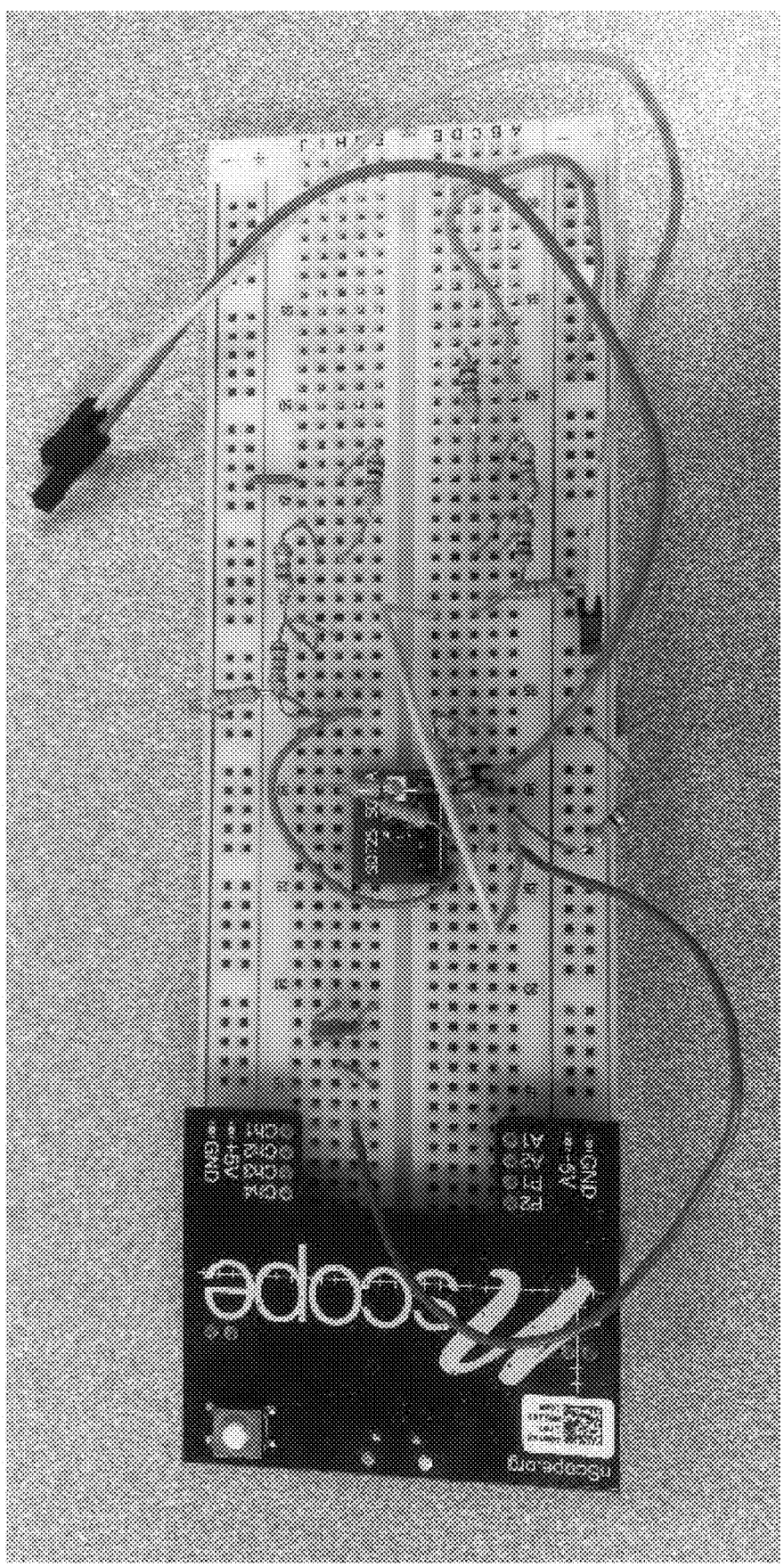

FIGS. 31A and B—Improvements for further capacitance measurements according to aspects of the invention, in particular: FIG. 31A—Breadboard utilized in lab, FIG. 31B—Preliminary version of Printed Circuit Board.

Figure 32:
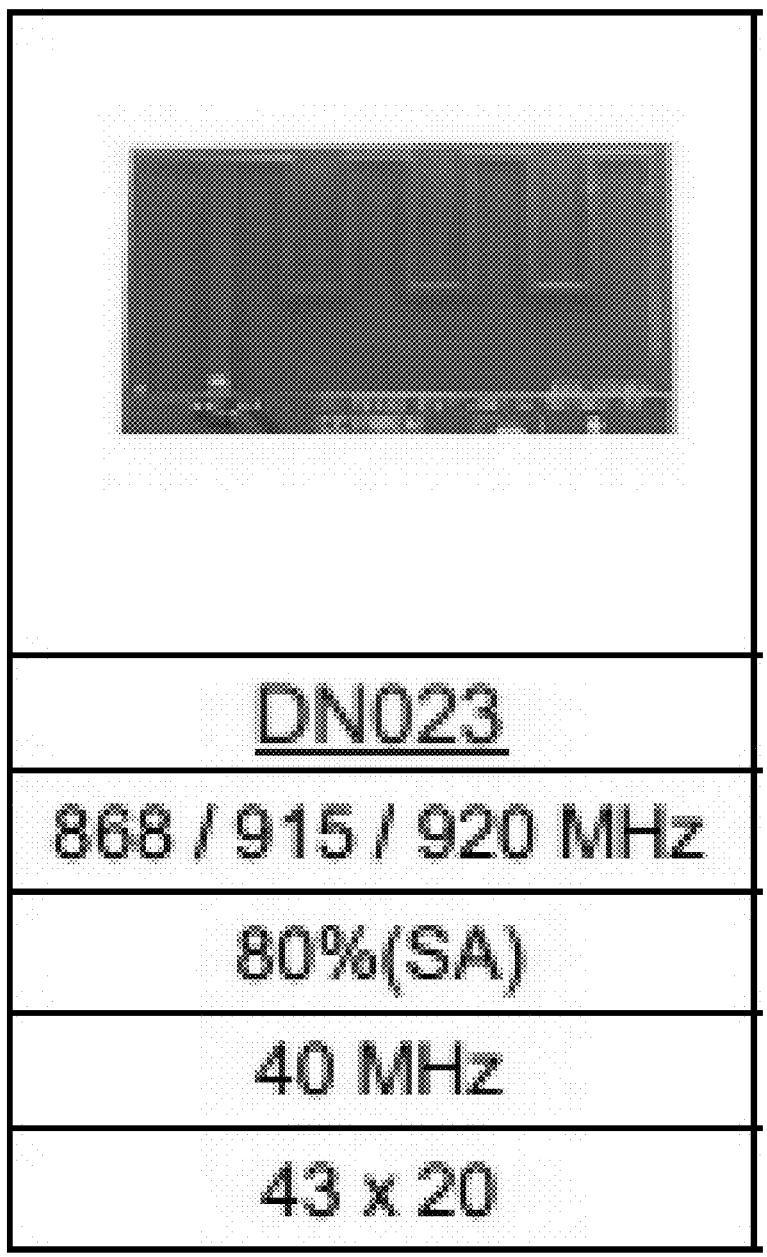

FIG. 32—One exemplary embodiment of an antenna design such as could be used with exemplary embodiments of the invention.

IV. DETAILED DESCRIPTION OF EXEMPLARY EMBODIMENTS OF THE INVENTION

A. Overview

For a better understanding of the invention, examples of forms and configurations that the invention can take will now be described in detail. Frequent reference will be made to the appended drawings. Reference will also be made to the appendices for supporting material.

It is to be understood that the following examples and embodiments are neither inclusive nor exclusive of all forms the invention can take. Variations obvious to those skilled in this technological field will be included.

Figure 1:
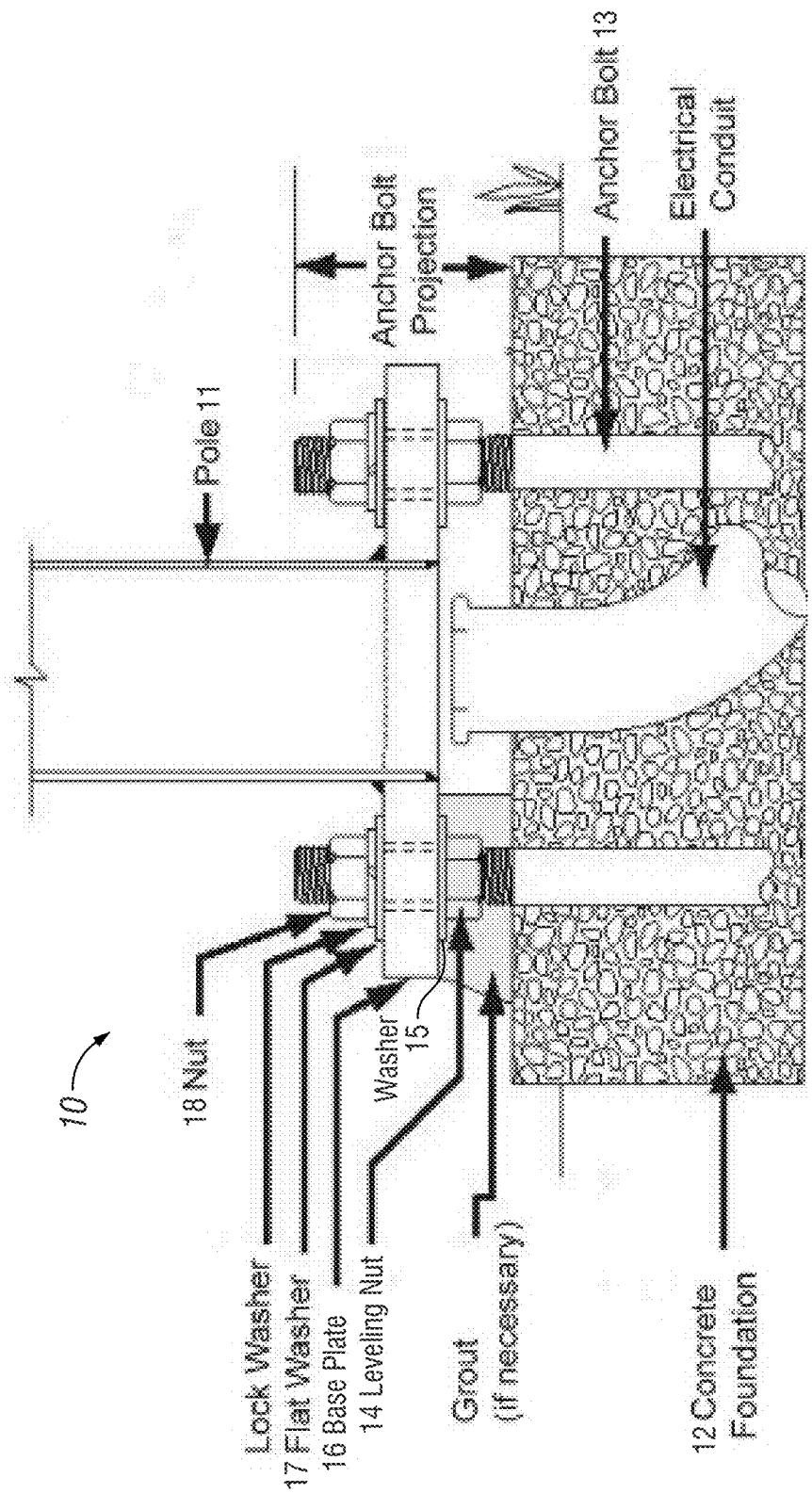

For example, the examples will be discussed in the context of typical anchor bolt arrangements between large-mass, in-ground foundations having a set of upward extending embedded anchor bolts. A base plate on the structure to be anchored has matching holes for the pattern of the embedded anchor bolts on the in-ground foundation. One set of nuts are threaded on the anchor bolt shafts underneath the base plate. Another set of nuts are threaded down towards the base plate on the opposite or top side. In this manner, by tightening at least one set of nuts (usually the "leveling" nuts below the base plate), the base plate is clamped between the nuts along the threaded anchor bolt shafts. FIG. 1 shows a typical such installation of double nut moment joints. It is to be understood there could be other methods of compression relative to a base plate or other clamped structure. But the double nut moment joint examples described herein teach the basic operating principles that can be applied by the skilled person to other configurations.

The following embodiments are also in the context of elevated structures of the type of tall poles or columns such as can support large area light fixtures (luminaires), streetlights, highway signs, and the like (e.g. SLTS or analogous installations). Many times, these are out-of-doors and exposed to a range of environmental conditions (rain, snow, wind, debris). What is to be understood, however, is that the invention can be applied in analogous ways to other anchored structures utilizing anchor bolts as well as possibly other bolt/nut combinations.

B. Generalized Example

As discussed herein, some attempts at allowing monitoring of anchor bolt installation and status include simply relying on torque wrenches for appropriate installed bolt tension and then manual checking with a torque wrench thereafter. However, a number of publications have explained why this can lead to inaccurate results. See, e.g., references [1], [2], [3], [4], [5], and [9]. Another approach is building into the anchor bolts some type of sensor from which bolt tension can be indirectly estimated. U.S. Pat. No. 7,412,898 to inventors Smith et al. (incorporated by reference herein) is an example. This patent describes how an RFID tag on a bolt can communicate a measurement related to applied tensile load on the bolt to an RF reader. See also reference [3]. Others have recognized that washers are typically used with anchor bolts. See for example FIG. 1 and references [1] and [2]. Some specific washer types have been proposed. See FIGS. 3 and 5 for conventional DTI washers. Some attempts propose things like piezoelectric strain gauges embedded in the washers or simply adding surface features to the pair of washers that can visually show whether correct tension is on the bolt. See reference [2]. The former requires either manual use of a feeler gauge to confirm within-range bolt tension or visual observance of a viscous material which "squirts out" if sufficient bolt tension is achieved. This brings into play the requirement of manual checking by feeler gauge or visual inspection at each bolt, which is time-consuming and can introduce human error. The latter requires some sort of hardwired connection between a hand-held processor and the on-bolt piezo-based strain gauges. This requires manual carrying and connection of the portable reader to each bolt. Either would be cumbersome and time-consuming when testing many anchor bolts.

With reference to FIGS. 10A and B, in its generalized form, one aspect of the present invention to improve on the state-of-the-art places a stand-alone, retrofittable/or/OEM compression sensor assembly along the bolt between bolt head or nut and a base plate (or other member to be clamped).

As shown in FIGS. 10A and B a unifying principle of the various embodiments of the invention are as follows:
(a) The sensor assembly, in any of its alternatives 20 of FIG. 2, 20' of FIG. 15A, or 20" of FIGS. 11A-C, or in other forms or embodiments, installs along a regular anchor bolt. No modification of the anchor bolt is required. This allows the sensor to be retrofitted. FIG. 10A shows the sensor assembly is exploded view relative the anchor bolt, and FIG. 10B shows it assembled to the anchor bolt.
(b) The sensor assembly includes two surfaces or plates normally held apart by an elastic dielectric material a distance D.
(c) Upon tensioning of the anchor bolt, the forces are such that the elastic material compresses and the distance D between the two plates converges.
(d) An electrical potential can be created between the plates from a source of electrical energy and a transduction of capacitance between the plates measured.
(e) Through calibration methods, a correlation can be made between measured capacitance and bolt tension.

The specific embodiments discussed later provide a few non-limiting examples of ways such a sensor assembly can be designed.

In one embodiment, the compression sensor is on a washer assembly placed along the bolt shaft and includes two capacitor plates (e.g. thin metal layers) spaced apart along the direction of the bolt axis and encapsulated in an elastomeric material which urges the capacitor plates apart. The compression sensor is configured to transduce a capacitance value between the two capacitor plates. As the bolt is tightened or loosened relative the base plate, the spacing between capacitor plates changes, as does the measurable capacitance value between them. The capacitance value can be correlated to calibration values indicative of correct bolt tension versus incorrect bolt tension based on how far the capacitor plates are from one another. This is a more direct measurement of bolt tension than torque measurements, and can support more accurate, precise, and repeatable measurements. Additionally, through miniaturization, circuitry related to such capacitive sensing can be built into or on the washer. This can include circuitry to receive and store the capacitance value and allow that value (or data related to that value) to be remotely sensed. Remote sensing of capacitance values allows efficient measurement and monitoring of any number of such installations.

As will be understood, the compression sensor assembly can take different forms. Several specific examples will be described later. But those skilled in the art will understand that the generalized concept provides at least all the benefits discussed above regarding the invention. A small form-factor, stand-alone washer-type assembly based on capacitance sensing between spaced plates and with RFRD receiver/transmitter allows both retrofitting to existing structures/anchors bolts without modification, does not require protections needed for more fragile piezo-based load cells, and enables stand-off sensing of a sensing assembly at one, plural, or all anchor bolts of a given anchor bolt pattern.

One form of transducing the capacitance value relative to bolt tension is to use two washers. One non-limiting specific embodiment is indicated generally at reference number 20 of FIG. 2. One or more compression sensors between the two washers allows either retrofitting to existing bolts or inclusion as original equipment. In one embodiment, the one or more compression sensors, each with the capacitor plates and elastomer, are installed on one of the washers. The other washer includes a protrusion that can be aligned relative each compression sensor on the other washer. In an installation comprising a double nut moment joint, whether the base plate is (a) moved upwards by tightening a set of nuts underneath, or (b) the nuts above the base plate are threaded down to the base plate, each protrusion in the first washer would abut and then compress the elastomeric material. When the compressive forces in response to tightening overcomes the restoring force of the elastomeric material, the elastomeric member compresses. This would change the distance and thus the capacitance value between the embedded capacitor plates in the elastomeric material. This capacitance value could be correlated to previously calibrated capacitance values for different bolt tensions. The relative displacement of the washers can be transduced as change in capacitance that can be correlated to bolt tension. An RFRD circuit connected to the compression sensor(s) can store the capacitance value(s). A portable remote RFRD-type reader can quickly and efficiently energize the passive on board RFRD circuit and inform the user whether bolt tension is in bounds or out of bounds.

Another specific embodiment can be seen at reference number 20' of FIG. 15A. It utilizes an elastic dielectric between top and bottom washers of the sensing assembly.

Another specific embodiment can be seen at reference number 20" of FIGS. 11A-C. It adds what is called a "mid cut" washer between the top and bottom washers of the sensing assembly.

The invention thus speaks to a methodology and system that combines (a) a more direct measurement of bolt tension with a longevity over years or decades because of (b) the passive nature of the sensing and transmitting components built into the washers. Electrical energy to wake up and energize the transmitting components is wirelessly inductively transferred from the remote-sensing reader to the passive washer circuits to activate them and allows collection of the capacitance readings. No manual inspection of bolt tension or hardwired hook up to the washers or bolts is required.

Utilization of small form factor, inexpensive capacitive sensors and RFRD circuits allow practical use of this paradigm over multitudes of anchor bolts. And, considering longevity of the sensor on the anchor bolts (years or decades), economies of adding such sensors to anchor bolts are further justified.

As will be appreciated, the invention can be implemented in a variety of ways and with a variety of configurations. More specific examples now follow.

C. Specific Example 1

The following discusses a specific example of one form the invention might take. This description is provided to give one a detailed example of a sensor assembly for an anchor bolt tension monitoring system as well as operating principles of how such a sensor would be made, installed, and operated. See, in particular, FIGS. 2-9.

1. Objective

The object of this embodiment (see generally reference number 20) is a smart installation and monitoring system. The primary technical challenges are sensor design, RFRD design, and washer design. Sensor Design. The designer will determine the metal to use for the sensing plates 24 and 26 and the material to use for the insulating elastic filling 22. Both the overall sensor 20 and the sensing washer 40 will be carefully characterized to develop a model that relates the capacitance of the sensor to the compressive force applied to the washer. Also, the method will automate quick and accurate sensor calibration in the field. RFRD Design. The RFRD circuit 28 will be designed in order to allow the transmission of the results on the small amount of power obtained from the input RF signal. Additionally, the device and its circuit logic will be optimized for quick reading, such as from a moving vehicle, and to coordinate readings in the presence of other devices. Washer Design and Packaging. While the sensors 20 themselves will be well-protected with the two-washer design, the RFRD 28 and the wire leads 29 of the sensors will be properly packaged to be robust to the elements and to vandalism.

2. Apparatus and Method a. Washer Design and Packaging

Figure 2:
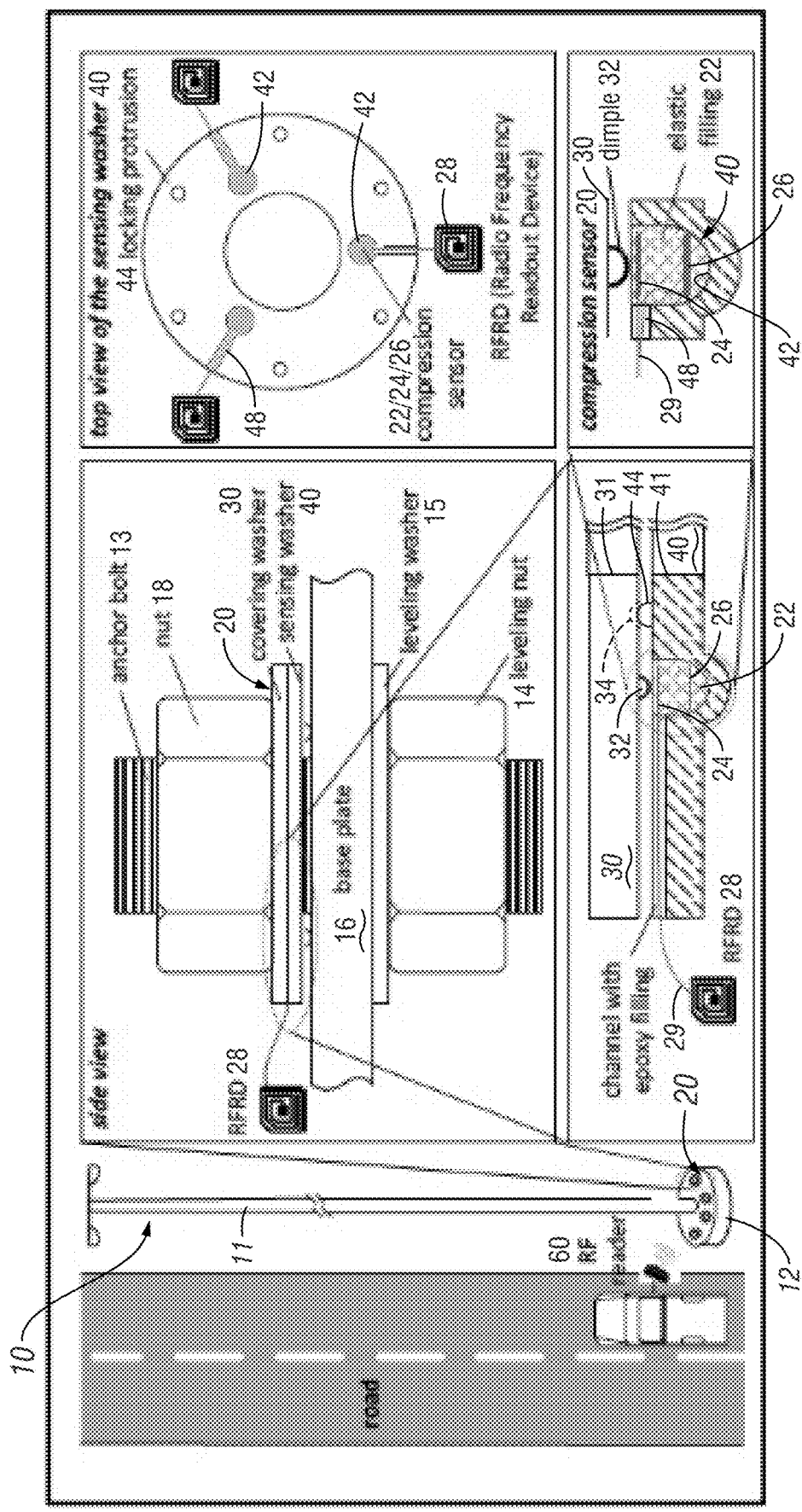
Figures 3, 4, 5:
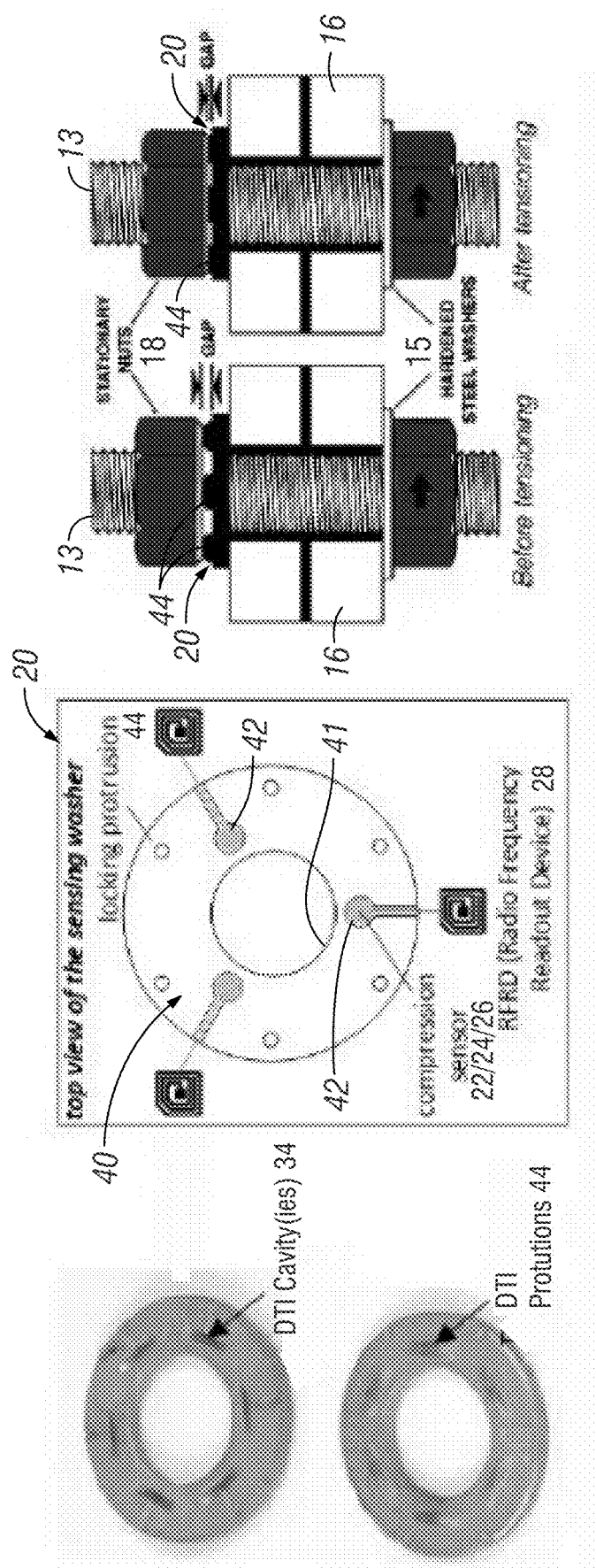
FIG. 3 is illustrations of the top and bottom of a prior art DTI washer (see also [4]).
FIG. 4 is a top plan diagram of a sensing washer of the type illustrated in FIG. 2 according to aspects of the exemplary embodiment of FIG. 2.
FIG. 5 are side elevation illustrations of how the prior art DTI washer of FIG. 3 works (see also [5]).

A traditional DTI has protrusions 44 on one side and cavities 34 on the other side, as illustrated in FIG. 3. The protrusions 44 are designed to deform when subjected to a compressive load, as shown in FIG. 5 (see difference in "GAP" in FIG. 5 between "Before Tensioning" on left and "After Tensioning" on right). We turn the traditional DTI into a sensing washer 40 by embedding sensors (here copper plates 24 and 26) inside the cavities 42, as shown in FIGS. 2 and 4. The deformation of the sensors 24/26 in the elastic 22 can be used to measure the compression force in the washer 40, which is related to the tension force inside the anchor bolts 13. Small channels 48 (FIG. 2) can be cut (or otherwise formed) next to the cavities 42 to allow wires 29 to be installed. Both the wires 29 and sensors will be bonded to the sensing washer 40 with epoxy (or other by other techniques). As described, supra, under "Sensing Principle," a covering washer 30 with dimples 32 is installed on the top of the sensing washer 40. The sensing 40 and covering 30 washers will be interlocked using locking protrusions 44. Since the two washers 30 and 40 are in contact with each other (because of the DTI protrusions), the majority of the compression load will be transferred through the two washers. Therefore, the sensors 22/24/26 only take a minimal load. It is noted that current commercial DTIs cannot be used for high strength anchor bolts, such as F1554 Grade 105, since the hardness is typically lower than a standard through-hardened steel washer. Therefore, in addition to protecting the sensors 22/24/26, the covering washer 30 in the two-washer design will allow the system 20 to be used for high-strength anchor bolts. The designer will evaluate and select the size, number, and placement pattern of the sensors for a given application. As is known to those of skill in the art, DTI-type washers are designed so that over the normal tensioning ranges the protrusions will deform (see smaller gap when bolt is tensioned in FIG. 5), but not have zero distance or gap. Thus, the embodiments of the invention using DTI protrusions can present a range of gap distances D for a range of bolt tensions.

b. Sensor Design

Figure 6:
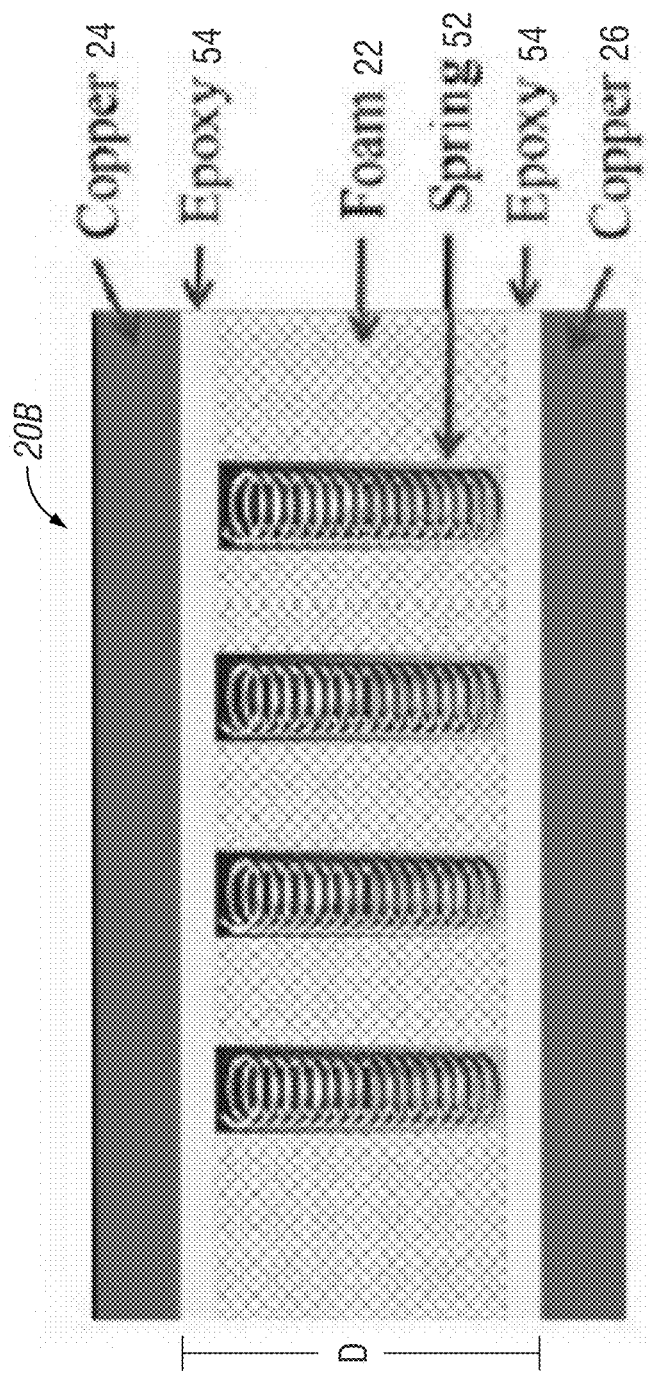
FIG. 6 is a highly diagrammatic cross-sectional illustration of the operating principles of the elastic compression sensor element such as used in the embodiment of FIGS. 2 and 4.

A close-up illustration of an alternative exemplary compression sensor 20B (including 22/24/26) is shown in FIG. 6. This sensor 22/24/26 is essentially a parallel-plate capacitive sensor like described above. The plates 24 and 26 in this embodiment are made from copper or other metal material. An option is custom-designed steel springs 52 are embedded into the elastic 22, here a layer of foam sandwiched between the two plates 24 and 26, creating a structure similar to that of a mattress. In order to avoid a short circuit between the two plates 24/26 of the sensor, the plates 24/26 are coated with a layer 54 (respectively) of electrically insulating epoxy (commercially available such as from Master Bond Inc. Hackensack, N.J. 07601 USA).

When a compressive force is applied to either plate 24 or 26 of the sensor, the structure is deformed, causing a change in the gap or distance D between the two plates 24 and 26. As a result, the capacitance between the plates 24 and 26 changes. The capacitance can be read by a capacitance reading circuit. The compressive force is then determined using a pre-established relation between the capacitance of the sensor and the applied force.

One specific example of this arrangement 20 or 20B is:

1) Sensor Design and Fabrication: The sensor 22/24/26 is placed in the cavity 42 of the sensing washer 40 (See FIGS. 2 and 4). A typical size of the cavity 42 is about $5/36"\times7/16"\times1/8"$ (4 mm×11 mm×3 mm, width×length×depth). Hence, the target size of the sensor 22/24/26 is slightly smaller than that, so the sensor 22/24/26 can fit inside the cavity 42 and be deformed when the covering washer 30 is tightly fixed. Meanwhile, the deformation is still in the elastic range of the elastic filling 22 (or the foam/embedded springs in the foam alternative of FIG. 6), which is/are sandwiched between the two plates 24 and 26 of the sensor. When the nut 18 becomes loose, the deformation of the sensor 22/24/26 recovers elastically, resulting in a change in the capacitance. Different types of elastics or foams or other materials or combinations (made from different materials) can be evaluated to fabricate the sensors, and, if used, the number of springs (or other mechanical members) embedded in the foam can be optimized to achieve optimum sensitivity. Dimples 32 (see FIG. 2) in covering washer 30 can line up with each cavity 42 in sensing washer 40 to compress the 22/24/26 combination on compression. The sensing washer 40 and covering washer 30 each have appropriate center openings 41 and 31 respectively (see FIG. 2) to allow each to be stacked on an anchor bolt 13.

2) Capacitance reading: The capacitance of each sensor 22/24/26 on a sensing washer 40 (can be just one or plural, as in FIG. 2) is read by a circuit such as a differential readout circuit [6] (E.g., Rodjegard, et al., A differential charge-transfer readout circuit for multiple output capacitive sensors, Sensors and Actuators A 119 (2005) 309-315, incorporated by reference herein, which describes how capacitive sensors work, why they can be more stable and otherwise beneficial compared to piezoresistive readout sensors, and different forms they can take) or a switched-capacitor readout circuit [7] (E.g., Yazdi, et al., A generic interface chip for capacitive sensors in low—power multi parameter microsystems, Sensors and Actuators 84 (2000) 351-361, incorporated by reference herein, which also describes capacitive sensors). As widely used circuits to read the signals from capacitive sensors, these types of circuits offer high accuracy and resolution. For instance, the switched-capacitor readout circuit can resolve input capacitance variations of less than 1 fF (femtofarad) in 10 Hz bandwidth [7]. These circuits can be readily implemented in an inexpensive manner and can be easily integrated into the RFRD discussed below. The two types of circuits can be constructed, compared and optimized to measure the capacitance of the sensors, and the best suitable readout circuit will be selected for an application. See also FIGS. 27A and B and associated description.

3) Force vs. Capacitance: In order to translate the measured capacitance into the applied force on the sensor, the following techniques can be used. First, the force and the capacitance of the sensor can be calibrated experimentally. In other words, the relation between force and the capacitance of the sensor will be established by applying a series of known forces on the sensor and measuring the corresponding capacitance. Second, a theoretical model relating the force and the capacitance can be developed using the finite-element method. The accuracy of the theoretical model can be validated or improved by comparing with the experimental results.

c. RFRD Design

Figure 7:
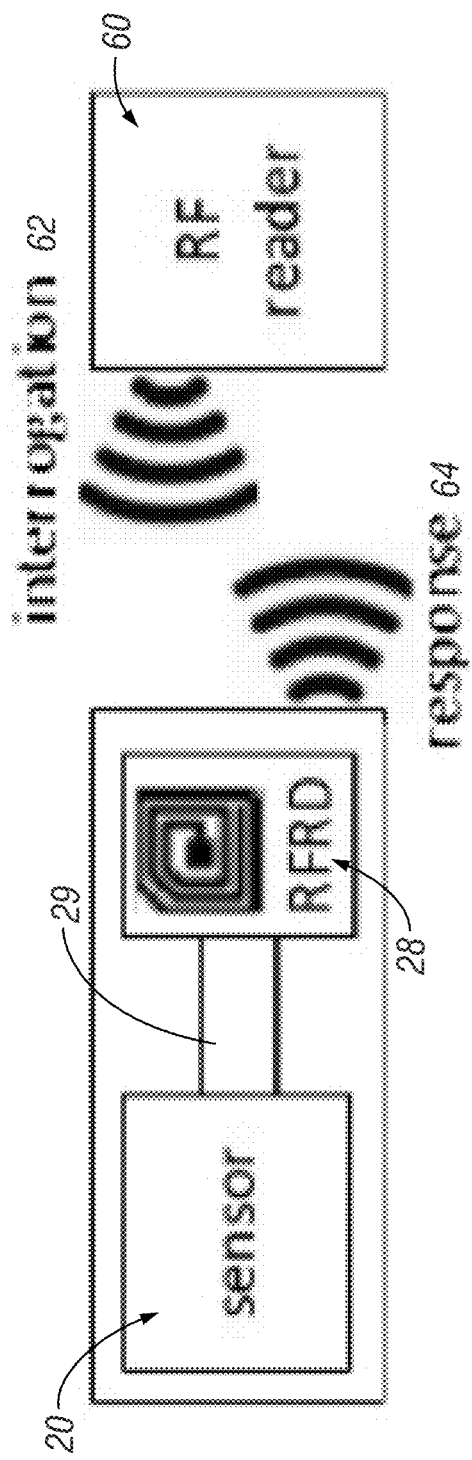
FIG. 7 is a block diagram schematic of the smart system of FIG. 2 illustrating wireless reading of the compression sensors by RFID technique, according to aspects of embodiments of the invention.

As shown in FIG. 7, each compression sensor 22/24/26 can be attached to a passive radio frequency readout device (RFRD) 28. The RFRD 28 functions similar to a radio frequency identification (RFID) tag. It receives an interrogation signal 62 from a nearby (or at least within-range) RF reader 60, operated by the user. The energy from this signal 62 is used to power a special IC on the RFRD 28 that produces a response signal 64 and sends it back to the RF reader 60 according to conventional RFRD techniques. The sensor's output can be built into the IC, using a capacitance reading circuit as discussed above, such that a change in the sensor's output produces a change in the response signal 64. The IC for the RFRD 28 can be custom designed. It can be optimized to produce a response signal quickly and using very little power, while minimizing cost. The logic of the IC can implement an anti-collision scheme to allow multiple RFRDs 28 in the same area to be read from a distance.

3. Proof of Concept a. Testing at Component Level on Single Anchor Bolt

Figure 8:
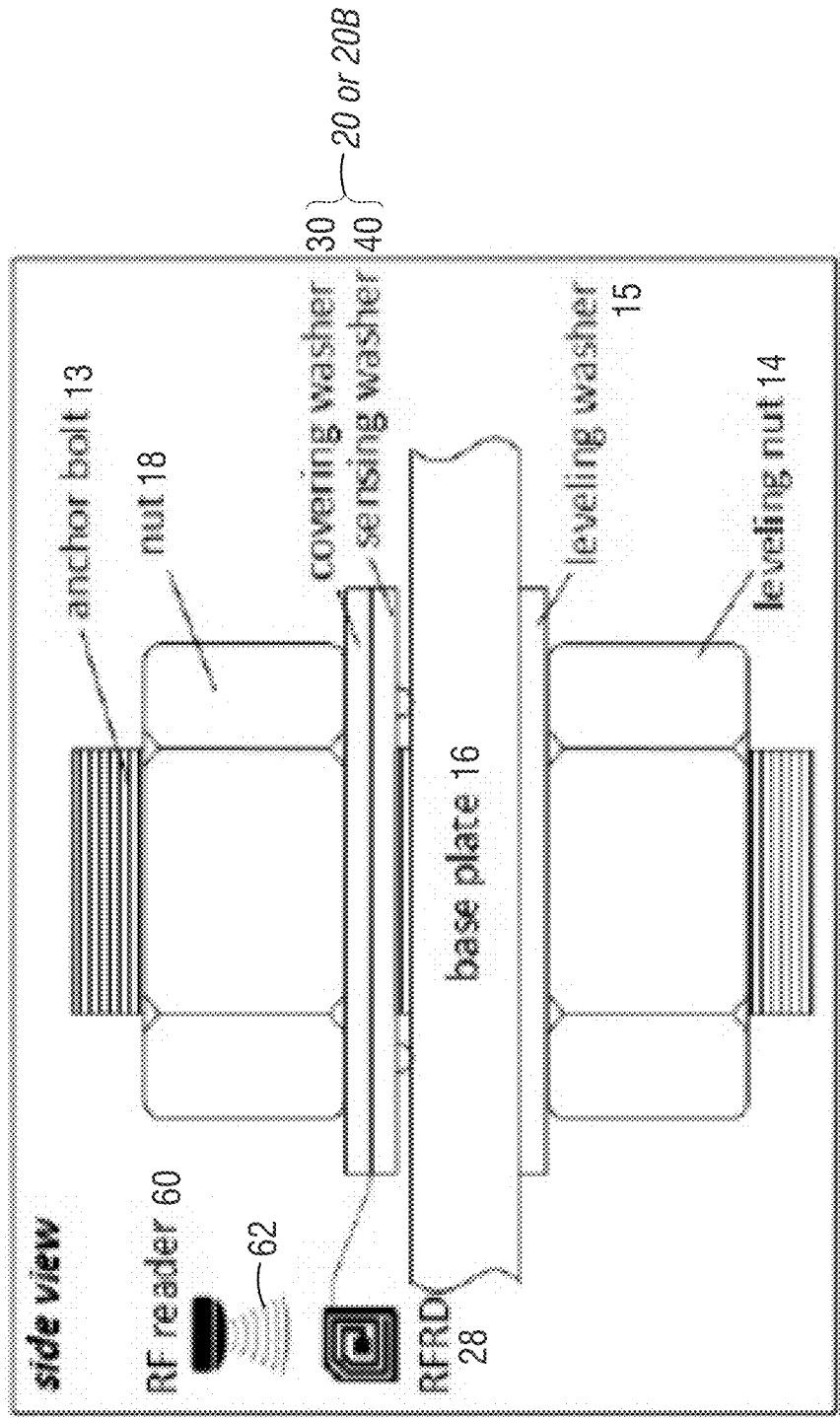
FIG. 8 is an enlarged diagrammatic side view illustration of a system according to an exemplary embodiment of the invention.

Testing can evaluate the system. One example follows:

The specimen consists of an anchor bolt 13 in a steel base plate 16, with a leveling nut 14 and a standard washer 15 below the plate 16 and a top nut 18 with the proposed two-washer design above the plate 16, as shown in FIG. 8. The threads are milled off two diametrically opposite areas of the anchor bolts 13 in order to attach commercially-available (e.g. piezoelectric-based) strain gages (not shown). Four more strain gages will be mounted 90° apart on the inside of the bolt hole in the base plate 16. The purpose of these added strain sensors is to independently test and determine bolt load transfer through the base plate.

Tightening and loosening tests are conducted. For the tightening test, the snug-tight condition is obtained with a wrench, and then the bolt is tightened with a hydraulic wrench until the desired load condition is achieved. The loosening test follows the reverse procedure. During the testing, strains are recorded and converted to bolt load, which can then be correlated with the readings from the proposed smart system.

b. Testing at Structural Level on Representative SLTS Structure

Figure 9:
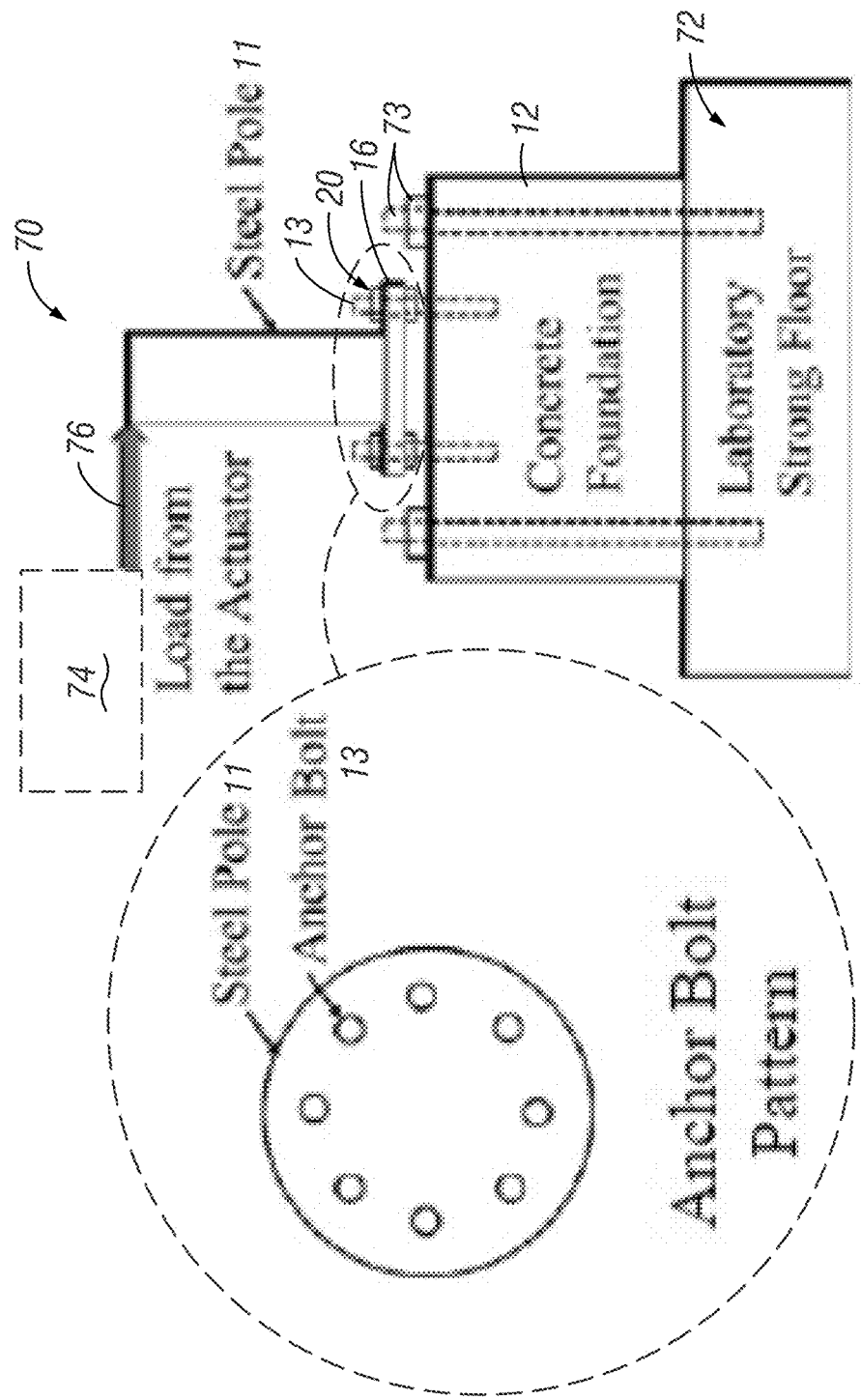
FIG. 9 is diagrams of a testing set up for proof of concept of aspects of the present invention.

Once the system is proven successful at the component level, it can be used in the structural test and test set-up 70. One example is as follows:

The specimen will represent an actual SLTS structure, consisting of a steel pole 11 with 24" OD diameter, a 2" thick circular base plate 16, eight symmetrically-arranged double nut anchor bolts 13 each with the sensing washer assembly 20 (FIG. 9), and a concrete foundation 12. The foundation 12 will be secured to the more massive floor 72 of the testing laboratory (e.g. by their own anchor bolts/nuts 73, as shown in FIG. 9.

For comparison testing, the anchor bolts 13 will also be instrumented with the commercially-available strain gages (not shown but discussed above). Three types of tests can be conducted: tightening, static loading, and fatigue loading. A tightening test is used to simulate the installation procedure and test the effectiveness of the sensing washer to detect the preload in the bolts. The tightening sequence can follow the star pattern as specified in AASHTO Specifications [11] and can be similar to the procedure previously described. In the static loading test, a load 76 is applied at the top end of the pole 11 (e.g. by some form of appropriate actuator 74, such as hydraulic or otherwise), as shown in FIG. 9. Three degrees of applied moments and induced stresses in the pole can be calculated. Finally, a fatigue test with the layout shown in FIG. 9 can be conducted to simulate the loosening process of anchor bolts. The stress range can be obtained from the field measurements. For all tests, anchor bolts will be instrumented with strain gages at different locations. The readings from the strain gages and the proposed sensing system can be correlated, and the capability of the proposed system to record the tension load in the anchor bolts can be evaluated.

Such testing will provide proof of concept for at least embodiments 20 or 20B.

4. Potential Benefits

Anchor bolts are critical components of SLTS support structures. The collapse of SLTS structures has frequently been attributed to anchor bolt failures [9]. Therefore, this system addresses an important, nation-wide problem. The system will provide accurate readings of the tension forces inside anchor bolts. Due also to the battery-free RFRD and its ability to be read wirelessly from a distance, the system has great potential to substantially reduce installation and inspection costs and significantly improve safety by replacing current anchor bolt installation and inspection methods. In addition, the system can be installed mostly with the current installation procedures and equipment. Therefore, it can be effectively put into practice.

5. Implementation/Commercialization

The additional hardware cost for the system is presently estimated to be $0.4 for each bolt and the labor cost is negligible since it takes seconds to collect the data while driving past SLTS structures. The installation of a 2' long anchor bolt with 2" diameter requires 0.65 hours, including the installation of the template and the bolt [10]. The labor cost, including the overhead, for an installer or inspector varies from $50 to $100/hour. For a support structure with eight anchor bolts, the total cost for the installation is about $50/hour×0.65 hours/bolt×8 bolts=$260. The total additional hardware cost of the proposed system is about $0.4/bolt×8 bolts=$3.2, which is about 1.2% of the installation cost and can be easily justified considering the simplification of the bolt installation. Based on our discussions with inspection engineers, it takes about 15 to 30 minutes to inspect anchor bolts for an SLTS structure, depending on the inspection method used. The inspection cost is about $50/hour×0.25 hours=$12.5, and the cost of the proposed system is about 24% of the inspection cost. Therefore, great savings can be achieved using the proposed system. Additionally, the inspection process will be safer, since the inspectors can stay inside their vehicles.

From the foregoing, it can therefore be seen that this embodiment meets one or more of the objects of the invention. As shown in FIGS. 10A and B, embodiment 20 (as well as other embodiments 20B described above, but also embodiments 20' and 20" described later) take advantage of a stand-alone assembly that can be easily installed on existing anchor bolts (as appropriately sized) without modification to the bolts or the nuts. In FIGS. 10A and B, the sensing assembly 20 is shown as a single component. It can be an integrated assembly or an assembly of sub-components such as the sensing washer 40 and covering washer 30. It takes advantage of a substantially encapsulated sensing element at any or all of the selected anchor bolts that can transduce bolt tension by capacitance between spaced plates, and therefore does not involve protection of fragile strain gauges or load sensors. It includes a stand-off remote sensing capability to eliminate time and labor resources of manually moving to and either testing or connecting equipment for a measurement. And it can be used effectively and discriminate between each installed sensor, whether installed sensors at each anchor bolt for one structure, or anchor bolts for a plurality of different structures at different locations.

References (each of which is incorporated by reference herein in its entirety):
[1] Applied Bolting Technology. "Squirter® DTIs." http://www.appliedbolting.com/squirters.html
[2] Steele, Jim. "New washer can accurately measure a bolt's clamping force." Phys.org, 2015. http://phys.org/news/2015-11-washer-accurately-clamping.html
[3] Strainsert. "Force sensing bolts/studs general product information." http://www.strainsert.com/products/force-sensing-bolts-studs-general-product-information/
[4] http://www.portlandbolt.com/products/washers/load-indicating/
[5] http://www.bignutjob.com/tag/torque/
[6] H. Rodjegird and A. Loof, "A differential charge-transfer readout circuit for multiple output capacitive sensors," Sensors and Actuators A: Physical. 119(2), pp: 309-315, 2005.
[7] N, a, A. Mason, K. Najafi, K. D. Wise, "Generic interface chip for capacitive sensors in low-power multi-parameter microsystems," Sensors and Actuators A: Physical. 84(3), pp. 351-361, 2000.
[8] Sarma, Sanjay. "Towards the 50 Tag." MIT Auto-ID Center, 2001.
[9] http://www.nctspm.gatech.edu/pi/evaluation-anchor-bolt-clearance-discrepancies
[10] "Estimating Labor Unit Data for Concrete Construction," http://www.concreteconstruction.net/Images/Estimating%20Labor%2Unit%20Data%20for%20Concrete%20Construction_tcm45-344396.pdf
[11] Standard Specifications for Structural Supports for Highway Signs, Luminaires, and Traffic Signals, 6th Edition, with 2015 Interim Revisions, AASHTO.

D. Specific Example 2

As indicated above, the invention can take different forms and embodiments. Several variations on the embodiment above will now be provided.

It will be understood that these embodiments follow a similar paradigm to the embodiment above. They are stand-alone, retrofittable assemblies that utilize capacitive sensing to transduce bolt tension. The main differences from the first specific embodiment will now be described in detail, as well as proof of concept and design principles to assist a designer when making and using these embodiments.

Another exemplary embodiment 20' according to the invention is described below with reference to FIGS. 15A-C. This embodiment utilizes the general principles of the first specific embodiment above. The main differences will be pointed out below.

The main differences of embodiment 20' relative to first embodiment 20 are as follows:
(a) Instead of a plurality of compression/capacitance combinations 22/24/26 being embedded in a like number of cavities 42 spaced apart around the surface of a single sensing washer 40, each with its own RFRD readout (thus providing multiple measurements at each anchor bolt), the two washers become the conductive plates. There is no separate set of copper plates over and above the top and bottom washers. As shown in FIGS. 15A-C, a top washer 30' is the top conductive plate 24', and the bottom washer 40' is the bottom conductive plate 26'. Wires to measurement circuit would be connected to each washer 30' and 40'.
(b) The elastic 22' is interposed between the facing surfaces of washers 30' and 40', at least substantially. It effectively is an elastic dielectric layer between them. In one example, the elastic material is rubber. In another it is rubber and memory foam in some combination. These are non-limiting examples.
(c) Therefore, installed but untensioned on anchor bolt 13, the embodiment 20' would provide a first capacitance reading when a potential (see + and − in FIG. 15A) is created between washers 30' and 40' at a first distance D. Upon tensioning of bolt 13 in an amount that compresses elastic 22, the washers 30' and 40' converge to a second distance D. As with embodiment 1, capacitance readings transduced from them would vary according to separation distance D. Those variations could be calibrated to bolt tension. The DTI-type protrusions could be used on washer 30' and 40' or both.

It is to be understood that as a part of this description, proof of concept will also be set forth. Those skilled in the art will understand that while the invention can take many forms and embodiments, and that the specific embodiments disclosed herein are not limiting to those forms and embodiments, certain practical limitations for at least typical applications of the invention have been investigated. These proof of concept tests will both help the reader understand the invention and the factors a designer will take into account.

E. Specific Example 3

We have taken the principles discussed above regarding example 2 (20') as well as a still further alternative exemplary embodiment 20" (discussed below) and:
(a) investigated the design options for the proposed system.
(b) designed multiple prototype capacitors and calculated capacitance.
(c) compared capacitance outputs based on the dielectric material and insulation parameters.
(d) tested the capacitor using an MTS machine to determine how large tensile forces could damage the capacitor.
(e) tested the capacitor using a Skidmore-Wilhelm and pipe wrench to determine how traditional tightening could damage the capacitor.

As a result, and as reported below:
(a) Capacitor designs were evaluated for feasibility.
(b) Prototypes were assembled.
(c) Dielectric materials were tested to determine the effectiveness of each material.
(d) Capacitance outputs were measured based on insulation parameters.
(e) MTS testing was completed to determine how capacitor would be affected by typical bolt tension values during tightening.
(f) Skidmore-Wilhelm testing was completed to determine how capacitance would be affected by traditional tightening methods.

As the person of skill in this technical area will appreciate, the work discussed below provides a description of additional exemplary embodiments of various aspects of the invention, as well as proof of concept and design options and considerations.

1. INTRODUCTION

1.1 Problem Statement

As discussed earlier, currently, many states are experiencing problems with anchor bolts. Specifically, loose nuts have been found on many anchor bolts, sometimes less than two years after the structures were installed. This situation strains the resources of the agency responsible for maintenance, and also creates concerns related to inspection frequency and public safety.

One possible cause of the loose nuts relates to the difficulty of measuring bolt tension during installation. Historically, torque on the nut has been used to measure the "tightness" of a bolt, even though bolt tension provides the actual clamping force for the joint. Torque has been used because it can be measured with available tools, such as a torque wrench. However, the relationship between torque and bolt tension is not straightforward, and a nut installed with a calibrated torque wrench may not create sufficient tension in some conditions. Therefore, the ability to accurately measure bolt tension during installation could reduce or eliminate early failures due to loose nuts. Even states following AASHTO's Turn of Nut specification experience loose nuts.

Another related problem is the burden of regular maintenance of anchor bolts for SLTS structures. Generally, SLTS structures need to be inspected at most every five years, a time consuming and labor-intensive process. Many times, the inspection frequency needs to be shorter due to safety concerns with loose nuts. Expediting the inspection process, such as through a smart anchor bolt monitoring solution, would lower costs and free agency resources for other tasks.

1.2 Proposed Design Solution

To address the limitations of current practice of bolt installation and inspection, we propose a smart installation system which can directly indicate the tension that can take different embodiments (including but not limited to 20, 20B, and 20' described above and 20" described below). The proposed solution is to install sensors with minimal changes to the existing hardware by adding a modified sensing washer immediately above the plate. The sensors will sense the compression force created by the nuts, allowing for more precise installation. Additionally, the sensors will be interrogated wirelessly using a radio frequency (RF) reader, allowing inspections to occur from a distance, such as from a passing vehicle.

2. ORGANIC SENSOR DESIGN

2.1 Design of the Capacitor

A. Design Description

An alternative exemplary embodiment, and variations, will now be described with specific reference to FIGS. 11A-C.

This design is focused on cost savings and minimizing the changes to commercially available washers. The general idea of the capacitor is illustrated in FIG. 11A. Washers 1 and 3 (or 30" and 40" similar to 30' and 40' described earlier) are applied with charges as two parallel plates 24" and 26". The top direct tension indicator (DTI)-type washer 30" (or with the loading point is used as the positive plate and the bottom washer 40" is applied with a negative charge. In embodiment 20", a third washer 2 (or 80) serves the dual function of distributing the force and increasing the distance between washers 1 and 3. The detailed design is explained in FIG. 11B. In order to ensure adequate insulation, all three washers are coated with a thin layer of insulating paint 82A—C. Moreover, to make sure that the capacitor 30"/40" has the ability to restore to the initial deformation, memory foam or rubber 22" is added to serve as a dielectric and elastic material. Finally, the capacitance change is caused by the decrease of the gap "D" between washers 1 and 3. This D value ranges from 0 to 0.2 cm, which occurs when a strong force is applied to the top of washer 1. In FIG. 11C, a capacitor with optimized insulation is shown. This design is used in order to increase the stability of the capacitor. During the capacitor loading, any small crack or damage on the painted insulation layer will lead to an unstable capacitance. Electrical insulation tape 84 is applied to further improve the insulation system, and it helps reduce physical damage on the insulation layer.

B. Calculations of the Capacitance Based on the Design

The basic formula to calculate the capacitance is illustrated diagrammatically and mathematically at FIG. 11D, where C is the capacitance, A is the plate area, and d is the distance between two plates. The permittivity of the free space is $o=8.854*10_{-12}$ F/m, and k is the relative permittivity of the dielectric material between plates. For rubber, k=7; and for memory foam (polyurethane), k=3.6, and based on the following:

Original Capacitance $$C = \frac{k\varepsilon_0 A}{d} = \frac{3.6 * 8.854 \times 10^{-12} F/m * 0.00754 \text{ m}^2}{0.7 \text{ cm}} =$$

$$\frac{2.403 * 10^{-13} F * m}{7 \times 10^{-3} \text{ m}} = 3.43 \times 10^{-11} [F] = 34.3 \text{ pf}$$

Maximum Capacitance change when $D = 0$ cm, $d$ from 0.7 cm to 0.55 cm $$C = \frac{k\varepsilon_0 A}{d} = \frac{3.6 * 8.854 \times 10^{-12} F/m * 0.00754 \text{ m}^2}{0.55 \text{ cm}} =$$

$$\frac{2.403 * 10^{-13} F * m}{5.5 \times 10^{-3} \text{ m}} = 4.37 \times 10^{-11} [F] = 43.7 \text{ pf}$$

Maximum Capacitance change $C$ change $\sim 10$ pF

In this case, the real capacitance should be a little different from the calculated value because the equation treats all intermediate materials as memory foam. However, in reality, thin isolation layers of spray paint and springs are also added. Based on the calculation, a capacitor reader with a resolution of 10 pF to 100 pF is needed.

2.2 Measurement of Reference Capacitors and Digital Circuit Meter Selection

In this section, the reference capacitors with different capacitance values will be measured. The capacitors are chosen based on calculations. FIG. 12 (left side) shows the reference capacitors used: capacitor (108), capacitor (109), capacitor (100), capacitor (220), capacitor (101) and capacitor (471). The labeled capacitances are 0.1 pF, 1.0 pF, 10 pF, 22 pF, pF and 470 pF, respectively. The detailed numbers are shown in FIG. 12 (right side).

Next, an Agilent—34410A 6½ digit multimeter (FIG. 13—three views) was used to measure the reference capacitors. However, because the resolution of this reader is ~0.1 nF, only capacitor (101) and capacitor (471) can be successfully measured. Five readings are taken and the average value is calculated to compare with the reference value. The calculated values are shown in Table 1. For both capacitors, the error range is about 20 to 30 pF, which is very close to the calculated capacitor value (30 to 40 pF, −10 pF change after deformation). Another problem is that this capacitor reader cannot reach the 1-10 pF level. There is a high possibility that we cannot use this multimeter to read the capacitance from the prototype capacitor.

TABLE 1

Measured values compared with reference values for capacitors (101) and (471).

| | 1st Read | 2nd Read | 3rd Read | 4th Read | 5th Read | Average | Reference |
|---|---|---|---|---|---|---|---|
| 01 | 128.7 pf | 134.2 pf | 119.7 pf | 123.8 pf | 125.6 pf | 126.4 pf | 100 pf |
| 71 | 492.1 pf | 506.3 pf | 495.5 pf | 487.3 pf | 491.7 pf | 494.6 pf | 470 pf |

In order to solve the problem, a capacitor reader with higher resolution, KEYSIGHT E4980AL in FIG. 14, has been used to measure the low capacitance. Capacitors (108), (109), (100) and (220) have been successfully measured. The same method as described above is applied to get the final capacitance value of each capacitor to compare with the reference data, with results shown in Table 2. For these four capacitors, the maximum error is about −50 fF. The good resolution demonstrated by KEYSIGHT E4980AL increases the possibility to read the capacitor with a capacitance in ~100 fF range.

TABLE 2

Measured values compared with reference values for capacitor (108), (109), (100) and (220).

| | 1st Read | 2nd Read | 3rd Read | 4th Read | 5th Read | Average | Reference |
|---|---|---|---|---|---|---|---|
| 108 | 130.32 ff | 121.73 ff | 118.21 ff | 132.57 ff | 116.74 ff | 123.91 ff | 0.1 pf |
| 109 | 1.026 pf | 1.031 pf | 1.021 pf | 1.033 pf | 1.027 pf | 1.028 pf | 1.0 pf |
| 100 | 10.036 pf | 10.024 pf | 10.031 pf | 10.027 pf | 10.029 pf | 10.029 pf | 10 pf |
| 220 | 22.041 pf | 22.057 pf | 22.038 pf | 22.045 pf | 22.035 pf | 22.043 pf | 22 pf |

2.3 Assembling a Capacitor and Measuring Its Capacitance

A. Simple Structured Capacitor Measurement

In this section, a real capacitor has been assembled and measured to prove the concept of the prototype design. A simple structure is shown in FIG. 15A, consisting of top and bottom washers 30' and 40' separated by a dielectric material layer (rubber) 22'. Vertical force is manually applied on the top washer. Two conductive wires are welded to the washers, which are used to apply voltage. This is similar to Specific Embodiment 2.

A KEYSIGHT E4980AL is used to measure the capacitance because of its resolution. The measured capacitance is shown in FIGS. 16A-D. The background capacitance before the measurement is about 65 fF. The initial capacitance value is taken when the voltage is first applied to the capacitor, which is 14.38249 pF. The highest capacitance of 18.53619 pF is read when the largest force is applied to the top of the capacitor. Finally, a capacitance of 14.38618 pF is observed when the force is completely removed. The difference between the released and initial values is only 0.00369 pF, which is very small. This indicates the ability of the assembled capacitor to recover to original form.

The average values of the capacitance before and after deformation are shown in Table 3. We can see that after calculating the average values from five different readings, a significant difference is observed between the cases with and without applied forces, as it changes from 14.38761 pF to 18.538136 pF. However, after the force is released, there is only a small difference compared with the initial value (0.0012 pF). Therefore, the capacitor tested in this section proves the concept of the prototype capacitor design shown in FIGS. 11A-C as well as FIGS. 15A-C. However, it is noted that the middle washer has not been included, which will be discussed in next section.

TABLE 3

Measured values for the assembled capacitor (rubber) before and after deformation.

| | 1st Read | 2nd Read | 3rd Read | 4th Read | 5th Read | Average |
|---|---|---|---|---|---|---|
| No Force | 14.38249 | 14.39211 | 14.40137 | 14.37531 | 14.38677 | 14.38761 |
| With Applied Force | 18.53619 | 18.55315 | 18.54187 | 18.52918 | 18.53029 | 18.538136 |
| Force Released | 14.38618 | 14.39207 | 14.38178 | 14.39278 | 14.37921 | 14.386404 |

B. Gap Dependent Capacitance Measurement on a Simple Structured Capacitor

In order to further study the relationship of the capacitance and the deformation, a capacitance which uses rubber as dielectric material has been tested. The experimental procedure is demonstrated in FIGS. 17A-D, and shows the capacitance is gap dependent. The capacitance is 18.48636 pF when there is a 0.2 cm deformation at the rubber layer, and the capacitance almost returns to its initial value when the force has been totally released and rubber has fully recovered to its initial shape.

TABLE 4

Detailed data of measured capacitance for FIG. 18.

| Deformation (cm) | Capacitance (pF) | |
|---|---|---|
| | Rubber | Memory Foam |
| 0 | 12.03421 | 7.5785142 |
| 0.1 | 14.36612 | 7.64372 |
| 0.15 | 16.24733 | 9.38433 |
| 0.2 | 18.48636 | 10.320142 |
| 0.25 | 20.78688 | 11.91332 |
| 0.3 | 23.01133 | 12.970025 |

Two types of capacitors have been assembled with rubber and memory foam as the dielectric material. The test results of capacitance and deformation relation are plotted in FIG. 18 and the detailed data is shown in Table 4. From the plot and data, with the same deformation, the rubber capacitor shows higher capacitance than the memory foam capacitor. This is due to the dielectric constant of rubber (7.1) being higher than memory foam (3.6). For example, with a maximum deformation of 0.3 cm, the rubber capacitor reaches 23.01133 pF. Meanwhile, the memory foam capacitor only shows a 12.970025 pF capacitance. Both of the assembled rubber and memory foam capacitors work in a proper way. These two capacitors are gap dependent, and the capacitance is linearly related with the gap between washers.

C. Optimized Capacitor with Middle Cut Washer and Insulation Layer Added

In this design (see, e.g., FIGS. 19 and 20), a middle cut small washer 80 is added between the top DTI washer 30″ and bottom washer 40″. Insulation material 82 has also been applied on the designed region. The purpose of this design is to ensure adequate insulation and to increase the gap between top and bottom washer. The larger gap leads to a larger capacitance, which minimizes the need for precision when using a capacitor reader with a low resolution. For example, the capacitor reader we used during our test is KEYSIGHT E4980AL with the resolution of 60 fF, and costs between $4,000 and $8,000. However, if a lower resolution capacitor can be used, for example an Agilent—34410A 6½ digital multimeter, the cost is only $1,000 to $3,000. Higher capacitance will help minimize the challenges when designing the integrated capacitor reader and RFID circuit. Additionally, higher capacitance can increase the capacitor stability. In FIG. 19, Rust-Oleum blue spray paint is used as insulation material. The paint has been uniformly applied on the bottom side of top DTI washer 30″, the full side of middle washer 80 and the top side of bottom washer 40″. In total, there are 4 single insulation layers in one assembled capacitor (see, e.g., FIGS. 11A-C). Even though there is some damage on the insulation layer due to high loading force, the whole system will maintain good insulation. Finally, the real assembled memory foam capacitor is shown in FIG. 20. D. Experimental Results for Capacitance Measurement Based on Optimized Capacitor

TABLE 5

Detailed data of measured capacitance for FIG. 21.

| Deformation (cm) | Capacitance (pF) | |
|---|---|---|
| | Rubber | Memory Foam |
| 0 | 0 | 0 |
| 0.1 | 16.7136 | 8.9974 |
| 0.15 | 22.7177 | 15.7079 |
| 0.2 | 29.1218 | 21.3073 |
| 0.25 | 36.7088 | 30.29986 |
| 0.3 | 42.03368 | 38.47377 |

In FIG. 21, the assembled rubber and memory foam capacitors have been tested. All values shown are the average of 5 different readings. The detailed data are shown in Table 5.

The result has a linear trend for both rubber and memory foam capacitors. However, the rubber capacitor shows a higher capacitance when compared with memory foam. The capacitance difference between rubber and memory with the same deformation is not very large; this is because of the insulation material. Insulation also contributes to the total capacitance more than the dielectric material.

TABLE 6

Detailed data of measured capacitance for FIG. 22.

| Deformation (cm) | Capacitance (pF) | |
|---|---|---|
| | Memory Foam (without insulation material) | Memory Foam (with insulation material) |
| 0 | 0 | 0 |
| 0.1 | 0.0652058 | 8.9974 |
| 0.15 | 1.8058158 | 15.7079 |
| 0.2 | 2.7416278 | 21.3073 |
| 0.25 | 4.3348058 | 30.29986 |
| 0.3 | 5.326305 | 38.47377 |

In FIG. 22, the capacitance of the capacitor with and without the insulation layer has been plotted. The detailed data has been shown in Table 2-6. From the data, we can see that the insulation layers increase the capacitance significantly. For memory foam, with the maximum deformation of 0.3 cm, the capacitance change of the 'no insulation' capacitor is only 5.326305 pF. However, for the capacitor with insulation, the measured capacitance change is 38.47377. The insulation material has a dielectric constant larger than 20.7 and contributes significantly to the whole capacitance.

2.4 Testing of Capacitor Design

A. Testing Using MTS Machine

One of the loading tests conducted was by a MTS machine. A load of 200 kips was applied on the memory foam capacitor. It can be seen from FIGS. 23A-D that the gap of the memory foam capacitor decreased after force application. From FIG. 23 C, one can see that the top DTI protrusions have been totally compressed and the gap between the top DTI washer and middle washer become zero. There is no bending of the DTI around the middle washer, however, the insulation layer was damaged at the contact areas between DTI and middle washer. These contact areas are where all of the load travels through the washers.

Capacitance was measured before and after loading. The background capacitance is shown in FIGS. 24A-F; the value is taken without a capacitor connected, and the reader resolution is 60.34216 pF. FIG. 24B shows the initial capacitance value of the memory foam capacitor (11.13522 pF) after connecting with the capacitor reader. This reading is taken before loading.

Figure 24F:
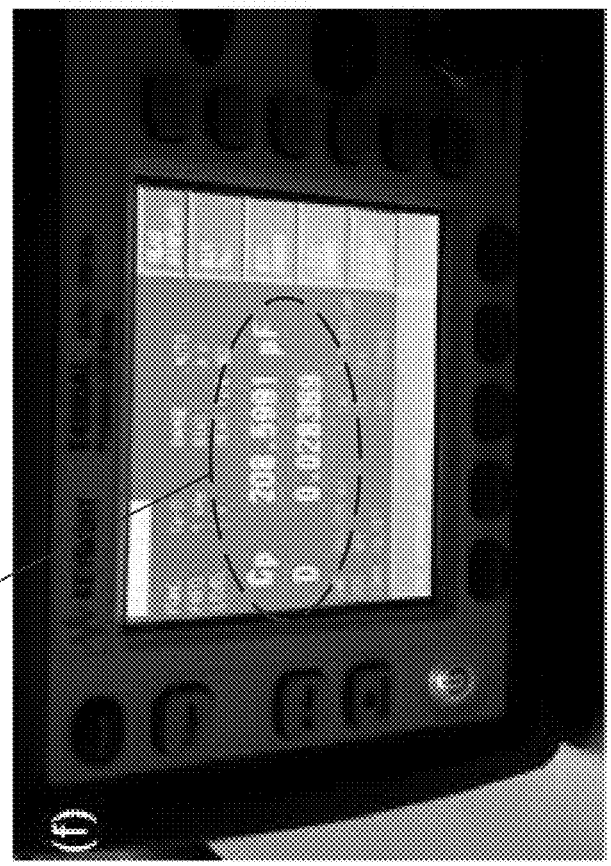
Figure 24E:
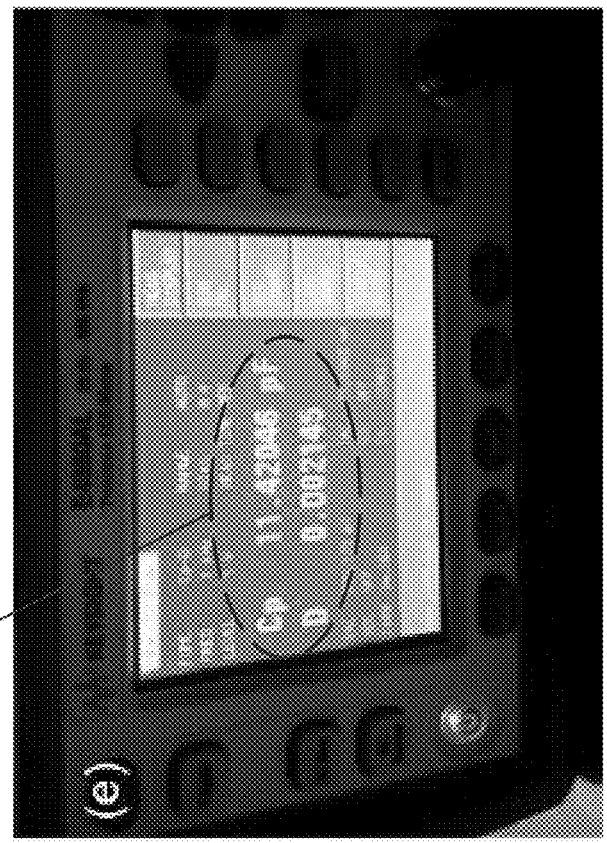

After loading, from FIG. 24E, the capacitance is read as 11.42046 pF. This indicates the whole system still works even though some insulation damage occurred during loading. In FIG. 24F, 208.5991 pF is read after manual force applied. Note that the manual force is applied hereto ensure the gap between top DTI washer and middle washer is zero. This is because in the field, there should be no gap between the top DTI and middle washer after tightening. However, because of the memory foam resiliency, even though the top DTIs have been compressed flat the memory foam still can recover. This leads to a non-zero gap between the top DTI and bottom washer. Due to the recovery of the memory foam, the capacitance is changed from 11.13522 pF to 208.5991 pF before and after loading.

B. Testing Using Skidmore-Wilhelm Tension Measurement Device

The second load test is accomplished using a Skidmore-Wilhelm Tension Measurement device. In order to test the stability of the assembled capacitor, memory foam was used in this test. As shown in FIGS. 25A-F, about 20 kips is applied on the two capacitors. From FIGS. 25C and D, the memory form capacitor has an initial capacitance value of 13.69 pF before loading, and capacitance increased to 14.71 pF after loading.

In order to solve the issue of nut caused damage, we optimized the capacitor design by reinforcing insulation layer stability. As the schematic plot demonstrates in FIG. 11 C, extra insulation layers have been applied on the top side of DTI washer and bottom side of bottom washer. Moreover, two layers of additional insulation tape have been applied. The electrical insulation tape can not only serve as an additional insulation layer, but it can also reduce physical damage caused by the rotated nut. More testing using a 20 kip load was attempted on the memory foam capacitor. As seen in FIGS. 26A-F, and particularly FIGS. 26A-C, the capacitance increased from the initial value of 24.50 pF to 71.87 pF, falling back to 28.92 pF after loading was removed. It shows the additional insulation layer helps to provide a stable value of capacitance.

CHAPTER 3. RFRD TAG—CAPACITANCE MEASUREMENT

3.1 Design of Capacitance Measurement Circuit

We tested the prototype washers by soldering two wires, one on the covering washer and another on the sensing washer. We then measured the capacitance of the system using an LCR meter and found out the capacitance range of interest is between 10 and 100 pF. This is an important requirement when we design our capacitance measurement circuit.

We have designed two circuits for capacitance measurement. The first one is a relaxation oscillator that measures from 10 to 100 pF with about 1% measurement error. We referenced a design in published IEEE article, "Limitations of a Relaxation Oscillator in Capacitance Measurements" by Yili Liu, Song Chen, Masakatsu Nakayama, and Kenzo Watanabe, incorporated by reference herein. We can use relaxation oscillators to measure capacitance because they are designed to produce a pulse signal that changes the oscillation period linearly with capacitance measured in C, as shown in FIGS. 27A and B. In theory, the oscillation period is $T=T_H+T_L=C*R*R_1/R_2 (2+\gamma+1/\gamma)$, as shown in FIG. 27B, which shall have a linear relation with the capacitance C.

The second circuit, shown in FIGS. 28A and B, is a simplified version of the first one. The functionality of this design is using a comparator circuit with a capacitor tied to the inverted input of the op amp. This relaxation oscillator generates a PWM wave, as shown in FIG. 28B.

The period of the PWM wave is:

$$\text{Period: } T = T_H + T_L = RC\ln\left[\frac{(V_{S+} - V_{TL})(V_{S-} - V_{TH})}{(V_{S+} - V_{TH})(V_{S-} - V_{TL})}\right]$$

In our application, as the energy to power the measurement circuit on the RFRD tag is harvested from RF signals, the amount is very limited. Based on SPICE simulation results, we have decided to use the second circuit (due to its simplicity and lower power) for our application, with a STMicroelectronics TS881 comparator IC. This IC chip is very low power and uses about 1.285 µW. We have acquired the needed parts (including TS881 STMicroelectronics comparator IC, resistors, etc.) and successfully demonstrated a working prototype on a breadboard.

3.2 Circuit Implementation and Testing Results

FIG. 30A shows the initial circuit implementation on our breadboard. Three resistors are used with their values labeled next to them. The goal is to measure the value of the capacitor C1. Based on the above formula, a capacitance of 50 pF shall correspond to a PWM wave period of 55 is. However, in FIG. 30B, testing results show a measured period of 62 is. This is due to inaccurate values of the used resistors and other parts.

Therefore, we further tuned the circuit implementation by changing the R2 value from 10 KΩ to 13.5 KΩ, shown in FIG. 30A. After tuning, the measured period becomes 53 s, which matches the theoretical value well with an error of less than 4%, as demonstrated in FIG. 30B.

Figure 31B:
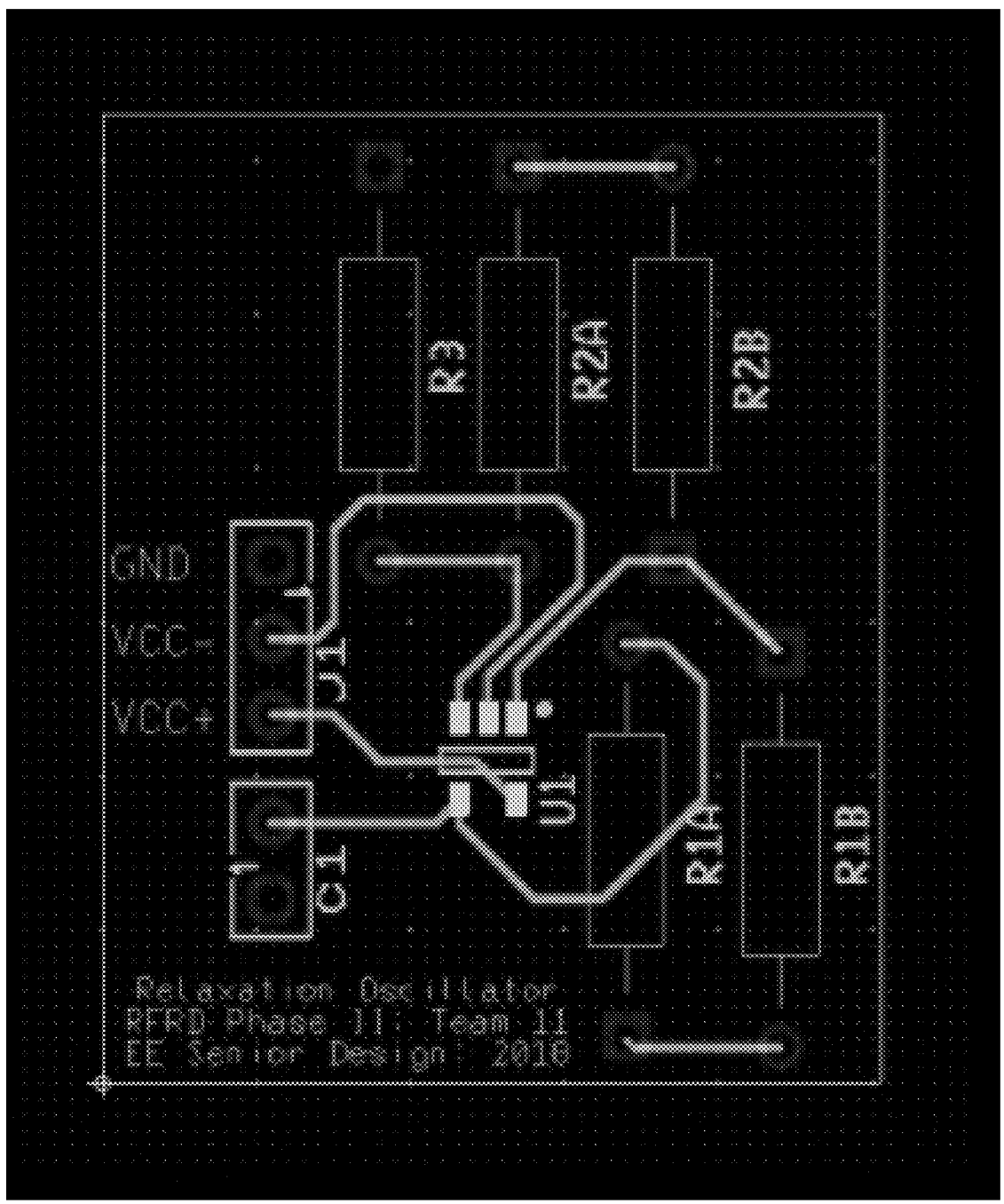

FIG. 31A is a picture of the actual breadboard we have implemented in our lab. FIG. 31B shows a preliminary version of the (Printed Circuit Board) PCB.

4. RFRD TAG—WIRELESS COMMUNICATION AND ENERGY HARVESTING

4.1 Design of Antenna for Energy Harvesting

As the operating frequency has been decreased to 900 MHz, instead of purchasing an antenna, we decided to build our own antenna for the RFRD tag, which would give us more flexibility in how power is harvested and signals are received. This decreased operating frequency also allows us to perform testing with function generators that are readily available in the department laboratories.

We have designed an inverted-F antenna for our application. We decided on the inverted-F antenna since the efficiency is the greatest at the tag area we are roughly projecting. Our antenna is designed based on the DN023 application node from the Texas Instruments, shown in FIG. 32 and characterized in Table 7 below. It is designed to operate at 900 MHz. We have estimated an expected received power of about 0.45 mW at the one meter distance from the RFRD reader to the RFRD tag.

TABLE 7

Properties of DN023 application node from Texas Instruments, utilized for antenna design.

| | |
|---|---|
| Design/Application Note | DN023 |
| Frequency | 868/915/920 MHz |
| Typical Efficiency | 80% (SA), |
| Bandwidth @ VSWR 2:0 | 40 MHz |
| Dimensions (mm) | 43 × 20 |

The rectifier circuit, in turn, depends on the antenna. This is because the input impedance, and thus the antenna-rectifier impedance match, depends on the input power that comes in from the antenna.

5. RFRD READER

5.1 RFRD Reader Prototype and Protocol

The communication between the RFRD tag and the RFRD reader will be a one-way digital communication. A microcontroller will be utilized on the tag for reading and processing the signal received from the capacitance sensor. The microcontroller will send the information to the reader where it will be displayed to the user.

The microcontroller can be from ST's line of ultra-low power ARM based MCU's. These are ARM Cortex M0+ processors capable of running in the micro amp range. ST also has a very easy to use tool chain that will allow the software to be easily written or converted to run on other STmicrocontrollers.

The information being sent from the tag to the reader will be of very little complexity and length, allowing us to use a very simple protocol. It will be comprised of a single digital string that contains the tag ID, the status of the washer including whether the pressure on the washer has changed, and a checksum to allow for the detection of any errors that might have occurred during the communication.

In the prototype, we will be using a software-defined radio (SDR) as the RFRD reader. This is a type of radio where all the processing is done in software running on a computer and allows for greater flexibility of protocols. This will allow us to implement any protocol or communication system that we may need. We have acquired a USRP-2920 SDR. GNU Radio will be used to decode the signal received from the tag.

6. CONCLUSIONS

The current findings can be summarized as follows:
1. A prototype sensor and capacitance reader system has been developed.
2. A proof-of-concept study has been conducted.
3. Insulation will increase the capacitance change during deformation.
4. The capacitance change can be used as an indication of the bolt load.
5. Memory Foam performs well as a dielectric material under loading.
6. Insulation coating can be affected by load application through a traditional hex nut.
7. Under expected maximum loading, the insulation at the DTI protrusions will be damaged. But it will not affect the functionality of the system.

From the foregoing, it can therefore be seen that the second and third embodiments 20' and 20" meet one or more of the objects of the invention. As in FIGS. 10A and B, the embodiments take advantage of a stand-alone assembly that can be easily installed on existing anchor bolts (as appropriately sized) without modification to the bolts or the nuts. It takes advantage of a substantially encapsulated sensing element at any or all of the selected anchor bolts that can transduce bolt tension by capacitance between spaced plates, and therefore does not involve protection of fragile strain gauges or load sensors. It includes a stand-off remote sensing capability to eliminate time and labor resources of manually moving to and either testing or connecting equipment for a measurement. And it can be used effectively and discriminate between each installed sensor, whether installed sensors at each anchor bolt for one structure, or anchor bolts for a plurality of different structures at different locations.

F. Options and Alternatives

As discussed earlier, the invention can take various forms of embodiments. Variations obvious to those skilled in the art will be included with the invention. Below are some examples.

1. Applications

The examples above primarily relate to using structural bolts/threaded rods and nut/nuts to provide clamping force of a bolted joint for SLTS type installations. As will be appreciated by those skilled in this technical field, the principles of the invention are capable of being applied in analogous ways to other applications and situations. For example, there may be other situations where a clamping force is needed with one or more nuts along a threaded rod or bolt to which the invention can be applied.

2. Bolt and Nut Combinations

Similarly, the examples above primarily relate to a double nut moment joint, where a threaded rod has a pair of nuts on opposite sides of the joint, and one or both nuts can be turned towards the joint to provide clamping force. As will be appreciated by those skilled in the art, variations to this are possible.

One example would be reversing the specific example to have the sensing/covering washer set below the clamped member (e.g. base plate). Another example would be to have a bolt head as the mechanical stop opposite the clamped member instead of a nut (the sensing and covering washer pair can be compressed between a bolt head and the base plate).

3. Sensor Housing or Package for the Sensor System

In the examples above, the circuitry and components of the compression sensors are primarily protected by encapsulation in the elastomer and the covering washer. As previously mentioned, the RFRD on-board section can be miniaturized to be able to be mounted somewhere on the sensing washer. For example, a recess could be machined in the sensing washer surface with the compression sensors, and the RFRD section(s) placed therein. For example, the wires will be placed inside the channels, which will be filled with epoxy. The RFRD chips will be attached next to the washers, in a weatherproofing package.

Alternatively, there might be some type of extension or other support for that RFRD section that can be carried on the sensing washer or mounted adjacent thereto.

But as can be appreciated, some type of surrounding package might be added so that the RFRD section (or plural sections per washer) could be mounted off of the sensing washer or the covering washer but have hard wire connections to the compression sensor (or sensors if plural are used per sensing washer). Such a housing or package could also enclose the whole combination (washer pair and RFRD section(s)) from the environment (e.g. rain, wind, snow, dirt, debris). It could be made of a variety of materials. Non-limiting examples would be metal, plastic, composite, or combinations. It could be removable and re-mounted and secured by a variety of fastening or mounting techniques (e.g. screw, bolt, snap, adhesive, to name just a few). Another alternative is some type of encapsulating material that could seal off the whole area (not only the washer pair and RFRD sections, but the nut). It could be easily destructible (e.g. some type of foam or curable plastic) but could seal off all these elements from the environment until or if access to any of them are needed, especially since the sensors can be read touchlessly and remotely.

4. Washer Configurations

One aspect or advantage of embodiments of the invention is the ability to manufacture them separately from existing anchor bolt structures and anchor structures. This allows retrofitting to existing structures. It also, of course, allows use in installations as original equipment.

For example, as set forth in specific embodiment one, the entire sensor can be manufactured on washer surfaces. DTI-type washers can be used. The form factor for such combinations can be that small. This could include capacitive sensors (including the capacitive plates and compressive intermediate materials or structures such as elastomers and/or springs), as well as RFRD or RFID type passive circuits. This could include a single compression sensor combination per washer set or multiple sensors per washer set. FIG. 2 shows multiple compression sensors and RFRD circuits per washer set.

In Specific Embodiment 1, the passive circuits are on one face of the sensing washer. The covering washer has bosses or dimples 32 (FIG. 2) that fit into complementary depressions 42 in the sensing washer with the elastic filling material or structure in those depressions. The covering washer 30 essentially covers the entire sensing circuit on the sensing washer 40 and provides substantial protection against outside forces or environmental factors. This washer set or pair configuration, again, allows quick and easy installation but also quick and easy removal if needed. It is to be understood that the specific configuration of each conductive sensor and how it is housed and protected can vary. Likewise, could the size and number of each sensor per washer.

Note that FIG. 2 additional indicates an optional feature for the washers. To promote rotational alignment of dimples in the covering washer with depressions in the sensing washer, another set of bosses or protrusions can be formed in or on the top surface of the sensing washer to essentially lock the washers together when they are brought into abutment. For example, those locking protrusions could by of a form factor to fit into complementary holes or bores in the bottom surface of the covering washer. This would force the alignment of the dimples and depressions and resist rotation of one washer relative the other. Alternative locking features are possible. Non-limiting examples are interlocking teeth, radial slots and ridges, etc.

It may be possible to have all sensing features built into one washer. For example, the compression sensor(s) could be built into the sensing washer, along with the RFRD capabilities. A simple flat washer might be used as the covering washer. Alternatively, the covering washer might be eliminated altogether. The sensing washer could be brought into abutment with the bottom of a nut or the bottom of a bolt head. This would require reliance on the deformation of the protrusions on the bottom of the sensing washer as the way the distance between the capacitive plates are changed relative to amount of bolt tensioning.

It may also be possible to invert the washer pair so that the sensing washer protrusions face the nut (as in FIG. 5) as opposed to facing the base plate (as in FIG. 2).

5. Sensing Elements

The number of sensing elements per washer can vary if the style 20 is used. If 20' or 20", the washers 30'/40' or 30"/40" are a single capacitor. It is to be understood that one sensor per washer might be possible. The specific embodiment shows three. Two are possible; as more than three. The designer would balance space, cost, and other factors. In Specific Embodiment 1 the three washer sensors are at equidistant radial positions around the center of the washer. This can promote collection of data from equidistant circumferential positions around the bolt for promoting more accurate bolt tension estimates. In Embodiments 2 and 3, the 2 or 3 washer sets comprise one sensor per bolt.

As will be appreciated by those skilled in the art, the compression sensors, in whatever configuration they take, would have a form factor consistent with the form factor to fit into the geometry of the sensor depressions on the sensing washer, and spring or elasticity characteristics to facilitate the desired range of displacement between washers.

As discussed earlier, one subtle feature of the specific embodiment is that the washers (usually hardened steel), take up most of the load of the tensioning. By forming the embossments in the sensing washer, material from the top surface of that washer is pushed out to become protrusions on the opposite side. That opposite side is placed in abutment to the base plate. Then, if used, aligned dimples from the bottom surface of the covering washer will partially enter depressions in the sensing washer when the covering and sensing washers are brought into abutment. When the covering washer is installed over the sensing washer, and tensioning is started, the vast majority of the surface of the covering washer face is in abutment with the vast majority of the top surface of the sensing washer. As tightening/tensioning continues, the protrusions on the bottom side of a DTI-type sensing washer will tend to flatten. That flattening will tend to move the material that originally formed the protrusion back into the sensing washer body and occupy what was the corresponding depression on the top side of the sensing washer. Dimples on the bottom of the covering washer can act as mechanical stops against movement of the compression sensors out of the depressions as the protrusions on the bottom of the sensing washer deform into the depressions. Elastic material and/or structure inside the sensor 20 can increase the spacing between the capacitive plates when the bolt is loosened. The protrusions will return back to the original shape if there is no tension inside the bolts. Elastic material and/or structure between washers 30'/40' or 30"/40" urge them apart.

As explained earlier, a compression sensor (e.g. elastomer/springs and embedded capacitor plates) can be installed in any of the depressions of embodiment 20 When the bottom side protrusion moves into its depression, that deformed washer material compresses the elastomer/springs in the depression. This moves the capacitive plates in that depression closer together, which in turn changes the capacitance value between them. However, because the tensioning forces are taken up almost entirely by the washers (e.g. by the face-to-face surface areas of abutting covering and sensing washers, and the deformation of the hardened steel protrusions on the bottom of the sensing washer), the elastomer and/or springs in the compression sensor do not have to be anywhere as robust as the washers. In fact, they can simply be designed to have enough modulus of elasticity and elastic limit to continuously urge the top capacitive plate towards the top of the depression. These elasticity characteristics can be derived by trial and error. In other words, in an unloaded state, the foam and springs are uncompressed and the opposite copper capacitor plates of FIG. 6 are at a maximum distance apart. When the covering and sensing washers are first brought into abutment but without substantial tensioning on the bolt, the dimple in the covering washer moves slightly into the sensing washer depression. This pushes against the top of the compression sensor and may slightly compress it. Thus, by appropriate calibration, reading capacitance of the compression sensor could tell when the covering washer is first brought into abutment with the sensing washer, if that information is of interest. But then, when further tensioning occurs (e.g. by turning the leveling nut towards the base plate), when such forces overcome the deformation limit of the protrusions on the bottom of the sensing washer, that washer material will move into the depressions and compress the compression sensor from the bottom. This moves the bottom copper capacitor plate towards the top plate. As such, by appropriate calibration, the amount of tensioning can be derived. Again, however, all the elastic foam and springs have to do is consistently urge the copper capacitor plates to their maximum separation within the depression. The foam/springs do not bear or experience substantial compressive forces because they are borne by the washers. This deformation by embossed protrusions on one side of a hardened steel washer into the depressions caused by the embossment are similar or the same as occur in the DTI washers described and explained at [4] (information about DTI load-indicating washers from Portland Bolt at http://www.portlandbolt.com/products/washers/load-indicating/) and additional information about DTI load-indicating washers from Portland Bolt at http://www.portlandbolt.com/products/washers/load-indicating/), incorporated by reference herein. These materials describe the benefits of DTI washers and also give examples of the types of bolt and washer combinations to which they can be applied, as well as the types of industry standards (e.g. ASTM) with which they comply. A primary difference with the invention is that the depressions are filled with the compression sensors. In embodiments 20' and 20" the compression sensor is top plate 30' or 30", bottom plate 40' or 40", and elastomer 22" between.

As will be appreciated by those skilled in the art, the material(s) that urge the capacitive plates apart, and its/their properties, can vary. The designer can select them according to need or desire. For example, one approach might be embedding the capacitive plates in an elastic filling, such as illustrated in FIG. 2. The encapsulation of the plates protects those metal parts from moisture. The elastic filling alone could provide the force to constantly urge the plates to their maximum allowed distance apart. As such, the designer could select an elastic filling that has sufficient elastic restoring forces over a desired range of experienced forces, cycles of compression, and life span for the sensor system. The designer will have a substantial range of possible elastic filling materials because, again, the elastic filling will not bear but a minute fraction of the compressive forces caused by the tensioning.

An alternative is indicated at FIG. 6. One or more springs placed between the plates could be held in position by a foam or other placeholder or guide for the spring(s). The foam could, but does not have to, provide some elastic properties. The spring(s) alone could be the force that constantly urge the plates apart. Again, the designer will have substantial freedom to select such spring(s) (material and characteristics such as spring type, spring rate or constant, spring stiffness, etc.) because its primary function is to provide enough force to consistently urge the capacitor plates apart, but they experience only at most a minute fraction of the compressive forces from the bolt tensioning. These characteristics can also include whether or not the spring(s) is electrically conductive (note that the specific embodiment above includes epoxy layers between the capacitive plates to prevent electrical conduction between them even if brought into relatively close spacing, and this could electrically insulation conductive springs or materials from those plates also). Embodiments 20' and 20" show still further alternatives.

As will be appreciated by those skilled in the art, instead of discrete mechanical springs, or the entire elastic part of the sensor a monolithic resilient material (e.g. urethane, rubber, etc.), there could be a combination of mechanical springs and elastic filling.

The copper opposite outside layers of the resilient structure promote good change in capacitance sensing. Other materials are possible, non-limiting examples including:
 a. other metals.
 b. doped semiconductors.

The capacitive sensor can take many forms and embodiments. Principles upon which change in capacitance can be converted and measured can be seen in, e.g., Rodjegard, et al., A differential charge-transfer readout circuit for multiple output capacitive sensors, Sensors and Actuators A 119 (2005) 309-315, and Yazdi, et al., A generic interface chip for capacitive sensors in low—power multi parameter microsystems, Sensors and Actuators 84 (2000) 351-361, both incorporated by reference herein. These publications furthermore give examples of how the capacitive sensing can be transduced to a readout circuit such as could be used in an RFRD context.

It is contemplated that relative displacement of the washers and the resilient material on the order of minute fractions of an inch sufficient for the relevant range of tightening and loosening of the types of anchor bolts shown in the drawings and for necessary resolution of capacitance changes to discern at least the difference between acceptable bolt tension and not. It is being understood, however, that the sensor can be scaled up or down according to need or desire.

6. Communication Link

RFRD/RFID type passive circuitry on the sensor device installed on washers along the bolt shafts can take different forms and embodiments. RFID technology has advanced. Capabilities and functions can vary. Sarma, White Paper from Auto—I D Center, MIT (2001), incorporated by reference herein, describes some of those. This paper describes how RFID tags work and are made, and proposals to further lower their cost. The designer would balance at least the following factors in designing that circuit:
 a. size.
 b. consuming power.
 c. communication range.

U.S. Pat. No. 7,412,898 to inventors Smith et al. (incorporated by reference herein) gives further details regarding how a small form factor RFID type onboard circuit can be built into a metal fastener form factor. This patent describes how an RFID tag on a bolt can communicate a measurement related to applied tensile load on the bolt to an RF reader. It also discusses how wireless communication between an RF reader and the RFRD onboard circuit can occur. The designer at least in the context of anchor bolts would consider at least the following factors:
 a. orientation of the RFRD circuit/antenna.
 b. multiple RFRDs responding at the same time.
 c. interference caused by the metal structure itself.

Again, depending on the onboard RFRD circuit and the capabilities of the RF reader, standoff distance between taking a reading and the anchor bolt can vary. Normally remote sensing at installation and typical maintenance intervals would include the user coming within several feet of the anchor bolts for visual inspection of not only anchor bolts but associated structures such as foundation, baseplate, and elevated structures. On the other hand, possible standoff distances of up to on the order of at least 3 m are possible, if not more. Of course, the greater standoff distance possible, perhaps the greater efficiency and economies of periodic maintenance checks of multiple anchor bolt installations across the wide geographic area. But the designer must balance the cost of higher power readers and potential communication errors at extended ranges.

It is possible with RFRD and RFID technology that each sensor (or each of a plurality of sensors) at or on each washer can be differentiated when read. This allows the possibility of analysis of their reported bolt tension down to not only each bolt, but to multiple positions around each bolt. On the other hand, it can allow collection of such focused data and storage and analysis either at the reader or further uploading to a central office for documentation purposes or data analysis. One type of data analysis would be looking at measured readings over multiple, spaced-apart maintenance times and detection of some sort of trend of loosening or other out of bounds condition such that the actual ordering of manual inspection and re-tightening can be efficiently managed. In other words, it can let a central office instruct a maintenance worker to go tighten an anchor bolt or bolts prior to bolt tension going out of bounds. On the other hand, it can alert the central office that a trend in the direction towards out of bounds bolt exists but allow it to be watched until it becomes imperative to go and tighten the bolt.

The reader can be any of a number of off-the-shelf RFID type readers. They come in various configurations including reading range and robustness. By remote sensing it is meant non-touching. In particular, it means the reader can effectively operate to get a reading from a range between and including (a) at or touching the anchor bolt to (b) inches, feet, and perhaps even tens of feet or meters away depending on operating range of the reader.

7. Integrated Applications

As will be appreciated, the ability to remote sense bolt tension on a wide variety of installations can also be useful in evaluating typical effective spans for appropriately tension bolts versus likelihoods of when they might loosen. Such data can be merged or correlated with data about such things as (a) geospatial location of each installation, (b) environment conditions experienced, (c) type of structure anchored, etc. This can allow a macro-based database that could be useful for designers. For example, for certain environmental conditions, a different type of anchor bolt, nut, or other configuration might be indicated based on studying collected data from a wide variety of installations over wide range of time periods.

What is claimed is:

1. An apparatus for measurement of tension or preload in large anchor bolts comprising:
 a. a sensor assembly positionable at an anchor bolt, the sensor assembly comprising:
  i. the sensor assembly capable of transducing a measurement which can be directly correlated to tension at the anchor bolt;
 b. the sensor assembly comprising:
  i. a washer assembly to be installed along the bolt and comprising:
   A. a first washer positionable along the anchor bolt between a nut or bolt head and a base plate of a structure anchored by the anchor bolt; and
   B. a second washer positionable along the anchor bolt between the first washer and the base plate;
  ii. spaced-apart surfaces in the washer assembly which are configured to be separated along the bolt axis when the sensor assembly is positioned along the anchor bolt from which a capacitance reading can be measured which is sensitive to distance between the spaced-apart surfaces;
  iii. an elastic component interposed between the spaced apart surfaces to urge them apart but allow convergence when the elastic component is compressed, said elastic component comprising:
   A. a resilient structure between the first and second washers allowing relative displacement of the first and second washers along the anchor bolt; and
  iv. a subcircuit operatively connected to the spaced-apart surfaces and capable of responding to an interrogation signal with a signal from which bolt tension can be transduced,
 wherein:
 a. the second washer includes an embossed protrusion on one surface which correlates to a depression on an opposite surface of the second washer;
 b. the resilient structure is in the depression, the resilient structure comprising:
  i. first and second spaced-apart capacitive plates which respectively have the spaced-apart surfaces, and
  ii. wherein the resilient structure produces a resilient force urging the first and second capacitive plates away from one another when the first and second capacitive plates are urged towards each other by an external force;
 c. and whereby when installed on the anchor bolt, upon application of tensioning forces on the bolt sufficient to overcome the limit of deformation of the embossed protrusion, compression of the resilient structure and convergence between the first and second capacitive plates is caused and which can be sensed and correlated to an amount of tensioning of the bolt.

2. The apparatus of claim 1 wherein the resilient structure comprises:
 a. one or more mechanical springs between the first and second electrically conductive capacitive plates which are configured to urge the capacitive plates apart when the first and second capacitive plates are urged towards each other by an external force,
 wherein the first capacitive plate is nearer to the embossed protrusion on the one surface of the second washer than the second capacitive plate.

3. The apparatus of claim 1 wherein the resilient structure comprises:
 a. an elastic material encapsulating the first and second electrically conducting capacitive plates which is configured to urge the capacitive plates apart when the first and second capacitive plates are urged towards each other by an external force,
 wherein the first capacitive plate is nearer to the embossed protrusion on the one surface of the second washer than the second capacitive plate.

4. The apparatus of claim 1 wherein the subcircuit comprises a measurement subcircuit which comprises a capacitive sensor sensing change in capacitance between the first and second electrically conducting capacitive plates based on change in relative displacement between them along the anchor bolt.

5. The apparatus of claim 4 wherein the subcircuit comprises a communication subcircuit which comprises an RFRD passive circuit operatively connected to the measurement subcircuit.

6. The apparatus of claim 5 further comprising a reader device for interrogating the subcircuit and receiving the response, wherein the reader device comprises an RF reader unit.

7. The apparatus of claim 6 wherein the RF reader unit remotely and wirelessly senses the RFRD passive circuit by:
   a. generating induced electrical current in the passive RFRD circuit to wirelessly transmit the capacitance measurement to the RF reader unit.

8. A system comprising:
a plurality of the apparatuses of claim 1;
a plurality of anchor bolts,
wherein the plurality of the apparatuses are applied to the plurality of anchor bolts.

9. A system for monitoring tension in anchor bolts comprising:
   a. a plurality of the bolt tension sensing apparatuses of claim 1, respective bolt tension sensing apparatuses being installed on at least one anchor bolt on each of a plurality of SLTS structures spaced apart from one another;
   b. a remote sensing reader and power source adapted to read each of the bolt sensing apparatuses of the plurality of SLTS elevated structures;
   c. the remote sensing reader and power source wirelessly supplying electrical energy to each said bolt tension sensing apparatus and reading and wirelessly receiving bolt tension measurements therefrom.

10. The system of claim 9 wherein the remote sensing reader and power source having a processor and a display which displays indicia related to bolt tension measurements from each read bolt tension sensing apparatus, the indicia indicating to the user whether bolt tension is appropriate or inappropriate.

11. The system of claim 9 wherein the remote sensing reader and power source can further communicate to another device.

12. The system of claim 11 wherein the other device is a computer or central office.

13. The system of claim 9 wherein the bolt tension sensing apparatus:
   a. does not require a battery;
   b. is separate from the bolt so that it does not require any alteration of and is retrofittable to existing bolts and bolted joints.

14. The system of claim 9 wherein the bolt tension sensing apparatus comprises:
   a. the second washer between a nut or bolt head and the base plate;
   b. the resilient structure in the second washer urging the first and second capacitive plates apart;
   c. the second washer taking the majority of tensioning forces when the bolt is tensioned; and
   d. the second washer comprising the embossed protrusion which is a deformable portion which deforms upon substantial tensioning of the bolt and compresses the resilient structure to reduce the distance between the first and second capacitive plates to change capacitance between the plates.

15. The system of claim 14 wherein the bolt tension sensing apparatus is applied to a double nut moment joint.

16. The system of claim 14 further comprising the first washer in abutment with the second washer.

17. The system of claim 16 wherein the first washer includes a protrusion aligned with the depression on the opposite surface of the second washer.

18. The system of claim 16 further comprising a locking system between the second washer and the first washer.

* * * * *